(12) United States Patent
Shimmoto et al.

(10) Patent No.: US 11,134,193 B2
(45) Date of Patent: **\*Sep. 28, 2021**

(54) INFORMATION PROCESSING SYSTEM, INFORMATION PROCESSING METHOD, AND NON-TRANSITORY COMPUTER-READABLE STORAGE MEDIUM

(71) Applicant: Ricoh Company, Ltd., Tokyo (JP)

(72) Inventors: Takafumi Shimmoto, Kanagawa (JP); Satoshi Mitsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,341

(22) Filed: Apr. 2, 2020

(65) Prior Publication Data

US 2020/0236279 A1   Jul. 23, 2020

Related U.S. Application Data

(62) Division of application No. 15/446,125, filed on Mar. 1, 2017, now Pat. No. 10,652,459.

(30) Foreign Application Priority Data

Mar. 7, 2016   (JP) ................................. 2016-043293
Mar. 7, 2016   (JP) ................................. 2016-043452

(51) Int. Cl.
| | |
|---|---|
| *H04N 5/232* | (2006.01) |
| *H04N 21/00* | (2011.01) |
| *G06K 9/00* | (2006.01) |
| *G06K 9/20* | (2006.01) |

(52) U.S. Cl.
CPC ...... *H04N 5/23238* (2013.01); *G06K 9/00778* (2013.01); *G06K 9/00979* (2013.01); *G06K 9/209* (2013.01); *H04N 21/00* (2013.01); *G06K 2009/2045* (2013.01)

(58) Field of Classification Search
CPC .............. H04N 5/23238; H04N 21/00; G06K 9/00778; G06K 9/209; G06K 2009/2045
See application file for complete search history.

(56) References Cited

U.S. PATENT DOCUMENTS

| | | |
|---|---|---|
| 2009/0164284 A1 | 6/2009 | Koiso et al. |
| 2012/0096356 A1 | 4/2012 | Ubillos et al. |
| 2013/0326419 A1 | 12/2013 | Harada et al. |

(Continued)

FOREIGN PATENT DOCUMENTS

| | | |
|---|---|---|
| JP | 2004-187068 | 7/2004 |
| JP | 2009-15730 | 1/2009 |

(Continued)

OTHER PUBLICATIONS

Japanese Office Action for 2016-043452 dated Nov. 12, 2019.

*Primary Examiner* — Anthony Bantamoi
(74) *Attorney, Agent, or Firm* — IPUSA, PLLC

(57) ABSTRACT

An information processing system includes a server apparatus including one or more processors configured to analyze a plurality of wide angle images acquired through photographing, and transmit a result image indicating a result of analyzing to an information processing terminal; and the information processing terminal communicable with the server apparatus and including one or more processors configured to receive the result image, and display the result image on a display.

15 Claims, 51 Drawing Sheets

(56) References Cited

U.S. PATENT DOCUMENTS

| | | |
|---|---|---|
| 2014/0247360 A1 | 9/2014 | Trundle et al. |
| 2016/0055645 A1 | 2/2016 | Ito |
| 2016/0275534 A1 | 9/2016 | Iwai |

FOREIGN PATENT DOCUMENTS

| | | |
|---|---|---|
| JP | 2009-048229 | 3/2009 |
| JP | 2010-033474 | 2/2010 |
| JP | 2010-181920 | 8/2010 |
| JP | 2014-006880 | 1/2014 |
| JP | 2015-099539 | 5/2015 |
| JP | 2015-149089 | 8/2015 |

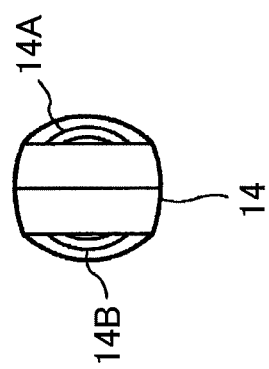
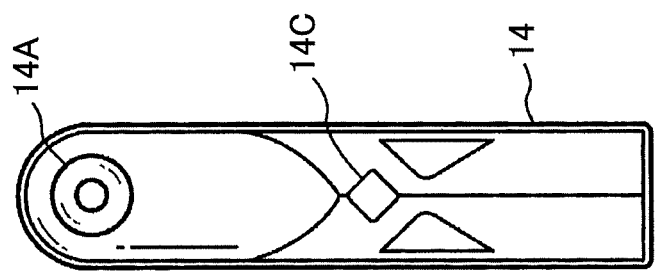
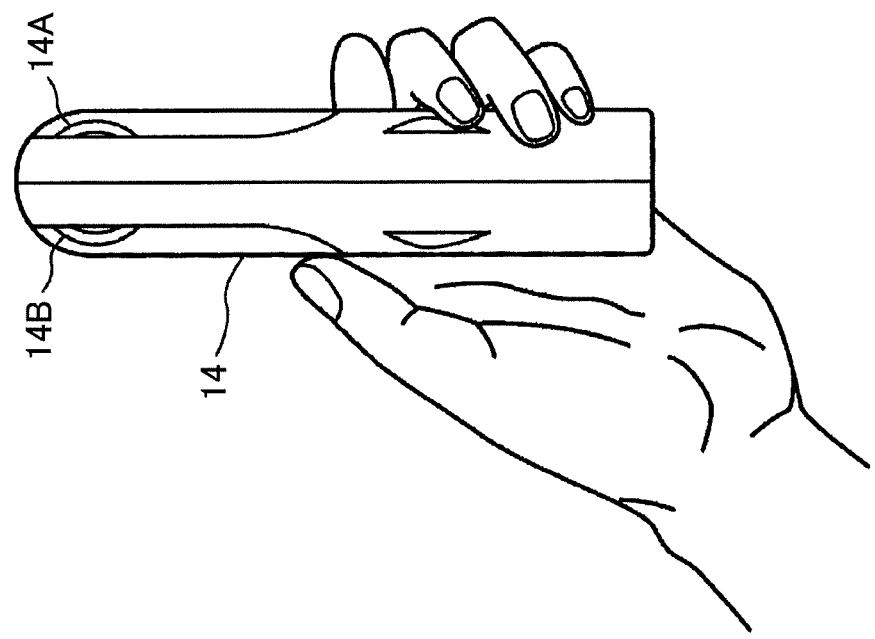

FIG.39B

| | ORIGIN COORDINATES | WIDTH | HEIGHT |
|---|---|---|---|
| PATTERN 1: Original | x1, y1, | width1, | height1 |
| PATTERN 2: AREA 2 | x2, y2, | width2, | resolutionHeight−y2 |
| AREA 2' | x2, 0, | width2, | height−(resolutionHeight−y2) |
| PATTERN 3: AREA 3 | x3, y3, | resolutionWidth−x3, | height |
| AREA 3' | 0, y3, | width−(resolutionWidth−x3), | height |
| PATTERN 4: AREA 4 | x4, y4, | resolutionWidth−x4, | resolutionHeight−y4 |
| AREA 4' | 0, 0, | width−(resolutionWidth−x4), | height−(resolutionHeight−y4) |
| AREA 4'' | x4, 0, | resolutionWidth−x4, | height−(resolutionHeight−y4) |
| AREA 4''' | 0, y4, | width−(resolutionWidth−x4), | resolutionHeight−y4 |

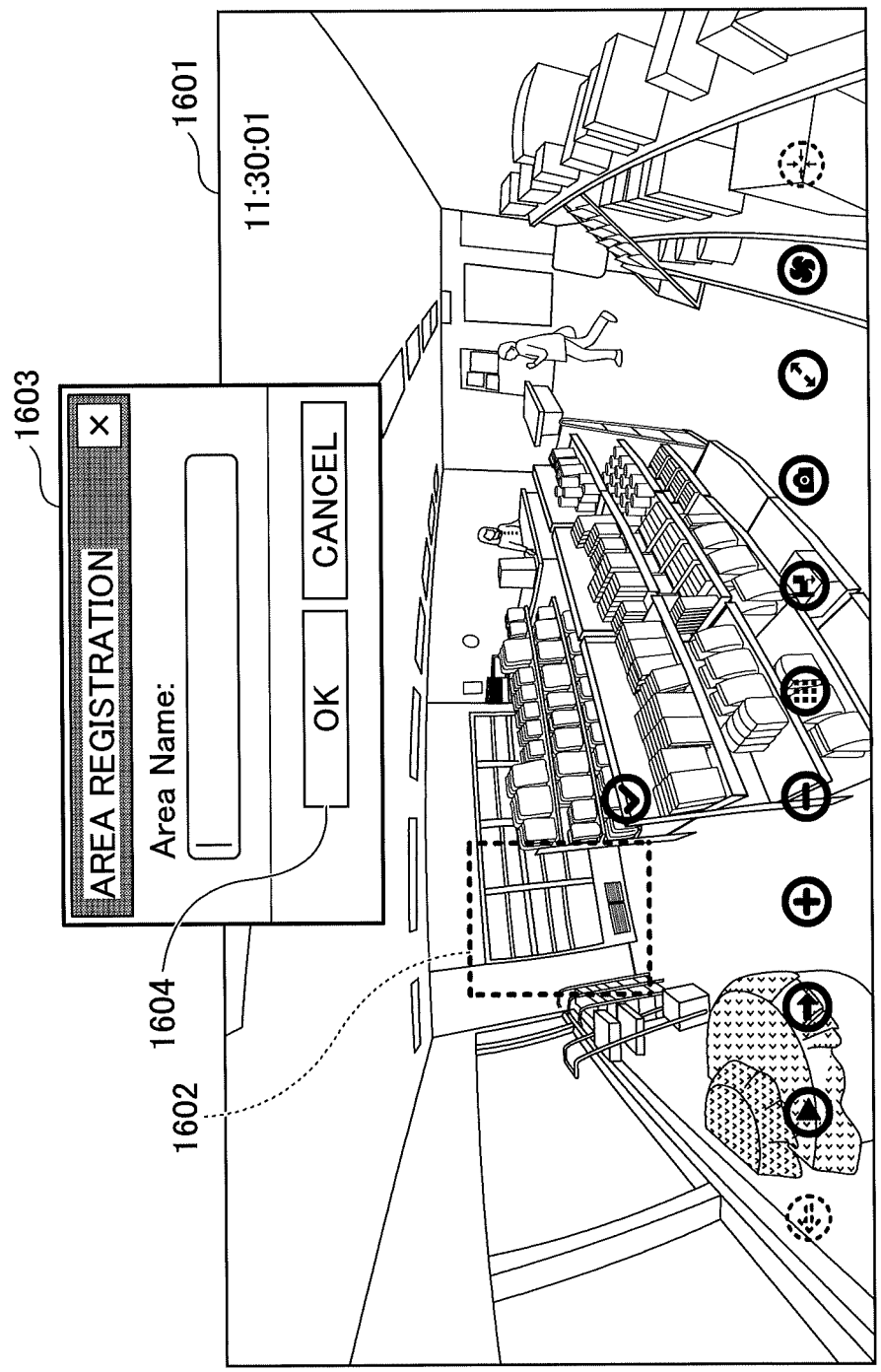

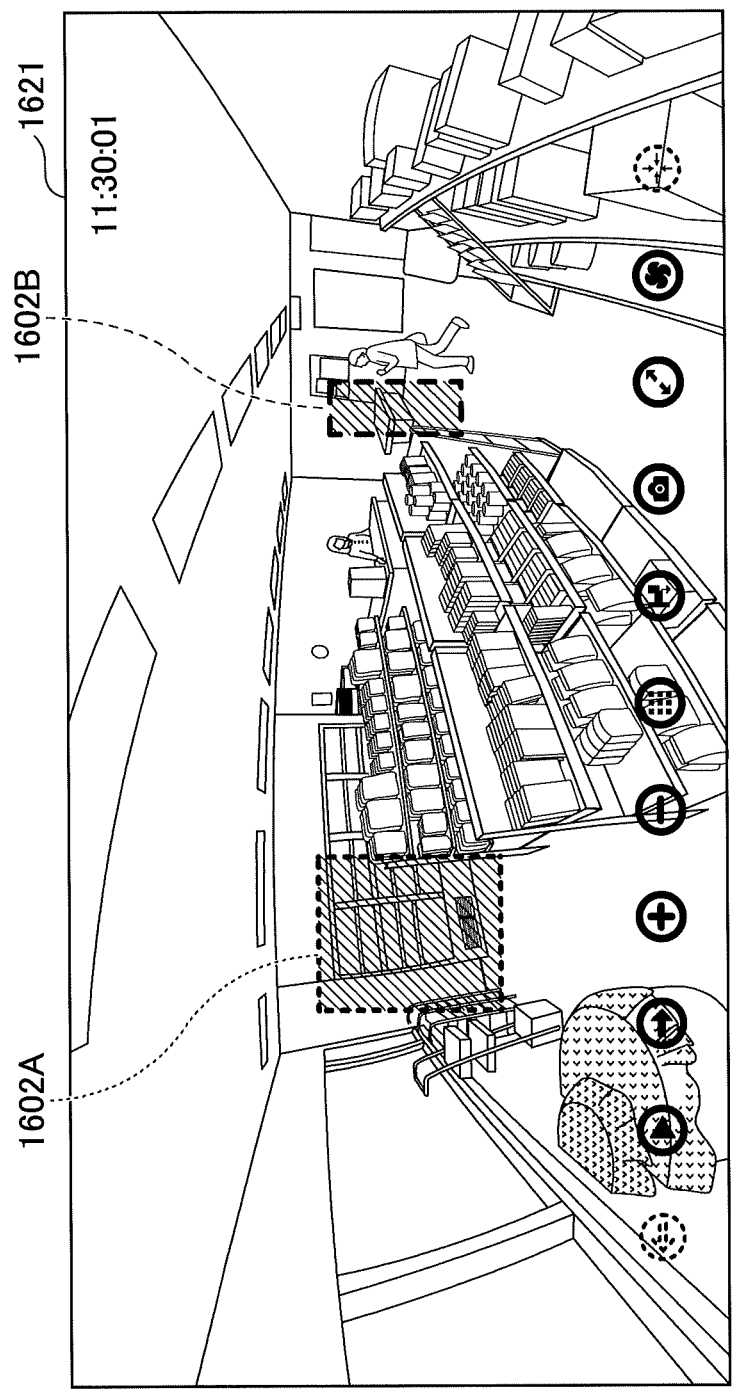

INFORMATION PROCESSING SYSTEM, INFORMATION PROCESSING METHOD, AND NON-TRANSITORY COMPUTER-READABLE STORAGE MEDIUM

CROSS-REFERENCE TO RELATED APPLICATION

This application is a divisional patent application of, and claims the benefit of and priority to, U.S. patent application Ser. No. 15/446,125 filed on Mar. 1, 2017, which claims priority under 35 U.S.C. § 119 to Japanese Patent Application No. 2016-043293, filed Mar. 7, 2016, and Japanese Patent Application No. 2016-043452, filed Mar. 7, 2016. The contents of Japanese Patent Application No. 2016-043293 and Japanese Patent Application No. 2016-043452 are incorporated herein by reference in their entirety.

BACKGROUND

1. Technical Field

The present invention relates to an information processing system, an information processing method, and a non-transitory computer-readable storage medium.

2. Description of the Related Art

A technology treating, as one example of a wide angle image, an entire celestial sphere panorama image acquired through omnidirectionally photographing is disclosed. For example, Japanese Laid-Open Patent Application No. 2014-006880 discloses displaying an entire celestial sphere panorama image and a thumbnail image of the entire celestial sphere panorama image.

Also, a technology analyzing a photographed image is disclosed. For example, Japanese Laid-Open Patent Application No. 2010-033474 discloses counting persons appearing in a photographed image having an angle of view less than 180°, and outputting the counting result.

SUMMARY

According to one aspect, an information processing system includes a server apparatus that includes one or more processors configured to analyze a plurality of wide angle images acquired through photographing, and transmit a result image indicating a result of analyzing to an information processing terminal; and the information processing terminal communicable with the server apparatus and including one or more processors configured to receive the result image, and display the result image on a display.

Other objects, features, and advantages will become more apparent from the following detailed description when read in conjunction with the accompanying drawings.

BRIEF DESCRIPTION OF THE DRAWINGS

FIGS. 2A-2C illustrate one example of a schematic external view of a photographing apparatus according to the first and second embodiments;

FIGS. 39A and 39B illustrate one example of areas that are set and person detected areas according to the second embodiment;

FIGS. 41A and 41B illustrate area registration screen pages displayed on a display by the information processing terminal when an area is registered according to the second embodiment;

FIGS. 44A and 44B illustrate examples of an area display screen page according to the second embodiment;

DETAILED DESCRIPTION OF EMBODIMENTS

Below, embodiments of the present invention will be described with reference to the accompanying drawings.

In the related art described above, it may be difficult to easily acquire a result of analyzing a plurality of wide angle images because the wide angle images have wide angles of view.

An object of the embodiments is to easily acquire a result of analyzing a plurality of wide angle images.

A wide angle image having an angle of view wider than usual means an image having an angle of view at least wider than a common photographing apparatus (for example, a 35 mm film camera), or a curved image such as an image photographed by a fish-eye lens. It is desirable that a wide angle image is an image having an angle of view of 360° in horizontal direction and 180° in vertical direction. However, a wide angle image need not have an angle of view of 360° in horizontal direction and 180° in vertical direction. The term "wide angle image" has meanings broader than and including the meanings of the term "entire celestial sphere image" (or "omnidirectional image") and the term "entire celestial sphere panorama image" (or "omnidirectional panorama image"). In the first and second embodiments, wide angle images may be entire celestial sphere images (or omnidirectional images) or "entire celestial sphere panorama images (or omnidirectional panorama images").

An "area" means a part of a wide angle image. It is also possible to use a term "zone", or the like, instead. The "area" may have any shape. According to the embodiments of the present invention, the term "area" will be used.

Analyzing a wide angle image means carrying out some image analysis on a wide angle image. Image analysis means detecting or recognizing an object. The "object" means an object appearing or photographed in a wide angle image. A thing that a viewer pays attention to can be an object. Also, an object may appear or not appear in a wide angle image, and therefore, has portability. Also, an object is a thing that has a variable shape such as a door, or has a variable state such as a lamp/light that is turned on and off. According to first and second embodiments, as one example, an object may be assumed as a human being (pedestrian), or the like.

The first embodiment of the present invention will now be described in particular.

Figure 1:
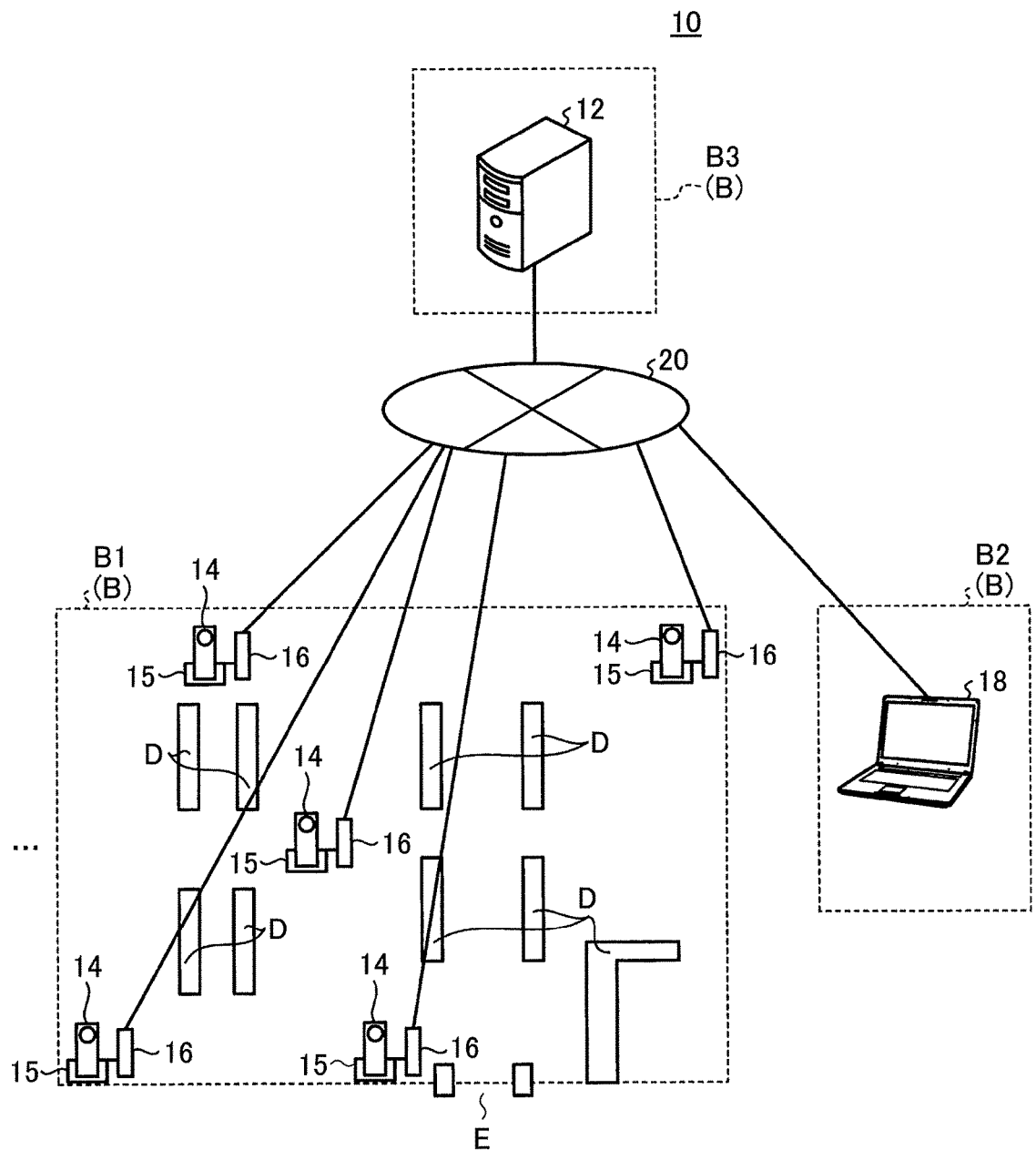
FIG. 1 generally illustrates an information processing system 10 according to first and second embodiments of the present invention.

FIG. 1 generally illustrates an information processing system 10 according to the first embodiment.

The information processing system 10 according to the first embodiment includes a server apparatus 12, a photographing apparatus 14, and an information processing terminal 18. The server apparatus 12, the photographing apparatus 14, and the information processing terminal 18 are communicably connected together via a communications system such as a network 20.

As the communications system, for example, a short-range wireless technology, a wireless communications network of a mobile communications system, the Internet, or the like, may be used. As the short-range wireless technology, Wi-Fi (Wireless Fidelity) may be used. As the wireless communications network of a mobile communications system, LTE (Long Term Evolution), NFC (Near Field Communication), WiMAX (Worldwide Interoperability for Microwave Access), or the like, may be used.

The photographing apparatus 14 photographs a wide angle image. For example, the photographing apparatus 14 photographs an omnidirectional extent to acquire an entire celestial sphere image as one example of a wide angle image. The server apparatus 12 manages the wide angle images. The information processing terminal 18 displays a desired wide angle image from among the wide angle images managed by the server apparatus 12.

The information processing system 10 further includes communications terminals 15. Each communications terminal 15 has a communications function to connect to the communications network 20 instead of the photographing apparatus 14. The communications terminal 15 is a cradle for supplying power to the photographing apparatus 14 and installing the photographing apparatus 14 in a store, or the like. The cradle is an apparatus for extending the functions of the photographing apparatus 14. The communications terminal 15 has an interface to connect to the photographing apparatus 14, and as a result, the photographing apparatus 14 can use the functions of the communications terminal 15. The communications terminal 15 uses the interface to carry out data communications with the photographing apparatus 14. Thus, the communications terminal 15 carries out data communications with the server apparatus 12 via a wireless router 16 and the communications network 20.

Note that, if the photographing apparatus 14 includes a function to directly carry out data communications with the wireless router 16 and the communications network 20, the communications terminal 15 may be omitted. Alternatively, the photographing apparatus 14 and the communications terminal 15 may be integrated into a single unit.

According to the first embodiment, as one example, it is assumed that the photographing apparatus 14 and the information processing terminal 18 are installed in specific bases B, respectively. The bases B are, for example, specific stores, specific buildings, specific floors in a building, specific rooms in a building, or the like.

According to the first embodiment, it is assumed that the photographing apparatus 14, the information processing terminal 18, and the server apparatus 12 are installed in different bases B, respectively. Actually, it is assumed that the photographing apparatus 14 is installed in a base B1, the information processing terminal 18 is installed in a base B2, and the server apparatus 12 is installed in a base B3.

The photographing apparatus 14 is previously installed in the base B1, i.e., for example, a store or the like, by a user who manages the base B1. In the base B1, for example, one or more shelfs D are installed, and has an entrance E, and so forth. According to the first embodiment, in the base B1, a plurality of (five) of the photographing apparatuses 14 are installed, for example. Note that the number of photographing apparatuses 14 included in the information processing system 10 is not limited. The photographing apparatuses 14 can be used as, for example, monitoring cameras for monitoring the base B1.

The base B2 where the information processing terminal 18 is installed is, for example, a room where the user operates the information processing terminal 18. The base B3 where the server apparatus 12 is installed is, for example, a management company for the information processing system 10.

Note that, at least one of the plurality of photographing apparatuses 14 may be installed in a different base B. Also, at least one of the plurality of photographing apparatuses 14 and the information processing terminal 18 may be installed in the same base B. Also, the plurality of photographing apparatuses 14 may be installed in a plurality of different bases B, respectively. Also, at least one of the photographing apparatuses 14 and the information processing terminal 18 may have a portable configuration, and may be held by the user to be able to be moved.

Note that, in FIG. 1, for the sake of simplification of description, three bases B are included. However, the information processing system 10 may be configured such that, in two or less bases or in four or more bases B, any ones of the one or more photographing apparatuses 14, the information processing terminal 18, and the server apparatus 12 may be placed.

Also, FIG. 1 shows an example where the server apparatus 12 and the information processing terminal 18 included in the information processing system 10 are single units, respectively. However, the server apparatus 12 and the information processing terminal 18 may be a plurality of the server apparatuses 12 and a plurality of the information processing terminals 18, respectively.

First, the photographing apparatus 14 will now be described.

The photographing apparatus 14 acquires a wide angle image through a photographing process. For example, the photographing apparatus 14 photographs an entire celestial sphere panorama image as one example of a wide angle image. The entire celestial sphere panorama image is a panorama image acquired from photographing an entire sphere extent (360°).

FIGS. 2A-2C illustrates one example of a schematic external view of the photographing apparatus 14. FIG. 2A is a side view of the photographing apparatus 14. FIG. 2B is a side view of the photographing apparatus 14 viewed from the side opposite to the side of FIG. 2A. FIG. 2C is a plan view of the photographing apparatus 14.

As illustrated in FIG. 2A, the photographing apparatus 14 has a size, for example, such that a person can hold with his or her single hand. Note that, the size of the photographing apparatus 14 is not limited to this size.

As illustrated in FIGS. 2A-2C, at an upper part of the photographing apparatus 14, a lens 14A at a front side (one side) and a lens 14B at a rear side (the other side) are installed. Each of the lenses 14A and 14B has a wide angle lens having an angle of greater than or equal to 180°. According to the first embodiment, it is assumed that the lenses 14A and 14B are fish-eye lenses as one type of wide angle lenses. In the photographing apparatus 14, an image is formed on respective imaging devices through the lenses 14A and 14B. Note that, as the imaging devices, CCDs, CMOSs, or the like, may be used. Also, as illustrated in FIG. 2B, an operation unit 14C including a shutter button, and so forth, may be installed on the front side of the photographing apparatus 14.

Figure 3:
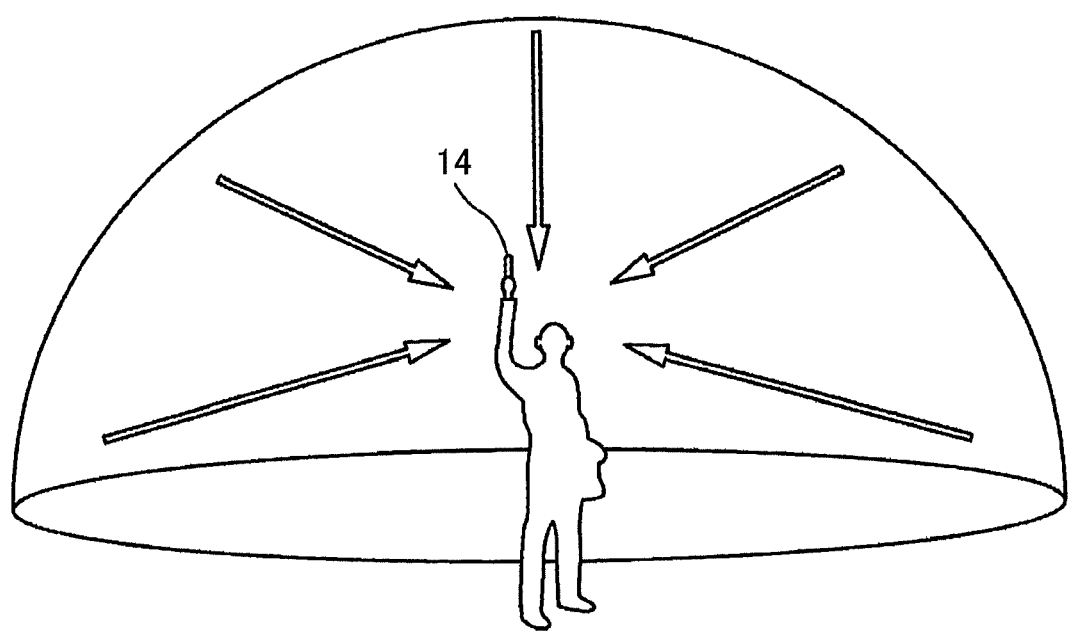
FIG. 3 illustrates one example of a state where the photographing apparatus is used according to the first and second embodiments.

Next, an example of a state where the photographing apparatus 14 is used will be described. FIG. 3 illustrates one example of a state where the photographing apparatus 14 is used. As illustrated in FIG. 3, as a result of the user holding the photographing apparatus 14 in his or her hand and performing a photographing operation, the user's omnidirectional (360°) surroundings are photographed. As a result of images being detected by the respective imaging devices through the lenses 14A and 14B, the objects around the user are photographed, and two hemispheric images are acquired. A wide angle image is generated from the two hemispheric images. Note that, the photographing apparatus 14 may be installed at a supporting member installed on the ground, a wall, or the like. In this case, the omnidirectional surroundings of the installed position are photographed.

Figure 4A:
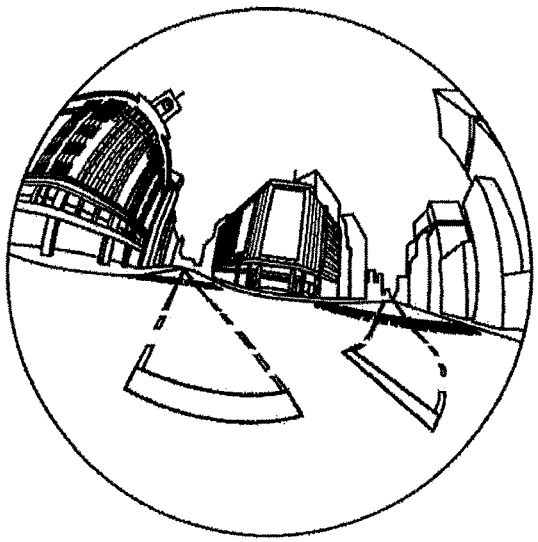
FIG. 4A is a schematic diagram illustrating one example of a hemispheric image (front side) taken by the photographing apparatus according to the first and second embodiments.
Figure 4B:
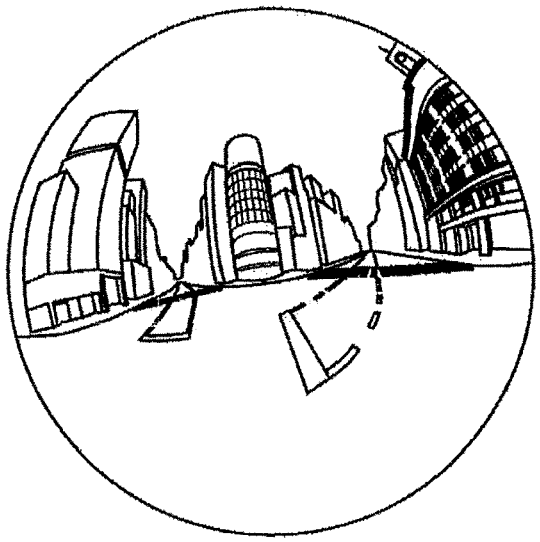
FIG. 4B is a schematic diagram illustrating one example of a hemispheric image (rear side) taken by the photographing apparatus according to the first and second embodiments.
Figure 4C:
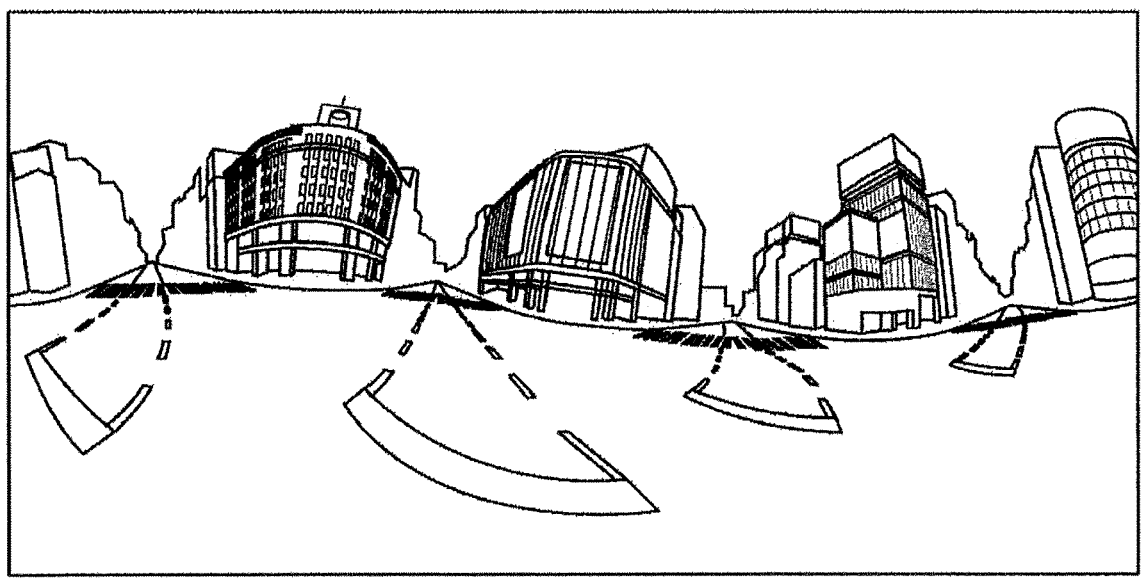
FIG. 4C is a schematic diagram illustrating one example of an image (called a "Mercator image") expressed through a Mercator projection according to the first and second embodiments.
Figure 5:
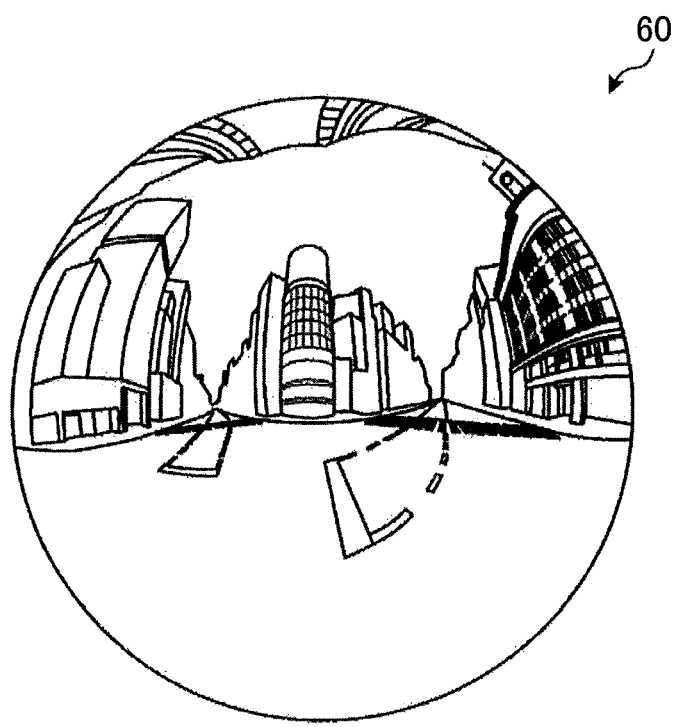
FIG. 5 is a schematic diagram illustrating one example of a wide angle image according to the first and second embodiments.

Next, a process outline of generating a wide angle image from hemispheric images taken by the photographing apparatus 14 will be described. FIGS. 4A-4C and 5 illustrate one example of generating a wide angle image. FIG. 4A is a schematic diagram illustrating one example of a hemispheric image (front side) taken by the photographing apparatus 14, FIG. 4B is a schematic diagram illustrating one example of a hemispheric image (rear side) taken by the photographing apparatus 14, and FIG. 4C is a schematic diagram illustrating one example of an image (called a "Mercator image") expressed through a Mercator projection. FIG. 5 is a schematic diagram illustrating one example of a wide angle image 60.

As illustrated in FIG. 4A, because the lens 14A is the fish-eye lens, an image taken through the lens 14A is a curved hemispheric image (front side). As illustrated in FIG. 4B, also because the lens 14B is the fish-eye lens, an image taken through the lens 14B is also a curved hemispheric image (rear side). Then, the hemispheric images (front side and rear side) are combined in the photographing apparatus 14, and thus, the Mercator image is generated (see FIG. 4C).

In the photographing apparatus 14, by using OpenGL ES (Open Graphics Library for Embedded Systems), a Mercator image is pasted in such a manner that the image is pasted on an inner side of a spherical surface. As a result, the photographing apparatus 14 generates a wide angle image 60 such as that illustrated in FIG. 5. Thus, the wide angle image 60 is expressed as a Mercator image that faces the center of a sphere. Note that OpenGL ES is a graphic library for visualizing 2D (2-Dimensions) data and 3D (3-Dimensions) data.

Returning to FIG. 1, the photographing apparatus 14 transmits the wide angle image 60 to the server apparatus 12. Note that, according to the first embodiment, it is assumed that the photographing apparatus 14 combines hemispheric images to generate a wide angle image 60. However, it is also possible that the server apparatus 12 generates the wide angle image 60 by combining the hemispheric images received from the photographing apparatus 14.

As mentioned above, according to the first embodiment, the wide angle image 60 is a 360° omnidirectional image pasted on an inner side of a spherical surface. Therefore, if the image is displayed, it is desired that the image is displayed as an image having the center that is a virtual viewpoint direction from among the 360° omnidirectional directions. In this case, it is also desired that an area S as a part of the wide angle image 60 is displayed as a planar image (that is curved in a small degree) having the center that is the viewpoint direction. As a result, it is possible to display the image without causing a person to have a feeling of wrongness.

Figure 6:
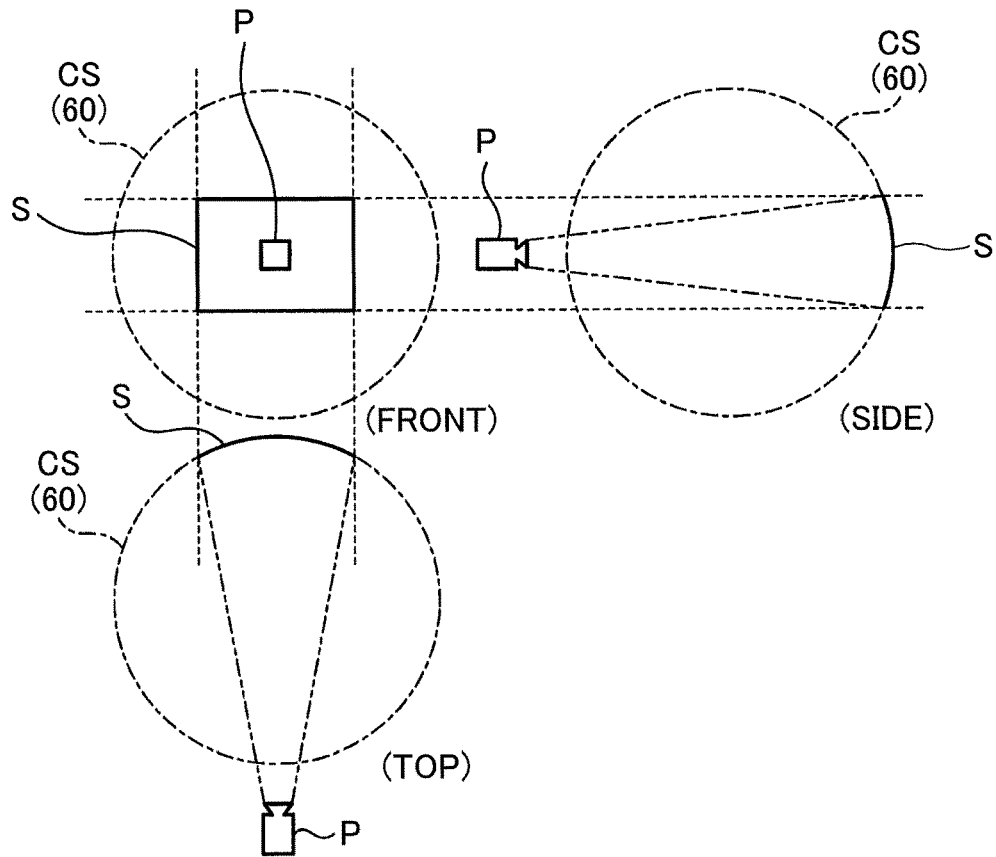
FIGS. 6 and 7 illustrate positional relationships between the wide angle image assumed to have a three-dimensional spherical shape and a predetermined area according to the first embodiment.
Figure 7:
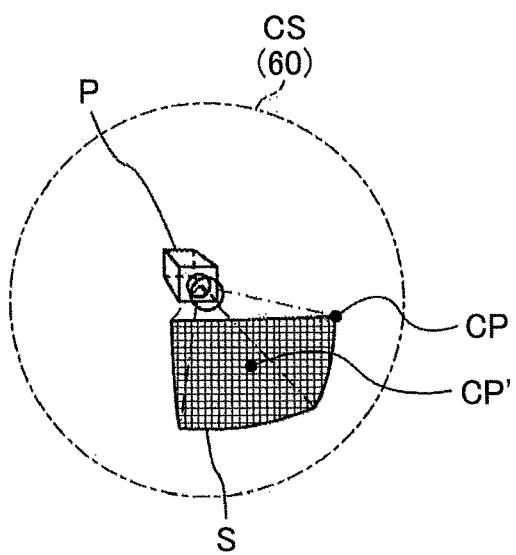

FIGS. 6 and 7 illustrate positional relationships between the wide angle image 60 assumed to have a three-dimensional spherical shape and an area S.

The wide angle image 60 is assumed to have a three-dimensional spherical shape (CS) as illustrated in FIGS. 6 and 7. In this case, a virtual photographing apparatus P is placed at a position such as to be able to photograph an inner surface of a sphere CS. The virtual photographing apparatus P corresponds to the user's viewpoint position from which the wide angle image 60 displayed as the three-dimensional sphere CS is viewed.

Then, a coordinate system having the origin that is the center of the sphere CS is built. The area S corresponds to a photographed angle of view acquired when the virtual photographing apparatus P photographs the wide angle image 60 having the spherical shape in a certain viewpoint direction of with an angle of view narrower than the wide angle image.

The area S is identified by viewpoint direction information. According to the first embodiment, the viewpoint direction information has, in the wide angle image 60 assumed as a three-dimensional sphere, the three-dimensional coordinate information (x, y, z) of one corner CP of the four corners of a rectangular area S, and the extent (the width and the height (w, h)) of the area S.

It is also possible express the area S by the coordinates (x, y) and the photographed angle of view α. The coordinates (x, y) represent the center position CP' of the area S in the three-dimensional sphere CS, assuming that the position P of the virtual photographing apparatus is the origin. The photographed angle of view α is defined by the photographing magnification (zoom) of the virtual photographing apparatus P. Note that, the area information may further include photographing attitude information indicating the attitude of the virtual photographing apparatus P. The photographing attitude information indicating the attitude of the virtual photographing apparatus P is defined by the rotation angles of the respective axes (yaw, pitch, and roll) of the coordinate system having the origin that is the center of the three-dimensional sphere CS.

The information processing system 10 according to the first embodiment displays the area S of the wide angle image 60 according to the viewpoint direction on the information processing terminal 18 or the like. Thus, the information processing system 10 is configured to be able to display an image without causing a person to have feeling or wrongness. Note that, the viewpoint direction can be changed by an operation instruction that is input by the user of the information processing terminal 18. That is, by inputting an instruction to change the viewpoint direction from the information processing terminal 18, it is possible to change the viewpoint direction in the wide angle image 60 (that is, the area included in the wide angle image 60 to be displayed on the display screen).

Next, a hardware configuration of the photographing apparatus 14 will be described.

Figure 8:
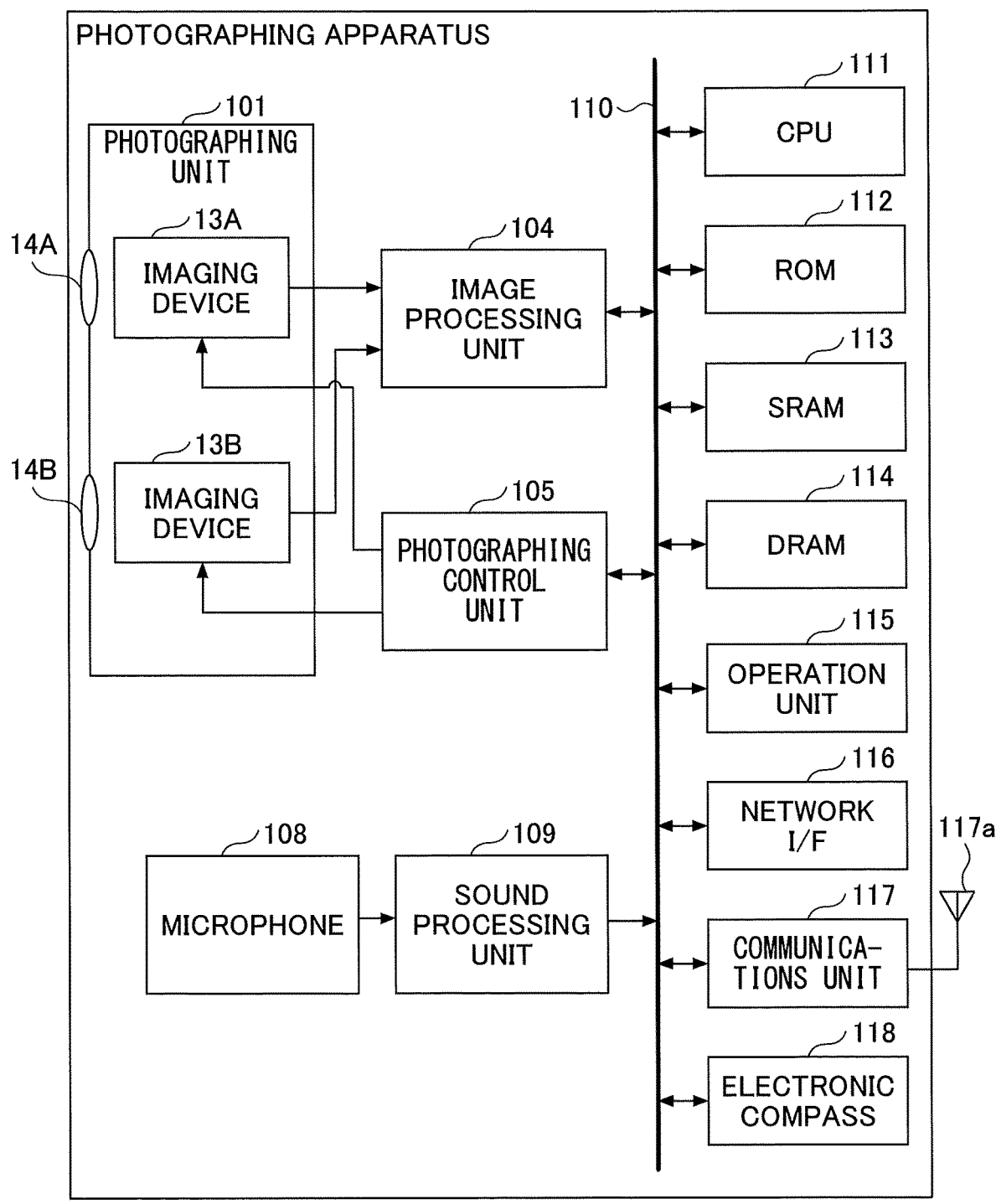
FIG. 8 is a schematic diagram illustrating one example of a hardware configuration of the photographing apparatus according to the first and second embodiments.

FIG. 8 is a schematic diagram illustrating a hardware configuration of the photographing apparatus 14. The photographing apparatus 14 includes a photographing unit 101, an image processing unit 104, a photographing control unit 105, a microphone 108, a sound processing unit 109, a CPU (Central Processing Unit) 111, a ROM (Read-Only Memory) 112, a SRAM (Static Random Access Memory) 113, a DRAM (Dynamic Random Access Memory) 114, an operation unit 115, a network I/F 116, a communications unit 117, an antenna 117a, and an electronic compass 118.

The photographing unit 101 includes the lenses 14A and 14B, and the imaging devices 13A and 13B. The imaging device 13A corresponds to the lens 14A. The imaging device 13B corresponds to the lens 14B. The imaging devices 13A and 13B convert optical images acquired through the lenses 14A and 14B into electric signals of image data.

The respective imaging devices 13A and 13B are connected with the image processing unit 104 through a parallel I/F bus. Also, the imaging devices 13A and 13B are connected with the photographing control unit 105 through a serial I/F bus (I2C bus or the like). The image processing unit 104 and the photographing control unit 105 are connected with the CPU 111 via a bus 110. To the bus 110, the ROM 112, the SRAM 113, the DRAM 114, the operation unit 115, the network I/F 116, and so forth, are also connected.

The image processing unit 104 receives image data of hemispheric images that are output from the imaging devices 13A and 13B through the parallel I/F bus. Then, the image processing unit 104 combines the image data of the hemispheric images to generate a wide angle image 60.

The photographing control unit 105 sets commands and so forth to register groups of the imaging devices 13A and 13B, where the photographing control unit 105 is used as a master device and the imaging devices 13A and 13B are used as slave devices, via the I2C bus. The commands and so forth are received from the CPU 111. The photographing control unit 105 uses the I2C bus to receive status data and so forth from the register groups of the imaging devices 13A and 13B, and sends the data to the CPU 111.

The photographing control unit 105 cooperates with the CPU 111 to function as a synchronization control device to synchronize the timings of outputting the image data of the hemispheric images from the imaging devices 13A and 13B. Note that, according to the first embodiment, the photographing apparatus 14 does not have a display unit. However, the photographing apparatus 14 may have a display unit.

The microphone 108 converts sounds into sound data (signal). The sound processing unit 109 receives the sound data that is output from the microphone 108 via an I/F bus, and processes the sound data.

The CPU 111 controls the entire operation of the photographing apparatus 14 and carries out various processes. The ROM 112 stores various programs for the CPU 111. The SRAM 113 and the DRAM 114 are work memories, and store data generated while the programs are executed or the processes are carried out by the CPU 111. The DRAM 114 stores image data that is being processed and wide angle images 60 that has been processed by the image processing unit 104.

The network I/F 116 is an interface circuit (a USB I/F, or the like) for an externally mounted medium such as a SD card, a personal computer, or the like. The network I/F 116 may also be used for connecting to a wireless or wired network. Wide angle images 60 stored in the DRAM 114 will be stored in, via the network I/F 116, the externally mounted medium, or will be transmitted, via the network I/F, to an external apparatus such as the communications terminal 15.

The communications unit 117 carries out communications with an external apparatus such as the communications terminal 15 via the antenna 117a of the photographing apparatus 14 through a short-range wireless technology such as Wi-Fi or NFC. The communications unit 117 may transmit wide angle images 60 to an external apparatus such as the communications terminal 15.

The electronic compass 118 detects the photographing attitude information indicating the attitude (yaw, pitch, and roll) of the photographing apparatus 14 from a terrestrial magnetism. Note that the electronic compass 118 may further have a GPS (Global Positioning System) function for acquiring the current position of the photographing apparatus 14.

Figure 9:
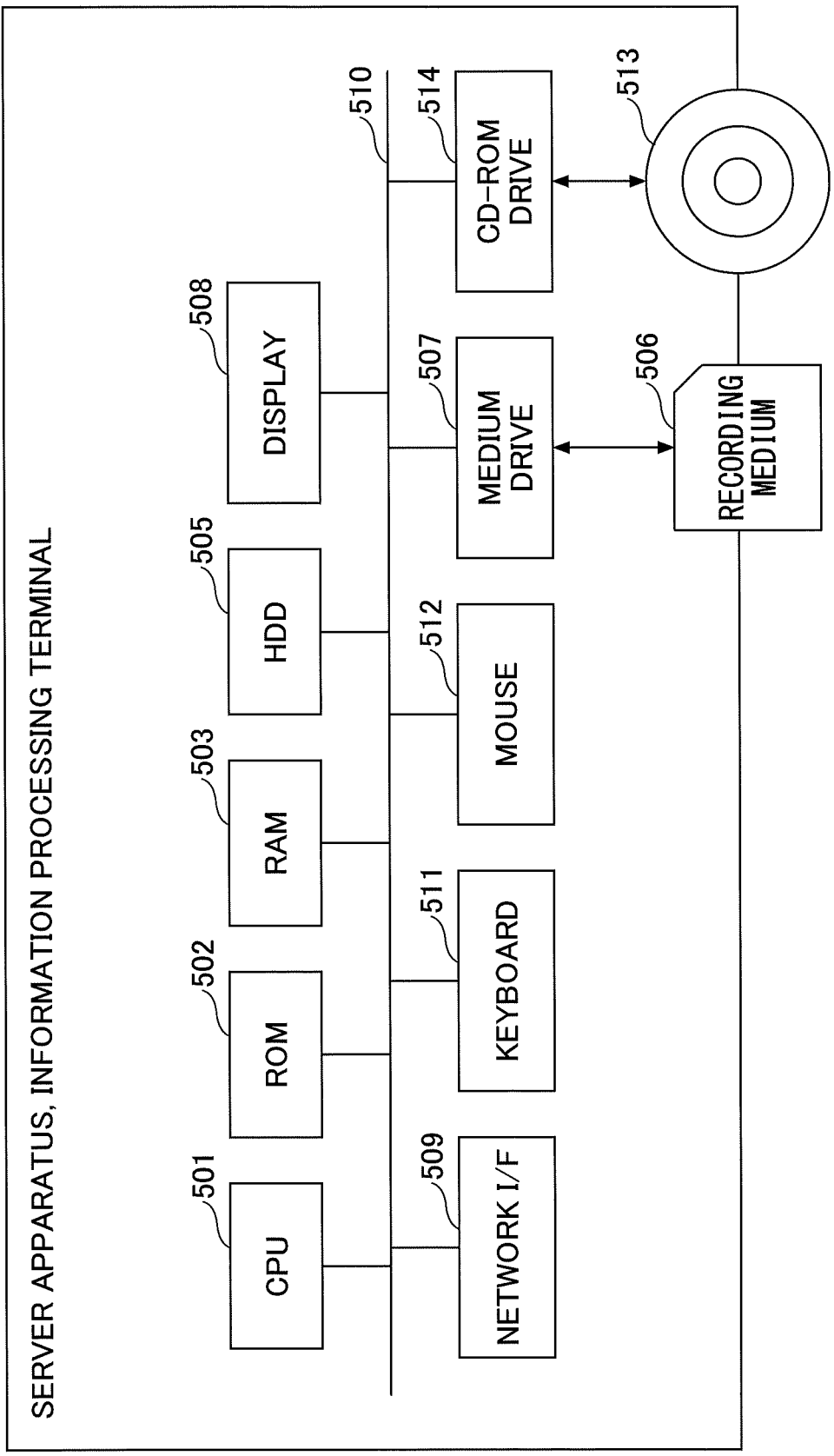
FIG. 9 illustrates one example of a hardware configuration of a server apparatus and an information processing terminal according to the first and second embodiments.

Next, a hardware configuration of the server apparatus 12 and the information processing terminal 18 will be described. FIG. 9 illustrates one example of a hardware configuration of the server apparatus 12 and the information processing terminal 18.

Each of the server apparatus 12 and the information processing terminal 18 includes a CPU 501, a ROM 502, a RAM 503, a HDD (Hard Disk Drive) 505, a medium drive 507, a display 508, a network I/F 509, a keyboard 511, a mouse 512, and a CD-ROM drive 514, and these devices are connected together via a bus 510. The medium drive 507 reads data from and writes (stores) data to a recording medium 506 such as a flash memory. The CD-ROM drive 514 reads various sorts of data from and writes various sorts of data to a CD-ROM (Compact Disc Read-Only Memory) 513 that is one example of a detachable recording medium. Each of the server apparatus 12 and the information processing terminal 18 may include a touch panel where the respective functions of the display 508, the keyboard 511, and the mouse 512 are integrated.

Figure 10:
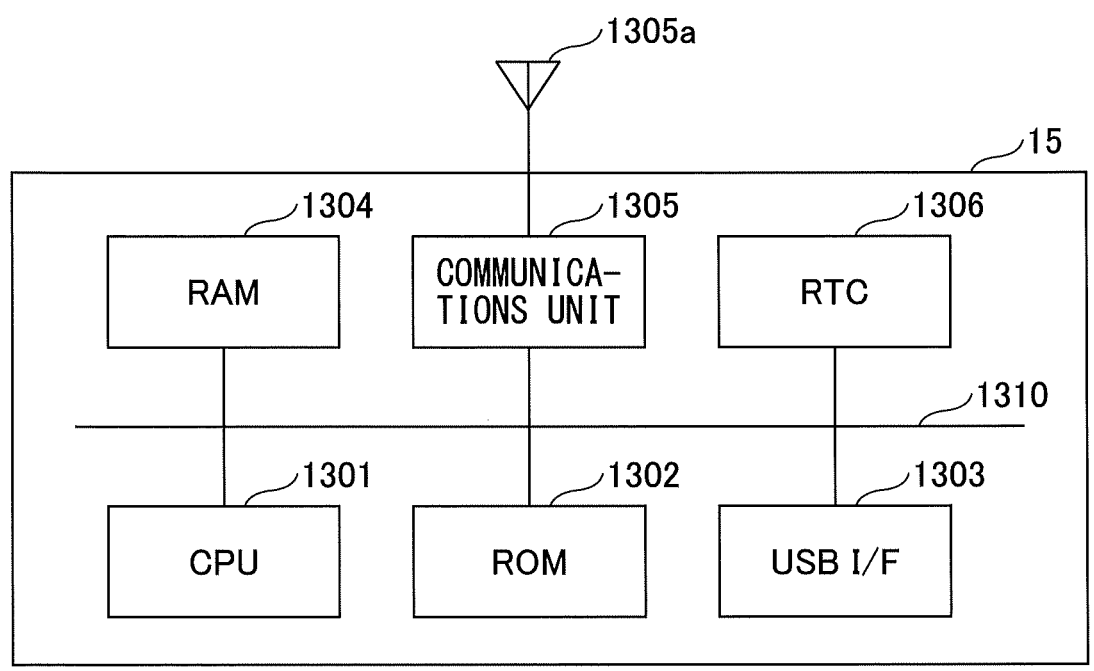
FIG. 10 illustrates one example of a hardware configuration of a communications terminal in a case where the communications terminal is a cradle using a wireless communications function according to the first and second embodiments.

Using FIG. 10, a hardware configuration of the communications terminal 15 will be described. FIG. 10 illustrates a hardware configuration of the communications terminal 15 in a case where the communications terminal 15 is a cradle using a wireless communications function, as mentioned above.

As illustrated in FIG. 10, the communications terminal 15 includes a CPU 1301 controlling the entirety of the communications terminal 15, a ROM 1302 storing basic input/output programs, a RAM 1304 used as a work area of the CPU 1301, a communications unit 1305 for data communications using Wi-fi, NFC, LTE, or the like, a USB I/F 1303 for wired communications with the photographing apparatus 14, and a RTC (Real Time Clock) 1306 holding calendar and time information.

Also, a bus line 1310 such as an address bus, a data bus, and so forth, electrically connecting these devices is provided.

The ROM 1302 stores an operating system (OS) executed by the CPU 1301, other programs, and various sorts of data.

The communications unit 1305 carries out communications with the wireless router 16, or the like, using an antenna 1305a with wireless communications signals.

Also, a GPS receiving unit receiving a GPS signal including position information (latitude, longitude, and height) of the communications terminal 15 using an IMES (Indoor Messaging System) as a GPS (Global Positioning System) or an indoor GPS may be provided.

Figure 11:
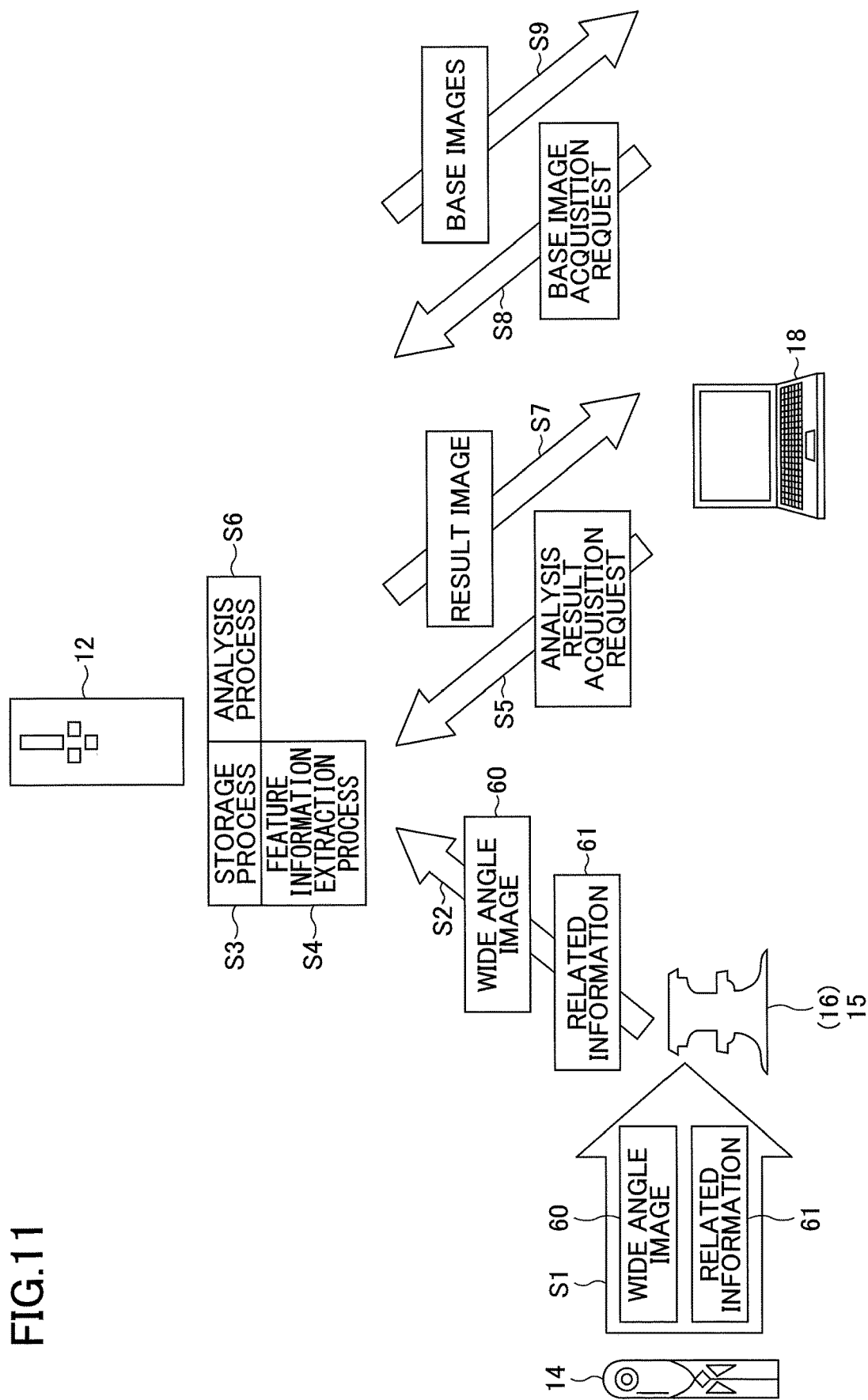
FIG. 11 illustrates one example of an outline of flows of information processing carried out by the information processing system according to the first embodiment.

Next, outline of flows of information processing carried out by the information processing system 10 according to the first embodiment will be described. FIG. 11 illustrates one example of outline of flows of information processing carried out by the information processing system 10.

According to the first embodiment, the photographing apparatus 14 transmits a photographed wide angle image 60, and related information 61 corresponding to the wide angle image 60, to the server apparatus 12 via the communications terminal 15 and wireless router 16 (steps S1 and S2).

According to the first embodiment, it is assumed that the photographing apparatus 14 is previously fixed to a certain position. The photographing apparatus 14 is assumed to carry out continuous photographing, and transmits the respective wide angle images 60 thus taken through the continuous photographing to the server apparatus 12 in sequence.

That is, according to the first embodiment, the photographing apparatus 14 is assumed to transmit a plurality of (frames of) wide angle images 60 that are successive in a time-series manner to the server apparatus 12 in sequence.

Also, the photographing apparatus 14 transmits the related information 61 corresponding to the wide angle images 60 to the server apparatus 12 together with the wide angle images 60. More specifically, the photographing apparatus 14 transmits pieces of related information 61 corresponding to respective frames of wide angle images 60 to the server apparatus 12 together with the wide angle images 60.

The related information 61 includes photographed date and time information indicating the photographed dates and times of the corresponding wide angle images 60, and photographing apparatus identification information (hereinafter, referred to as photographing apparatus IDs).

Each photographing apparatus ID included in the related information 61 is identification information for identifying the photographing apparatus 14 that photographed the corresponding wide angle image 60.

After receiving the wide angle images 60 as well as the related information 61 from the photographing apparatus 14, the server apparatus 12 stores the wide angle images 60 and the related information 61 (step S3). Then, the server apparatus 12 extracts feature information from the wide angle images 60 (step S4).

The feature information is information indicating a feature of the wide angle image 60. Items to be extracted as the feature information are previously determined. For example, the feature information includes the number of objects appearing in the wide angle image 60 (details will be described later).

After receiving an instruction operation from the user, the information processing terminal 18 transmits an analysis result acquisition request concerning wide angle images 60 to the server apparatus 12 (step S5). The analysis result acquisition request includes analysis content information indicating the contents of analysis concerning wide angle images 60, and so forth (details will be described later).

After receiving the analysis result acquisition request, the server apparatus 12 carries out an analysis process to analyze wide angle images 60 according to the analysis content information included in the analysis result acquisition request (step S6).

Then, the server apparatus 12 transmits a result image indicating the result of the analysis process to the information processing terminal 18 (step S6). As a result, the result image indicating the analysis result is displayed on the information processing terminal 18.

Also, in response the user's operation instruction performed on the information processing terminal 18, a request for acquiring base images of the analysis result to the server apparatus 12 (step S8). As a result, the server apparatus 12 transmits wide angle images 60 used as a base of the analysis result indicated by the result image transmitted in step S6 as base images to the information processing terminal 18 (step S9). As a result, a wide angle image 60 that is the base of the result image indicating the analysis result is displayed on the information processing terminal 18.

Thus, the information processing terminal 18 can display the result image indicating the analysis result according to the analysis result acquisition request that has been transmitted. Also, the information processing terminal 18 can display the wide angle image 60 that is the base of the analysis result.

Next, functions of respective apparatuses included in the information processing system 10 according to the first embodiment will be described in detail.

Figure 12:
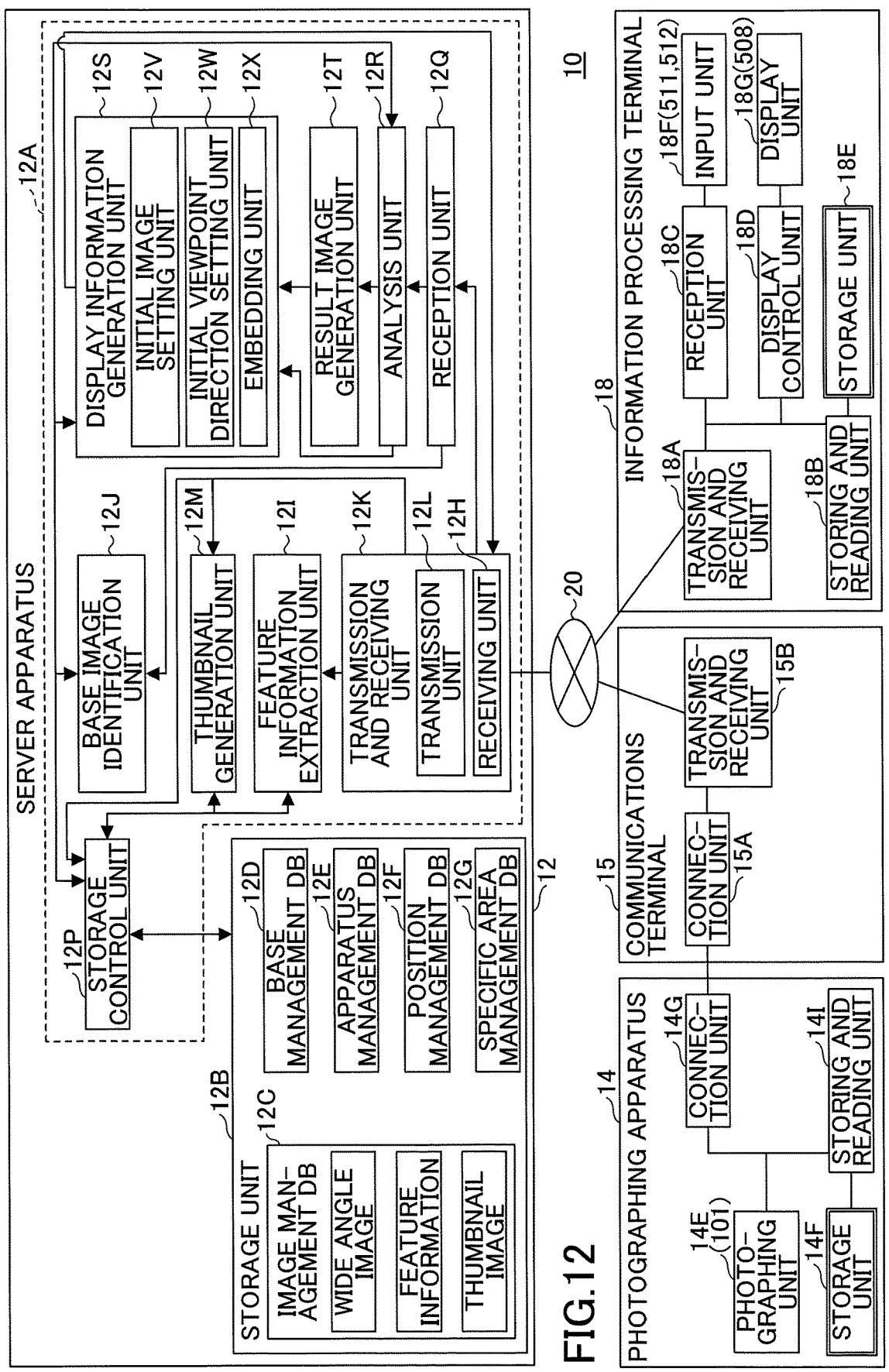
FIG. 12 is a schematic diagram illustrating one example of a functional configuration of the information processing system according to the first embodiment.

FIG. 12 is a schematic diagram illustrating functional configurations of the server apparatus 12, the photographing apparatus 14, the communications terminal 15, and the information processing terminal 18 of the information processing system 10.

The photographing apparatus 14 includes a photographing unit 14E, a storage unit 14F, a connection unit 14G, and a storing and reading unit 14I. The photographing unit 14E acquires image data of hemispheric images through a photographing process, and stores the image data in the storage unit 14F. The photographing unit 14E reads image data of a pair of hemispheric images of the same timing from the storage unit 14F, and generates a wide angle image 60. Also, the storing and reading unit 14I reads, from the storage unit 14F, the photographed date and time information for the generated wide angle image 60 and the photographing apparatus ID of the photographing apparatus 14 as related information 61. Then, the connection unit 14G transmits the wide angle image 60 generated by the photographing unit 14E and the related information 61 to the communications terminal 15.

The communications terminal 15 includes a connection unit 15A and a transmission and receiving unit 15B. The connection unit 15A is connected to the connection unit 14G of the photographing apparatus 14. The connection unit 15A receives, from the photographing apparatus 14, the wide angle image 60 and the related information 61. The transmission and receiving unit 15B carries out communications with the photographing apparatus 14 through the connection unit 15A. Also, the transmission and receiving unit 15B carries out communications with the server apparatus 12 via the network 20. According to the first embodiment, the transmission and receiving unit 15B transmits the wide angle image 60 and the related information 61 acquired from the photographing apparatus 14 through the connection unit 15A to the server apparatus 12 through the network 20.

The server apparatus 12 includes a control unit 12A and a storage unit 12B. The control unit 12A and the storage unit 12B are connected together in a manner of being able to send and receive data and signals.

The storage unit 12B stores various sorts of data. The storage unit 12B stores, for example, an image management DB (database) 12C, a base management DB 12D, an apparatus management DB 12E, a position management DB 12F, and a specific area management DB 12G. In the image management DB 12C, wide angle images 60, feature information, and thumbnail images are stored (details will be described later).

TABLE 1A

| BASE ID | BASE NAME | BASE LAYOUT IMAGE | PHOTOGRAPHING APPARATUS ID |
|---|---|---|---|
| s001 | SHIBUYA SHOP | 100008ifauy.jpg | t001, t002, t003, t004, t005, t006 |
| s002 | YURAKUCHO SITE | 100009ifauy.jpg | t021, t022, t023, t024 |
| . | . | . | . |
| . | . | . | . |

TABLE 1B

| PHOTOGRAPHING APPARATUS ID | CURRENT POSITION |
|---|---|
| t001 | (3, 6) |
| t002 | (3, 9) |
| . | . |
| . | . |

TABLE 1A and TABLE 1B illustrate examples of data configurations of the base management DB 12D and the apparatus management DB 12E, respectively.

TABLE 1A illustrates one example of a data configuration of the base management DB 12D. The base management DB 12D is a database for managing, for each base, the photographing apparatuses 14 installed in the base. Note that, the data configuration of the base management DB 12D is not limited to a database, and may be a table.

The base management DB 12D associates base IDs, base names, base layout images, and photographing apparatus IDs. The base ID is identification information for identifying each base B. The base name is a name of the base B identified by the base ID. The base layout image is an image indicating the layout of the base B.

Figure 13:
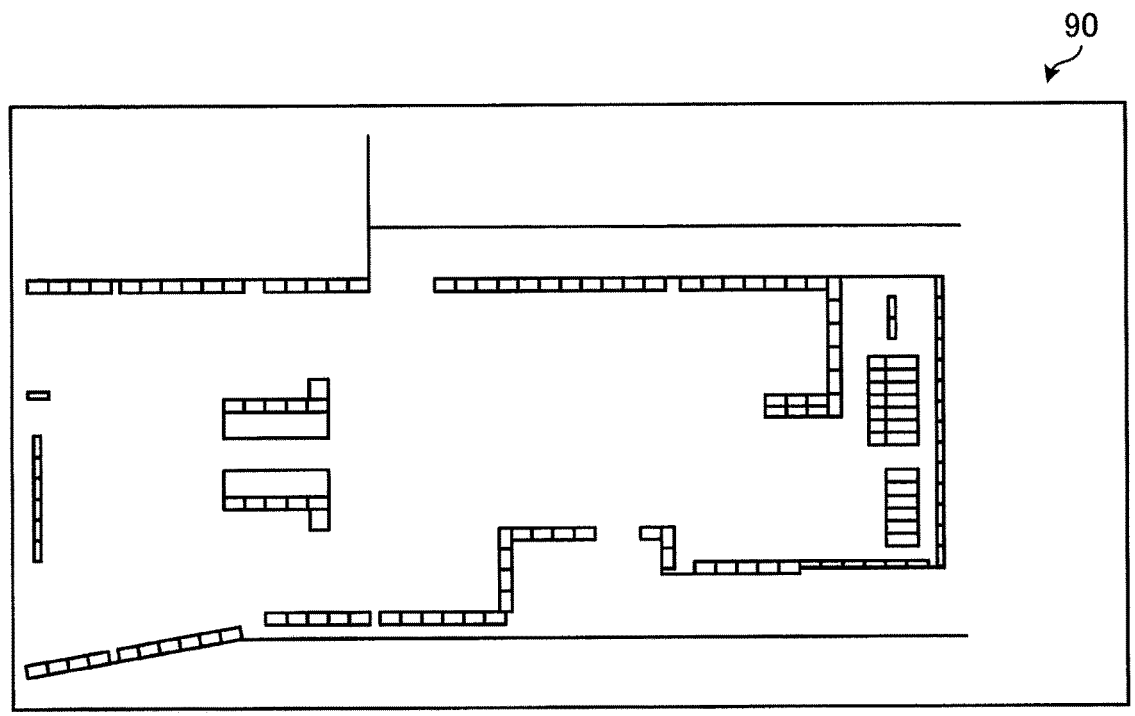
FIG. 13 is schematic diagram illustrating one example of a base layout image according to the first embodiment.

FIG. 13 is schematic diagram illustrating one example of a base layout image 90. As illustrated in FIG. 13, the base layout image 90 indicates the layout of the base B identified by the corresponding base ID.

Returning to TABLES 1A and 1B, the photographing apparatus ID is identification information for identifying each photographing apparatus 14. The photographing apparatus IDs in the base management DB 12D are identification information of the photographing apparatuses 14 currently present in the base B identified by the corresponding base ID.

TABLE 1B illustrates one example of a data configuration of the apparatus management DB 12E. The apparatus management DB 12E associates the photographing apparatus IDs with the current positions. The current position is information indicating the coordinates of the position where the photographing apparatus 14 identified by the corresponding photographing apparatus ID is currently present.

For example, the related information 61 further includes the position information of the photographing apparatus 14. Then, the server apparatus 12 registers the position information included in the related information 61 received from the photographing apparatus 14 with the apparatus management DB 12E as the current position, to update the apparatus management DB 12E appropriately. Also, each time when the apparatus management DB 12E is updated, the server apparatus 12 determines which base B identified by each base ID in the base management DB 12D the photographing apparatus 14 is present, and registers the corresponding photographing apparatus ID with the base management DB 12D.

TABLE 2

| | | | | FEATURE INFORMATION | | |
|---|---|---|---|---|---|---|
| | | | | | OBJECT INFORMATION | |
| PHOTO-GRAPHING APPARATUS ID | WIDE IMAGE ANGLE ID IMAGE | THUMBNAIL IMAGE | PHOTO-GRAPHED DATE AND TIME INFORMATION | NUMBER OF PERSONS IN WIDE ANGLE IMAGE | SPECIFIC AREA ID |
| t001 | 01 | au123456ifauy.jpg | au123456thum.jpg | 2016/7/5/12:03 | 2 | sp1001 sp1002 |
| t001 | 02 | au123457ifauy.jpg | au123457thum.jpg | 2016/7/5/12:05 | 1 | sp1001 |
| t001 | 03 | au123458ifauy.jpg | au123458thum.jpg | 2016/7/5/12:10 | 3 | sp1001 sp1002 |
| t001 | 04 | au123459ifauy.jpg | au123459thum.jpg | 2016/7/5/12:15 | 5 | sp1001 sp1002 |
| t001 | 05 | au123460ifauy.jpg | au123460thum.jpg | 2016/7/5/12:20 | 4 | sp1001 |
| . | . . | . | . | . | . |
| . | . . | . | . | . | . |

| | | FEATURE INFORMATION | | | | |
|---|---|---|---|---|---|---|
| | | | | | DRAWN IMAGE INFORMATION | POSITION |
| | | OBJECT INFORMATION | | | | |
| PHOTO-GRAPHING APPARATUS ID | IMAGE ID | NUMBER OF PERSONS IN SPECIFIC AREA | PERSON ID | PERSON POSITION AREA ID | DRAWN IMAGE ID | DRAWN IMAGE | AREA ID OF DRAWN IMAGE |
| t001 | 01 | 1 | h0011 | pos0001 pos0002 | d0001 | Image0101.jpg | pos0003 |
| | | 1 | h0012 | — | — | — | — |
| t001 | 02 | 1 | h0011 | pos0003 | — | — | — |
| t001 | 03 | 2 | h0011, h0012 | pos0002 pos0003 | — | — | — |
| | | 1 | h0013 | pos0004 | — | — | — |
| t001 | 04 | 3 | h0021, h0022, h0023 | pos0005 pos0006 pos0007 | d0002 | Image0102.jpg | pos0004 |
| | | 1 | h0024 | pos0007 | — | — | — |
| | | — | h0025 | pos0008 | — | — | — |
| t001 | 05 | 4 | h0021, h0022, h0023, h0024 | pos0005 pos0007 pos0002 pos0003 | — | — | — |
| . | . | . | . | . | . | . | . |
| . | . | . | . | . | . | . | . |

TABLE 2 illustrates one example of a data configuration of the image management DB 12C. The image management DB 12C is a database for managing the wide angle images 60 photographed by the respective photographing apparatuses 14 and the feature information. Note that, the data configuration of the image management DB 12C is not limited to a database, and may be a table, or the like.

The image management DB 12C associates the photographing apparatus IDs, the image IDs, the wide angle images 60, the thumbnail images, and the feature information with each other. The image ID is identification information for identifying the wide angle image 60.

Each time when the server apparatus 12 receives, from the photographing apparatus 14, a wide angle image 60 and related information 61, the server apparatus 12 associates the received wide angle image 60 with the photographing apparatus ID of the photographing apparatus 14 that has photographed the wide angle image 60, and the image ID, and stores the wide angle image as well as the other data in the image management DB 12C.

The thumbnail image is a thumbnail of the corresponding wide angle image 60. The thumbnail image is, for example, an image reduced in size from the wide angle image 60, or a size-reduced image of an area S centered on a predetermined viewpoint direction of the wide angle image 60. The thumbnail image is generated by the server apparatus 12 (details will be described later).

The feature information indicates a feature of the wide angle image 60 identified by the corresponding image ID. According to the first embodiment, the feature information is previously extracted from the wide angle image 60 to be used for analyzing the wide angel image 60 according to the analysis contents indicated by the user.

Actually, according to the first embodiment, the feature information includes photographed date and time information, object information, and drawn image information. The photographed date and time information indicates the date and time at which the wide angle image 60 identified by the corresponding image ID was photographed.

The object information is information concerning an object for which the server apparatus 12 analyses the wide angle image 60. The object may be a living thing, or a nonliving thing. If the object is a living thing, the object is, for example, a person, an animal (a dog, a cat, or the like), a plant, a cell, or the like. If the object is a nonliving thing, the object is, for example, a book shelf, a desk, a vehicle, a signboard, or the like.

According to the first embodiment, as one example, the object is assumed as being a person. Note that, which object is used in the object information may be previously set. Also, the type of the object may be made to be changeable by the user's instruction that is input.

According to the first embodiment, the object information includes the number of persons appearing in the wide angle image 60, the specific area ID, the number of persons appearing in the specific area, the person IDs, and the person position area IDs.

The "number of persons in wide angle image" in the image management DB 12C indicates the number of persons appearing in the wide angle image 60 identified by the corresponding image ID.

The "specific area ID" is identification information of a predetermined specific area. The specific area is a specific area in the wide angle image 60. The specific area is, for example, an area to be checked continuously in a time-series manner, an area having high priority to analyze, or the like. The specific area is expressed by, for example, the position area information concerning the wide angle image 60.

TABLE 3A

| PHOTOGRAPHING APPARATUS ID | SPECIFIC AREA ID | POSITION AREA INFORMATION |
|---|---|---|
| t001 | sp1001 | (x122, y121, z121,, w121, h121) |
| t001 | sp1002 | (x225, y122, z121,, w124, h121) |
| t001 | sp2001 | (x21, y121, z321,, w221, h121) |

TABLE 3B

| POSITION AREA ID | POSITION AREA INFORMATION |
|---|---|
| pos0001 | (x111, y111, z111,, w111, h111) |
| pos0002 | (x121, y121, z121,, w121, h121) |
| pos0003 | (x121, y121, z121,, w121, h121) |
| pos0004 | (x221, y122, z121,, w124, h121) |
| pos0005 | (x321, y121, z321,, w221, h121) |
| pos0006 | (x231, y321, z121,, w121, h121) |
| pos0007 | (x421, y121, z121,, w121, h121) |

According to the first embodiment, the storage unit 12B stores a specific area management DB 12G. TABLEs 3A and 3B illustrate one example of data configurations of the specific area management DB 12G and a position management DB 12F. TABLE 3A illustrates one example of a data configuration of the specific area management DB 12G. The specific area management DB 12G is a database for managing specific areas. As illustrated in TABLE 3A, the specific area management DB 12G associates the photographing apparatus ID, the specific area ID, and the position area information with each other.

The "position area information" in the specific area management DB 12G indicates the position and the extent of the specific area identified by the corresponding specific area ID defined in the wide angle image 60 photographed by the photographing apparatus 14 identified by the corresponding photographing apparatus ID. According to the first embodiment, the position area information includes the three-dimensional coordinate information (x, y, z) of one corner of four corners of the rectangular specific area, and the extent of the specific area (i.e., the width and the height (w, h) of the specific area), in the wide angle image 60 assumed as having a three-dimensional sphere shape.

According to the first embodiment, it is assumed that the position area information in the specific area management DB 12G is set for each photographing apparatus 14 by the user. Note that the information registered with the specific area management DB 12G can be changed appropriately by the user's instruction that is input, for example.

Returning to TABLE 2, the "number of persons in specific area" in the image management DB 12C indicates the number of persons appearing in the specific area identified by the corresponding specific area ID in the wide angle image 60 identified by the corresponding image ID.

The "person ID" is identification information of a person. The server apparatus 12 may determine the person ID by, through a known image processing technology, determining that persons having respective values of person feature information indicating features of the persons within a predetermined range as the same persons.

The "person position area ID" in the image management DB 12C is identification information for identifying the position and the extent (of the area) of the person identified by the corresponding person ID in the wide angle image 60.

According to the first embodiment, the position area information corresponding to the person position area ID is registered with a position management DB 12F. TABLE 3B illustrates one example of a data configuration of the position management DB 12F. The position management DB 12F associates the position area IDs with the position area information. The "position area information" in the position area ID is information indicating the position area in the wide angle image 60.

Figure 14:
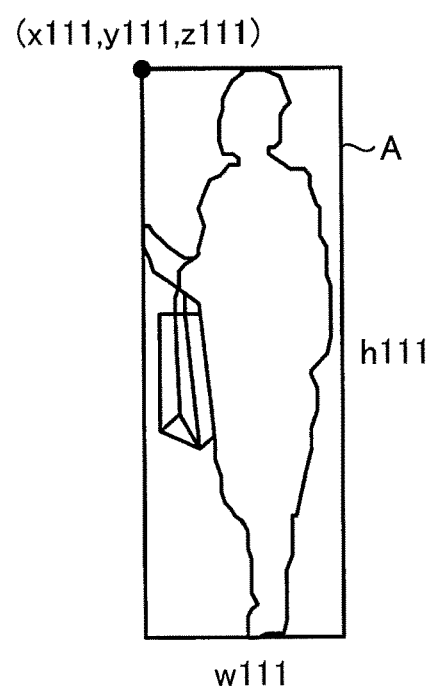
FIG. 14 illustrates one example of position area information according to the first embodiment.

FIG. 14 illustrates the position area information. According to the first embodiment, the position area information includes the three-dimensional coordinate information (x, y, z) of one corner of four corners of a rectangular area A enclosing a person or a drawn image, and the extent (the width and the height (w, h)) of the area A, in the wide angle image 60 assumed as having a three-dimensional sphere shape.

Returning to TABLE 2, the "drawn image information" indicates an image drawn in the wide angle image 60 identified by the corresponding image ID. According to the first embodiment, the drawn image information includes a drawn image ID, the drawn image, and the position area ID of the drawn image. The drawn image ID is used to identify the corresponding drawn image. The drawn image is drawn by an operation performed by the user of the information processing terminal 18 in the wide angle image 60. The drawn image is, for example, images such as letters/characters, lines, or the like, handwritten by the user; images such as previously generated letters/characters, lines, or the like. The drawn image may be called a sketch.

Note that, as identification information of the drawn image, information indicating a feature of the drawn image may be used instead of the above-mentioned drawn image ID. For example, information indicating a feature extractable through known image processing from the color, the shape, or the like, of the drawn image may be used as the drawn image ID. The position area ID of the drawn image included in the drawn image information is information for identifying the position area information indicating the position and the extent of the corresponding drawn image in the wide angle image 60. As the position area information corresponding to the position area ID, the position area information in the position management DB 12F (see TABLE 3B) may be used.

The respective databases stored in the storage unit 12B are updated by the control unit 12A of the server apparatus 12 appropriately.

Returning to FIG. 12, the control unit 12A of the server apparatus 12 will now be described. The control unit 12A controls the server apparatus 12. The control unit 12A is implemented by the CPU 501, the ROM 502, and the RAM 503 (see FIG. 9). Note that, the control unit 12A may also be implemented by circuits, or the like.

A program for carrying out various processes of the server apparatus 12 is previously written in the ROM 502 or the like.

The program for carrying out various processes of the server apparatus 12 may have a form of a file installable or executable in the server apparatus 12, and may be provided after being stored in a computer readable recording medium such as a CD-ROM, a flexible disk (FD), a CD-R, a DVD (Digital Versatile Disk), or the like.

Also, the program for carrying out various processes of the server apparatus 12 may be stored in a computer connected to a network such as the Internet, and may be downloaded via the network. Also, the program for carrying out various processes of the server apparatus 12 may be provided or distributed via a network such as the Internet.

The control unit 12A includes a transmission and receiving unit 12K, a feature information extraction unit 12I, a thumbnail generation unit 12M, a storage control unit 12P, a reception unit 12Q, an analysis unit 12R, a result image generation unit 12T, a display information generation unit 12S, and a base image identification unit 12J. The transmission and receiving unit 12K includes a transmission unit 12L and a receiving unit 12H. The display information generation unit 12S includes an initial image setting unit 12V, an initial viewpoint direction setting unit 12W, and an embedding unit 12X.

All or some of the transmission and receiving unit 12K, the transmission unit 12L, the receiving unit 12H, the feature information extraction unit 12I, the thumbnail generation unit 12M, the storage control unit 12P, the reception unit 12Q, the analysis unit 12R, the result image generation unit 12T, the display information generation unit 12S, the initial image setting unit 12V, the initial viewpoint direction setting unit 12W, the embedding unit 12X, and the base image identification unit 12J may be implemented as a result of, for example, a processing unit such as the CPU 501 (see FIG. 9) executing programs (i.e., software). Also, these units may be implemented by hardware such as ICs (Integrated Circuits), or by a combination of software and hardware.

The transmission and receiving unit 12K transmits data to and receives data from the photographing apparatus 14 and the information processing terminal 18 via the network 20.

The transmission and receiving unit 12K includes the transmission unit 12L and the receiving unit 12H. The receiving unit 12H receives, from the photographing apparatus 14, through the communications terminal 15 via the network 20, the wide angle images 60 and the related information 61. The receiving unit 12H outputs the received wide angle images 60 and related information 61 to the storage control unit 12P, the feature information extraction unit 12I, and the thumbnail generation unit 12M.

Also, the receiving unit 12H receives, from the information processing terminal 18, the drawn images drawn by the user as a result of the user operating the information processing terminal 18, the image IDs of the wide angle images 60 in which the drawn images were drawn, and the position area information indicating the positions and areas of the drawn images in the corresponding wide angle images 60. The receiving unit 12H outputs the received drawn images, image IDs, and position area IDs corresponding to the position area information to the storage control unit 12P and the feature information extraction unit 12I.

The storage control unit 12P stores various sorts of data in the storage unit 12B, and reads various sorts of data from the storage unit 12B.

After the storage control unit 12P receives, from the receiving unit 12H, the wide angle images 60 and the related information 61, the storage control unit 12P stores the wide angle images 60 and the related information 61 in the storage unit 12B. In more detail, the storage control unit 12P registers the received wide angle images 60 with the image management DB 12C (see TABLE 2), gives the image IDs to the wide angle images 60, and registers the image IDs with the image management DB 12C. Also, the storage control unit 12P associates the photographing apparatus IDs and the photographed date and time information included in the related information 61 with the image IDs, and registers the associated data with the image management DB 12C.

The feature information extraction unit 12I extracts the feature information from the wide angle images 60 and the related information 61 received through the receiving unit 12H from the photographing apparatus 14. According to the first embodiment, it is assumed that the feature information includes the photographed date and time information, the object information, and the drawn image information that are thus extracted. Because the definition of the feature information has been already made, duplicate description will be omitted. Note that, the feature information extraction unit 12I may extract information, indicating features of the wide angle images 60, extractable through image analysis on the wide angle images 60. The feature information is not limited to the feature information illustrated in TABLE 2.

Actually, the feature information extraction unit 12I carries out image analysis on the received wide angle images 60, to extract the number of persons appearing in the wide angle image 60. The feature information extraction unit 12I may use a known person recognition technology to extract the persons from the wide angle image 60 and calculate the number of the extracted persons.

Also, the feature information extraction unit 12I calculates the number of persons appearing in the specific area of the received wide angle image 60. In more detail, the feature information extraction unit 12I reads the specific area ID corresponding to the photographing apparatus ID photographing the received wide angle image 60 from the specific area management DB 12G (see TABLE 3A).

With the specific area management DB 12G, the information indicating the specific areas in the wide angle images photographed by the photographing apparatuses 14 identified by the photographing apparatus IDs are previously registered for the respective photographing apparatuses 14. Note that the respective sets of information registered by the user with the specific area management DB 12G can be changed, added, or the like, by the user appropriately thorough operation instructions that are input by the user, or the like.

Then, the feature information extraction unit 12I identifies the position area information corresponding to the specific area ID that has been read from the specific area management DB 12G. The feature information extraction unit 12I calculates the number of the persons appearing in the specific area in the received wide angle image 60 indicated by the identified position area information.

Also, the feature information extraction unit 12I gives the person IDs to the respective persons appearing in the wide angle image 60. Note that, the feature information extraction unit 12I uses a known image recognition technology or the like to gives the same person IDs to the persons determined as the same persons from among the plurality of wide angle image 60s and in each wide angle image 60. For example, the feature information extraction unit 12I may give the same person IDs to the persons having the person feature amounts, determined using the colors, the shapes, the parts (for example, the faces, the eyes, or the like) to be used for person identification, or the like, similar to each other within a predetermined range.

Also, the feature information extraction unit 12I determines the corresponding position area IDs for the respective persons corresponding to the position areas in the wide angle image 60. Actually, each time when the feature information extraction unit 12I extracts the value of the position area information concerning the wide angle image 60, the feature information extraction unit 12I registers the value as the position area information in the position management DB 12F (see TABLE 3B). Then, the feature information extraction unit 12I gives the new position area ID to the newly registered position area information, associates the position area ID with the position area information, and registers the associated information with the position management DB 12F. Also, the feature information extraction unit 12I extracts the registered position area ID as the person position area ID corresponding to the person ID of the corresponding person.

Then, the feature information extraction unit 12I outputs the object information (the number of persons in the wide angle image 60, the specific area ID, the number of persons in the specific area, the person IDs, and the person position area IDs) extracted from the received wide angle image 60, and the image ID of the wide angle image 60, to the storage control unit 12P. The storage control unit 12P associates the object information received from the feature information extraction unit 12I with the image ID, and registers the associated information with the image management DB 12C.

Also, the feature information extraction unit 12I outputs the photographed date and the time information and the image ID of the wide angle image 60 received together with the wide angle image 60 to the storage control unit 12P. The storage control unit 12P associates the received photographed date and time information with the received image ID, and registers the associated information with the image management DB 12C (see TABLE 2).

As a result, each time when the feature information extraction unit 12I receives the new wide angle image 60 and the related information 61 from the photographing apparatus 14, the feature information extraction unit 12I extracts the photographed date and time information and the object information. Then, the feature information extraction unit 12I registers the extracted photographed date and time information and object information with the image management DB 12C of the storage unit 12B through the storage control unit 12P.

Also, the feature information extraction unit 12I receives, from the receiving unit 12H, the drawn image drawn by the user through the user's operation performed on the information processing terminal 18, the image ID of the wide angle image 60 in which the drawn image was drawn, and the position area information of the drawn image. The feature information extraction unit 12I outputs the received drawn image, image ID, and position area information to the storage control unit 12P.

The storage control unit 12P gives the drawn image ID to the drawn image received from the feature information extraction unit 12I, associates the drawn image ID, the received drawn image, and the position area ID corresponding to the received position area information of the drawn image, with each other, and registers the associated information with the image management DB 12C (see TABLE 2). The position area ID corresponding to the position area information of the drawn image may be acquired as a result of reading the position area ID corresponding to the position area information from the position management DB 12F (see TABLE 3B).

Thus, each time of receiving from the photographing apparatus 14 the wide angle image 60 and the related information 61, or receiving the drawn image from the information processing terminal 18, the feature information extraction unit 12I extracts the feature information, and updates the image management DB 12C.

The thumbnail generation unit 12M generates the thumbnail image of the wide angle image 60 received from the receiving unit 12H. A known method may be used to generate the thumbnail image. For example, the thumbnail generation unit 12M extracts a part of the wide angle image 60. Then, the thumbnail generation unit 12M may acquire the thumbnail image as a low resolution image acquired from generating the low resolution image from the extracted part.

The thumbnail generation unit 12M outputs the generated thumbnail image and the image ID of the wide angle image 60 used to generate the thumbnail image to the storage control unit 12P. The storage control unit 12P associates the thumbnail image received from the thumbnail generation unit 12M with the received image ID, and registers the associated information with the image management DB 12C (see TABLE 2).

The receiving unit 12H receives, from the information processing terminal 18, an analysis result acquisition request. The analysis result acquisition request requests to acquire an analysis result concerning a plurality of wide angle images 60.

The analysis result acquisition request includes a base ID, analysis content information, and classification conditions.

The base ID included in the analysis result acquisition request is identification information for the base B where the photographing apparatus 14 that photographed the wide angle image 60 to be analyzed is installed. That is, the base ID of the analysis result acquisition request indicates that the wide angle images 60 photographed by the respective photographing apparatuses 14 installed in the base B identified by the base ID are to be analyzed.

Thus, the base ID included in the analysis result acquisition request indicates the wide angle images 60 to be analyzed. Note that, the analysis result acquisition request may be, instead of or in addition to the base ID, the photographing apparatus IDs and/or the image IDs. In this case, the server apparatus 12 may determine the one or more of the wide angle images 60 identified by the base ID, the photographing apparatus IDs, and the image IDs, as the wide angle images to be analyzed.

Note that, according to the first embodiment, it will be assumed that the analysis result acquisition request includes the base ID as information for determining the wide angle images to be analyzed, as one example.

The analysis content information indicates analysis contents for a wide angle image 60. According to the first embodiment, the analysis contents include the number of persons appearing in the wide angle image 60; the number of persons appearing in the specific area of the wide angle image 60; the number of drawn images drawn in the wide angle image 60; or the number of specific persons appearing in the wide angle image 60. Note that, the analysis contents may indicate other contents.

Figure 15:
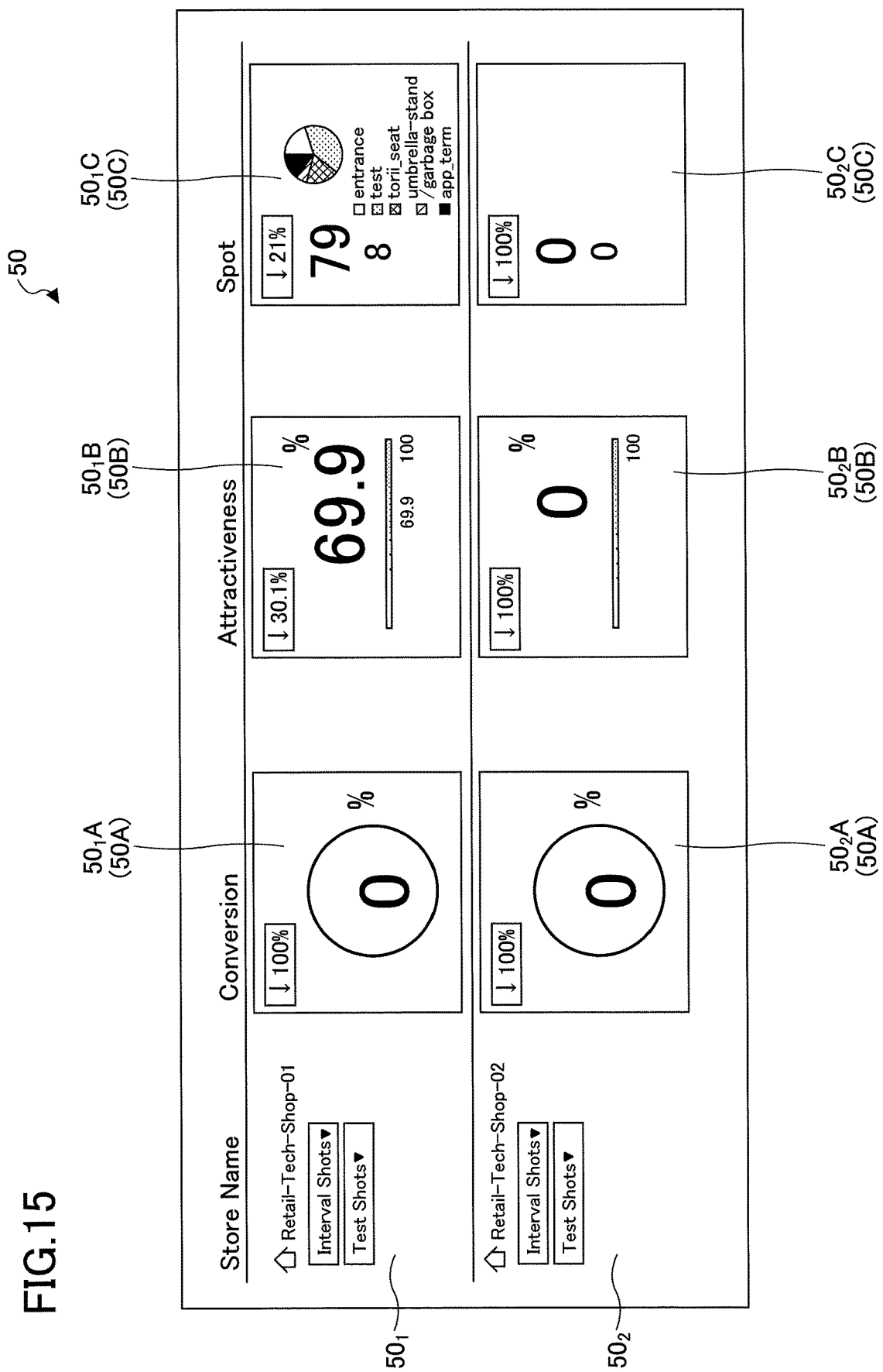
FIG. 15 is a schematic diagram illustrating one example of an operation screen page displayed on the information processing terminal according to the first embodiment.

According to the first embodiment, the analysis content information indicating the analysis contents is determined by the user who operates the information processing terminal 18. For example, the user operates the information processing terminal 18 to input the base ID and the analysis content information. FIG. 15 is a schematic diagram illustrating one example of an operation screen page 50 displayed on the information processing terminal 18. For example, the information processing terminal 18 displays the operation screen page 50 on the display 508 (display unit 18G).

The operation screen page 50 includes fields for a list 50 of the selectable base IDs $50_1$ and $50_2$, and a plurality of items of analysis content information 50A-50C. The user selects, from the operation screen page 50, the line of the desired base ID and the display field for the analysis content information (one of the display fields $50_1$A-$50_1$C or one of the display fields $50_2$A-$50_2$C). For example, by selecting the display field $50_1$A, it is possible to select the base B identified by the base ID "s001", and the analysis content information "the number of persons". The information processing terminal 18 transmits the analysis result acquisition request including the selected base ID and analysis content information to the server apparatus 12.

The above-mentioned classification conditions included in the analysis result acquisition request indicate classification conditions to be used to classify the plurality of wide angle image 60 into a plurality of groups for analysis.

The classification conditions include, for example, a classification item of at least one of the photographed date and time; and the photographed place. Note that, the classification items included in the classification conditions may be items with which the plurality of wide angle image 60 can be classified, and are not limited to the photographed date and time and the photographed place. For example, the classification conditions may include the specific area as a classification item.

If the classification conditions include the classification items of the photographed date and time and the photographed place, the control unit 12A (see FIG. 12) of the server apparatus 12 analyzes one or more wide angle images 60 belonging to each of the groups acquired from classifying the plurality of wide angle images 60, for each photographed date and time and for each photographed place (details will be described later).

Note that, the photographed date and time may be information having periods of time. That is, the photographed date and time may include photographed dates and times indicating the analysis extent (between the photographing start time and date and the photographing end time and date), and a period indicating an analysis unit (that may be referred to as a time scale, hereinafter). The time scale is, for example, each ten minutes, each two hours, each ten days, or the like.

The photographed place may be defined using the photographing apparatus 14, or may be defined using the base B. According to the first embodiment, it will be assumed that the photographed place is defined using the photographing apparatus 14, as one example. In this case, the control unit 12A analyzes one or more wide angle images 60 belonging to each of the groups acquired from classifying the plurality of wide angle images 60, for each time scale (each period of the analysis unit) in the photographed dates and times (between the photographing start date and time and the photographing end date and time) indicating the analysis extent, and for each photographing apparatus 14 placed in the specific base B.

Note that, the user can set desired classification items defined using the classification conditions, by operating the information processing terminal 18. Actually, the user may set the base B as the classification conditions, instead of each photographing apparatus 14. Also, the user may set any time scale.

Note that, the analysis result acquisition request may further include comparison instruction information. The comparison instruction information indicates a request to acquire such an analysis result that the analysis results for the respective groups are expressed for each group for which some classification items defined using the classification conditions are the same. For example, the comparison instruction information request to acquire such an analysis result that a plurality of wide angle images 60 photographed by a plurality of photographing apparatuses 14 for each photographed date and time are analyzed, for respective groups different in the classification item "photographed date and time" and the same in the classification item "photographing apparatus 14".

The user who operates the information processing terminal 18 inputs the base ID, the analysis content information, the classification conditions, the comparison instruction information, or the like, by operating the information processing terminal 18. As a result, the information processing terminal 18 transmits the analysis result acquisition request including the base ID, the analysis content information, the classification conditions, the comparison instruction information, or the like, to the server apparatus 12.

After receiving the analysis result acquisition request, the receiving unit 12H of the server apparatus 12 outputs the request to the reception unit 12Q. The reception unit 12Q receives, the analysis result acquisition request from the information processing terminal 18 through the receiving unit 12H. That is, the reception unit 12Q receives the base ID, the analysis content information, and the classification conditions from the information processing terminal 18. Also, the reception unit 12Q may receive the analysis result acquisition request further including the comparison instruction information. Note that, the reception unit 12Q may receive the analysis result acquisition request from the operation unit (i.e., the keyboard 511 and the mouse 512 (see FIG. 9)) of the server apparatus 12.

The reception unit 12Q outputs the received analysis result acquisition request to the analysis unit 12R. The analysis unit 12R analyzes the plurality of wide angle images 60 based on the analysis result acquisition request.

According to the first embodiment, the analysis unit 12R reads the base ID, the analysis content information, and the classification conditions included in the analysis result acquisition request received from the reception unit 12Q. If the analysis result acquisition request further includes the comparison instruction information, the analysis unit 12R further reads the comparison instruction information.

Then, the analysis unit 12R analyses, for the analysis contents indicated by the analysis content information that has been read, all the wide angle images 60 photographed by the photographing apparatuses 14 installed in the base B identified by the base ID.

At this time, it is assumed that the analysis result acquisition request received from the reception unit 12Q includes the classification conditions. In this case, the analysis unit 12R classifies all the wide angle images 60 photographed by the photographing apparatuses 14 installed in the base B identified by the read base ID into a plurality of groups according to the classification conditions. Then, the analysis unit 12R analyses the wide angle image 60 for the plurality of wide angle images 60 belonging to each of the groups acquired from the classification.

For example, it is assumed that the classification conditions include, as the classification items, the photographed date and time and the photographed place. In this case, the analysis unit 12R classifies all the wide angle images 60 photographed by the photographing apparatuses 14 installed in the base B identified by the read base ID into a plurality of group for each photographed date and time and for each photographing apparatus 14.

According to the first embodiment, the analysis unit 12R analyses the plurality of wide angle images 60 for each of the groups classified for the wide angle images 60 photographed by each of the photographing apparatuses 14 installed in the base B identified by the base ID, for each photographed date and time expressed by each time scale indicated by the classification item.

In more detail, the analysis unit 12R analyzes the plurality of wide angle images 60 belonging to each of the groups acquired from classifying the plurality of wide angle images 60 for each time scale (each period indicating the analysis unit) in the photographed dates and times (between the photographing start date and the time and photographing end date and time) indicating the analysis extent, and for each photographing apparatus 14.

At this time, the analysis unit 12R analyses, for the analysis contents indicated by the received analysis content information, the plurality of wide angle images 60 belonging to each group.

For example, it is assumed that the received analysis contents indicated by the received analysis content information include the number of persons appearing in the wide angle image 60. In this case, the analysis unit 12R analyzes the plurality of wide angle images 60 belonging to each group, for the number of persons appearing in the wide angle images 60. In more detail, the analysis unit 12R calculates the total number of persons appearing in the respective wide angle images 60 belonging to each group.

Actually, the analysis unit 12R identifies the respective image IDs of the plurality of wide angle images 60 belonging to the group, from the image management DB 12C (see TABLE 2). Then, from the feature information corresponding to the identified image IDs, the analysis result according to the analysis contents indicated by the analysis content information is acquired.

For example, the analysis unit 12R reads, from the feature information corresponding to the respective wide angle images 60 belonging to the group, the number of persons appearing in each of the wide angle images 60 belonging to the group. Then, the analysis unit 12R calculates the total of the read respective numbers of persons, for each group, to acquire the analysis result corresponding to the group (i.e., in this case, the total number of persons appearing in the respective wide angle images 60).

For example, it is assumed that the received analysis contents indicated by the received analysis content information include the number of persons appearing in the specific area of the wide angle image 60. In this case, the analysis unit 12R analyzes the plurality of wide angle images 60 belonging to each group, for the number of persons appearing in the specific area. In more detail, the analysis unit 12R calculates the numbers of persons appearing in the specific areas of the respective wide angle images 60 belonging to each group.

Actually, the analysis unit 12R identifies the respective image IDs of the plurality of wide angle images 60 belonging to the group, from the image management DB 12C (see TABLE 2). Then, from the feature information corresponding to the identified image IDs, the number of persons corresponding to the specific area ID of each of the plurality of wide angle images 60 belonging to the group is read. Then, the analysis unit 12R calculates the total of the read respective numbers of persons, for each group, to acquire the analysis result corresponding to the group (i.e., in this case, the total number of persons appearing in the specific areas of the respective wide angle images 60).

Also, for example, it is assumed that the received analysis contents indicated by the analysis content information is the number of drawn images drawn in the wide angle image 60. In this case, the analysis unit 12R analyzes the plurality of wide angle images 60 belonging to each group, for the number of drawn images drawn in each of the wide angle images 60. In more detail, the analysis unit 12R calculates the total of the numbers of drawn images drawn in the respective wide angle images 60 belonging to each group.

Actually, the analysis unit 12R identifies the respective image IDs of the plurality of wide angle images 60 belonging to the group, from the image management DB 12C (see TABLE 2). Then, from the feature information corresponding to the identified image IDs, the number of drawn images drawn in each of the plurality of wide angle images 60 belonging to the group is calculated. Then, the analysis unit 12R calculates the total of the calculated respective numbers of drawn images for each group, to acquire the analysis result corresponding to the group (i.e., in this case, the total number of drawn images included in the respective wide angle images 60).

For example, it is assumed that the received analysis contents indicated by the received analysis content information include the number of specific persons appearing in the wide angle image 60. In this case, the analysis unit 12R determines, for the plurality of wide angle images 60 belonging to each group, whether a specific person appears. The specific person is indicated by the specific feature information. For example, the analysis unit 12R may receive, as the analysis content information included in the analysis result acquisition request, the feature information of the specific person from the information processing terminal 18. Then, the analysis unit 12R identifies the person IDs corresponding to the feature information that is the same as or similar to the received feature information. The analysis unit 12R then calculates, for the plurality of wide angle images 60 belonging to each group, the total number of the specific persons appearing in the respective wide angle images 60.

Actually, the analysis unit 12R identifies the respective image IDs of the plurality of wide angle images 60 belonging to the group, from the image management DB 12C (see TABLE 2). Then, from the feature information corresponding to the identified image IDs, the wide angle images 60 including the identified person IDs are identified from among the plurality of wide angle images 60 belonging to the group. Then, the analysis unit 12R calculates, for each group, the total of the respective numbers of persons identified by the identified person IDs included in the identified wide angle images 60. As a result, the analysis unit 12R calculates the analysis result corresponding to the group (i.e., in this case, the number of specific persons appearing in the respective wide angle images 60).

Thus, the analysis unit 12R analyzes the plurality of wide angles image 60 according to the acquired analysis result acquisition request. Then, the analysis unit 12R outputs the analysis result to the result image generation unit 12T.

The result image generation unit 12T generates the result image indicating the analysis result received from the analysis unit 12R.

The result image indicates the analysis result. The result image expresses the analysis result by a graph, a set (as a mathematical term), dispersion, or the like. The graph is, for example, a bar graph, a pie graph, a band graph, a line graph, a scatter graph, a box-and-whisker plot, a histogram, a Pareto chart, or the like. According to the first embodiment, the result image is assumed as a bar graph indicating the analysis result, as one example.

Actually, the result image generation unit 12T generates the result image including a plurality of analysis result images that indicate the analysis for the respective groups. According to the first embodiment, the result image is generated where the analysis result images corresponding to the respective groups are expressed by a bar graph.

FIGS. 16-19 are schematic diagrams illustrating examples of the result images 70. FIGS. 16-19 illustrate, as the result images 70, the result images 71-74 corresponding to the respective items of the analysis content information.

Figure 16:
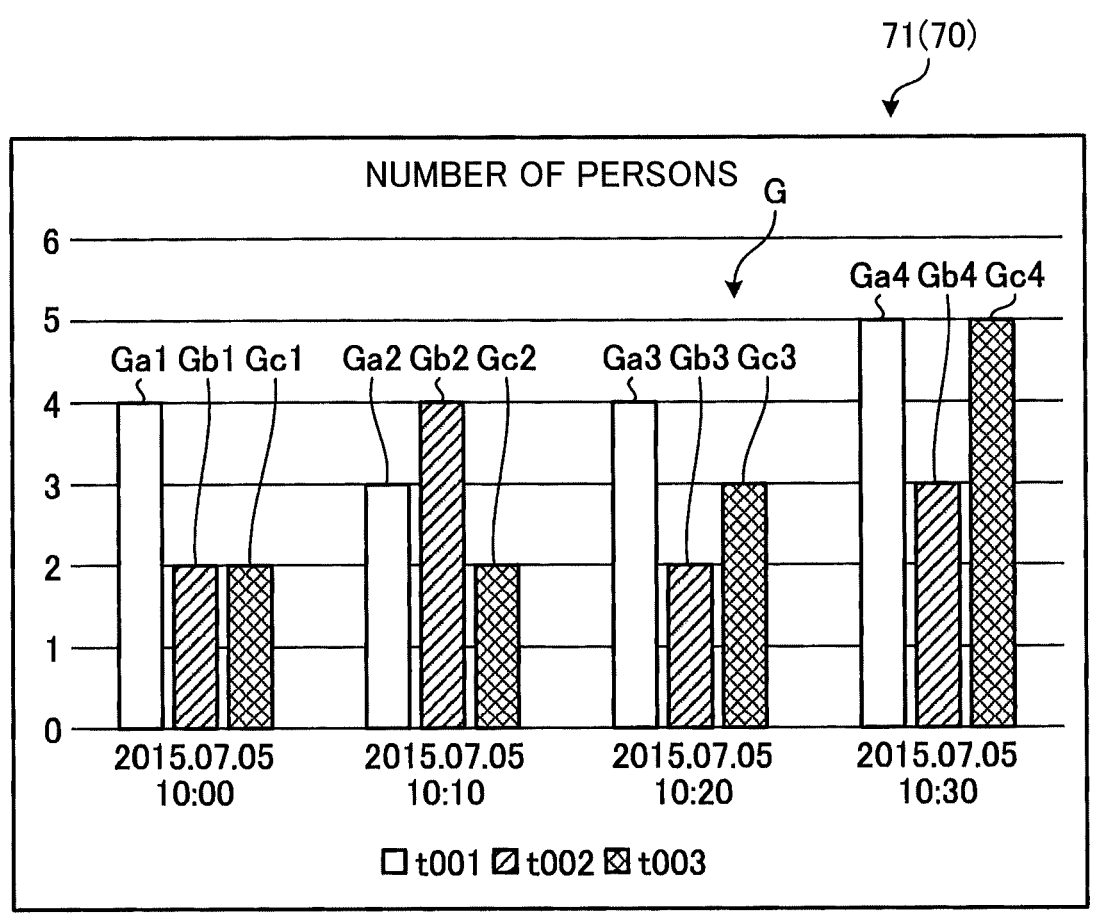
FIGS. 16-20 are schematic diagrams illustrating examples of a result image according to the first embodiment.

FIG. 16 is a schematic diagram illustrating one example of the result image 71 for a case where the analysis content information is "the number of persons appearing in the wide angle image 60".

Note that, FIG. 16 illustrates a case where the respective photographing apparatuses 14 placed in the base B identified by the base ID included in the analysis result acquisition request are identified by the photographing apparatuses IDs "t001" "t002", "t003" respectively. Also, FIG. 16 illustrates a case where the classification conditions included in the analysis result acquisition request include the respective classification items of the photographed date and time and photographing apparatus 14. Also, the photographed date and time as the classification conditions indicates, in this example, the time scale "10 minutes" in the photographed dates and times (between the photographing start date and the time: 2015/07/05 10:00 and the photographing end date and time: 2015/07/05 10:40) indicating the analysis extent.

As illustrated in FIG. 16, the result image 71 illustrates the analysis results of the number of persons appearing in the wide angle images 60 for each of the groups classified according to the classification conditions of the photographed date and time and the photographed place (photographing apparatus 14). In other words, the result image 71 includes an analysis result image G indicating the analysis results for each of the groups (i.e., for each photographed date and time and each photographing apparatus 14).

In FIG. 16, the analysis result images Ga1-Ga4 indicate the respective analysis results of the numbers of persons for the wide angle images 60 photographed by the photographing apparatus 14 identified by the photographing apparatus ID "t001", in each time scale "10 minutes" from the photographing start date and time "2015/07/05 10:00". The analysis result images Gb1-Gb4 indicate the respective analysis results of the numbers of persons for the wide angle images 60 photographed by the photographing apparatus 14 identified by the photographing apparatus ID "t002", in each time scale "10 minutes" from the photographing start date and time "2015/07/05 10:00". The analysis result images Gc1-Gc4 indicate the respective analysis results of the numbers of persons for the wide angle image 60 photographed by the photographing apparatus 14 identified by the photographing apparatus ID "t003", in each time scale "10 minutes" from the photographing start date and time "2015/07/05 10:00".

Figure 17:
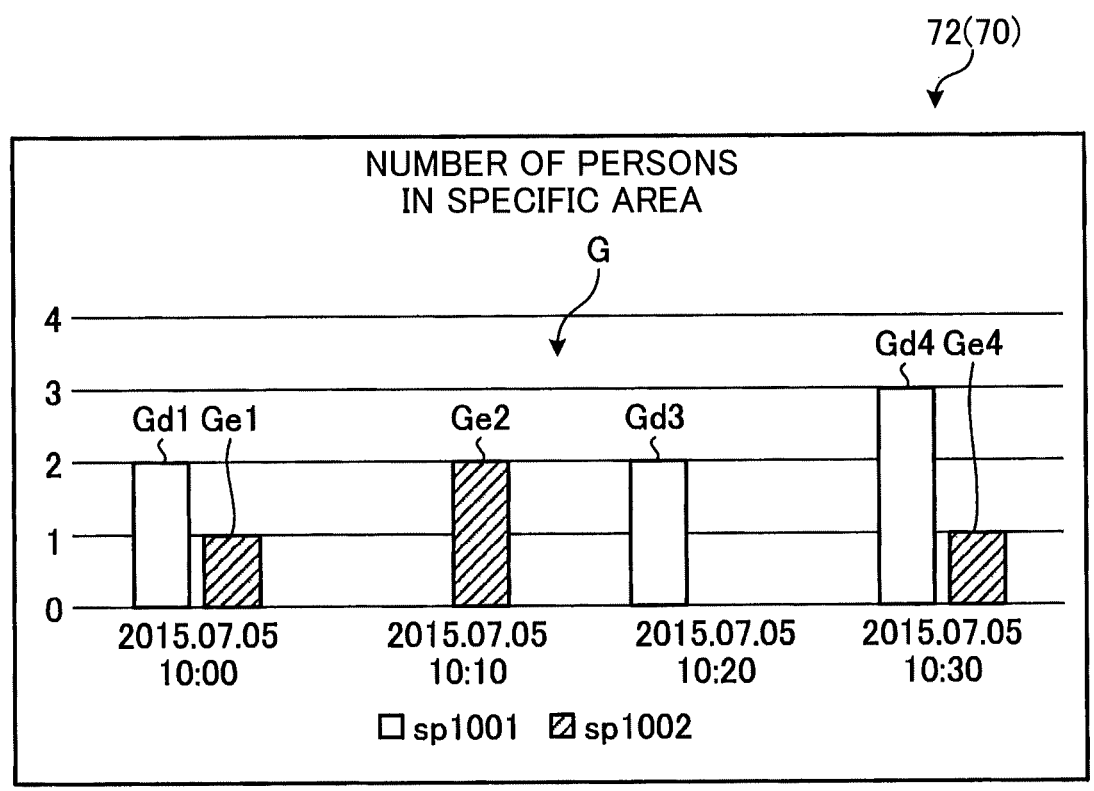

FIG. 17 is a schematic diagram illustrating one example of the result image 72 for a case where the analysis content information is "the number of persons appearing in the specific area of the wide angle image 60".

Note that, FIG. 17 illustrates a case where the photographing apparatus 14 placed in the base B identified by the base ID included in the analysis result acquisition request is identified by the photographing apparatus ID "t001". Also, FIG. 17 illustrates a case where the classification conditions included in the analysis result acquisition request include the classification items of each photographed date and time and each specific area. Also, the photographed date and time as the classification conditions indicate, in this example, the time scale "10 minutes" in the photographed dates and times (between the photographing start date and the time: 2015/07/05 10:00 and the photographing end date and time: 2015/07/05 10:40) indicating the analysis extent.

As illustrated in FIG. 17, the result image 72 illustrates the analysis results of the number of persons appearing in the specific areas of the wide angle images 60 for each of the groups classified according to the classification conditions of the photographed date and time and the specific area. In other words, the result image 72 includes an analysis result image G indicating the analysis results for each of the groups (i.e., for each photographed date and time and each specific area).

In FIG. 17, the analysis result images Gd1, Gd3 and Gd4 indicate the respective analysis results of the numbers of persons included in the specific area identified by the specific area ID "sp1001" of the wide angle images 60 photographed by the photographing apparatus 14 identified by the photographing apparatus ID "t001", in each time scale "10 minutes" from the photographing start date and time "2015/07/05 10:00". The analysis result images Ge1, Ge2 and Ge4 indicate the respective analysis results of the numbers of persons included in the specific area identified by the specific area ID "sp1002" of the wide angle images 60 photographed by the photographing apparatus 14 identified by the photographing apparatus ID "t001", in each time scale "10 minutes" from the photographing start date and time "2015/07/05 10:00".

Figure 18:
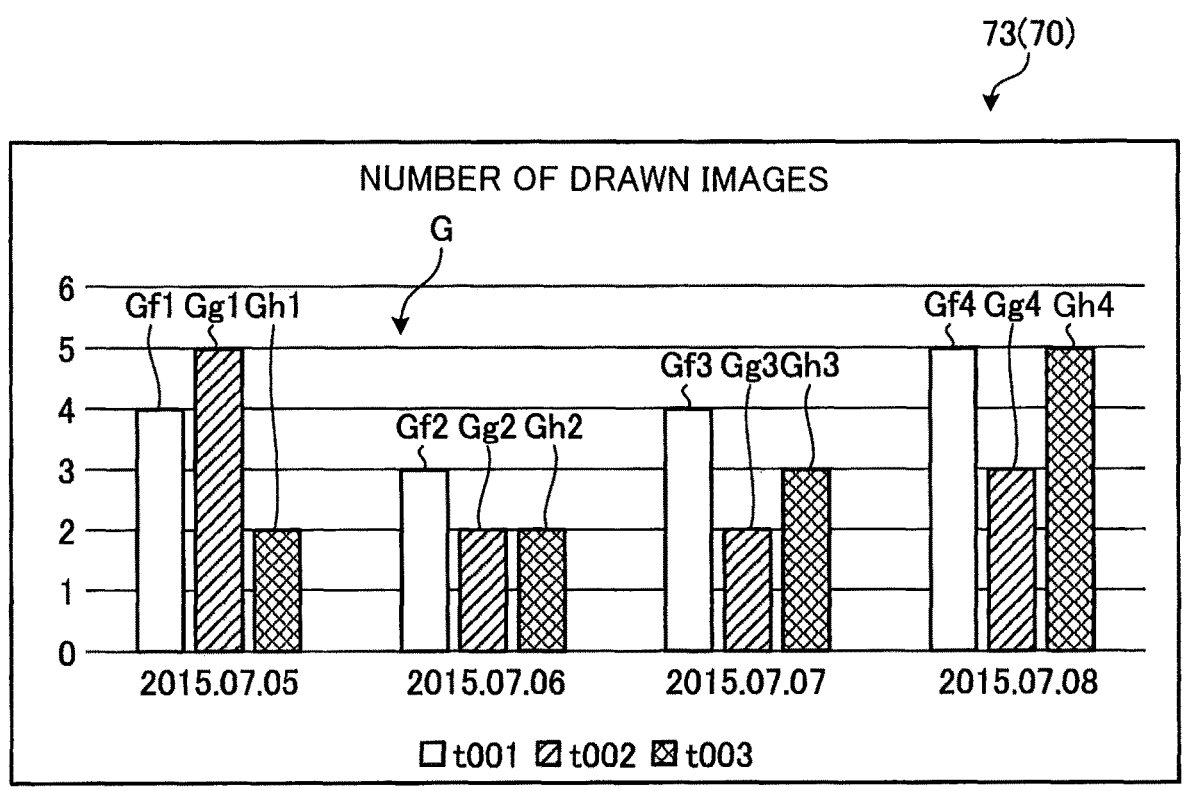

FIG. 18 is a schematic diagram illustrating one example of the result image 73 for a case where the analysis content information is "the number of drawn images drawn in the wide angle image 60".

Note that, FIG. 18 illustrates a case where the respective photographing apparatuses 14 placed in the base B identified by the base ID included in the analysis result acquisition request are identified by the photographing apparatuses IDs "t001", "t002", "t003" respectively. Also, FIG. 18 illustrates a case where the classification conditions included in the analysis result acquisition request include the classification items of the photographed date and time and photographing apparatus 14. Also, the photographed date and time as the classification conditions indicates, in this example, the time scale "1 day" in the photographed dates and times (between the photographing start date and the time: 2015/07/05 and the photographing end date and time: 2015/07/08) indicating the analysis extent.

As illustrated in FIG. 18, the result image 73 illustrates the analysis results of the number of drawn images in the wide angle images 60 for each of the groups classified according to the classification conditions of the photographed date and time and the photographed place (photographing apparatus 14). In other words, the result image 73 includes an analysis result image G indicating the analysis results for each of the groups (i.e., for each photographed date and time and each photographing apparatus 14).

In FIG. 18, the analysis result images Gf1-Gf4 indicate the respective analysis results of the numbers of drawn images for the wide angle images 60 photographed by the photographing apparatus 14 identified by the photographing apparatus ID "t001", in each time scale "1 day" from the photographing start date and time "2015/07/05". The analysis result images Gg1-Gg4 indicate the respective analysis results of the numbers of drawn images for the wide angle images 60 photographed by the photographing apparatus 14 identified by the photographing apparatus ID "t002", in each time scale "1 day" from the photographing start date and time "2015/07/05". The analysis result images Gh1-Gh4 indicate the respective analysis results of the numbers of drawn images for the wide angle images 60 photographed by the photographing apparatus 14 identified by the photographing apparatus ID "t003", in each time scale "1 day" from the photographing start date and time "2015/07/05"

Figure 19:
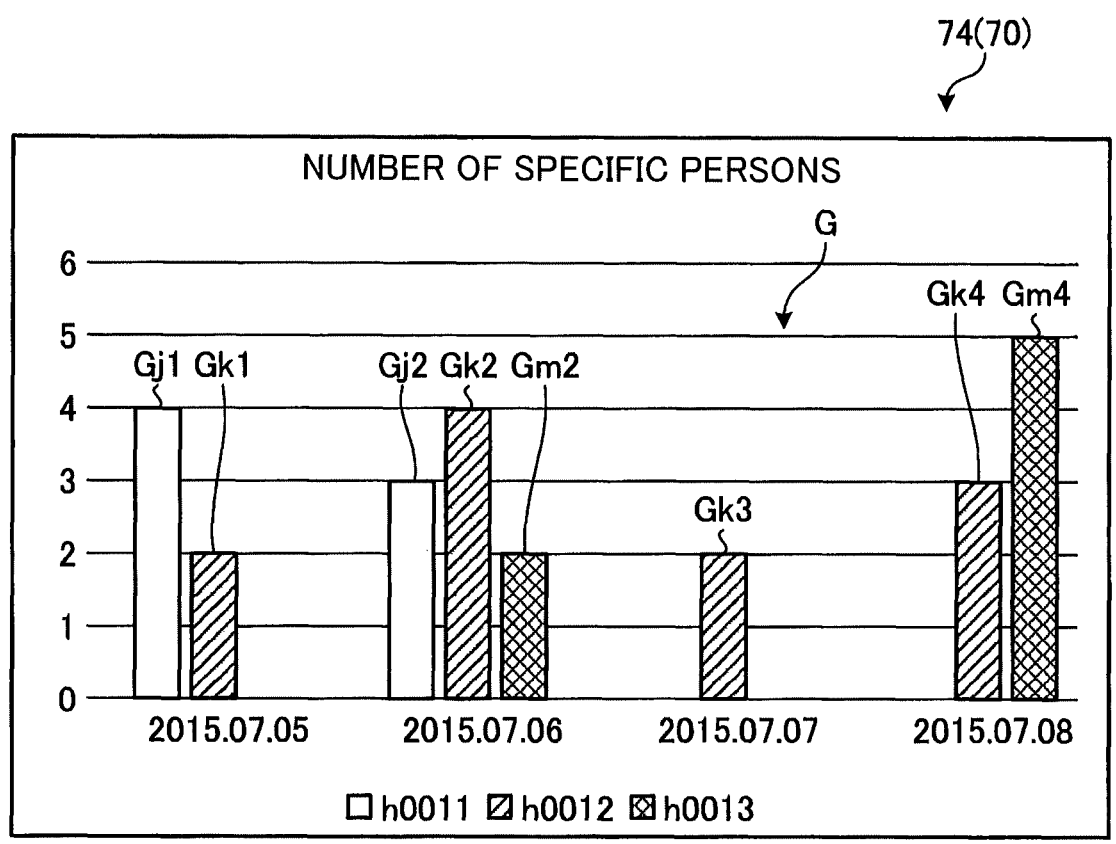

FIG. 19 is a schematic diagram illustrating one example of the result image 74 for a case where the analysis content information is "the number of specific persons appearing in the wide angle image 60".

Note that, FIG. 19 illustrates a case where the photographing apparatus 14 placed in the base B identified by the base ID included in the analysis result acquisition request is identified by the photographing apparatus ID "t001". Also, FIG. 19 illustrates a case where the classification conditions included in the analysis result acquisition request include the classification items of each photographed date and time and each specific person. Also, the photographed date and time as the classification conditions indicates, in this example, the time scale "1 day" in the photographed dates and times (between the photographing start date and the time: 2015/07/05 and the photographing end date and time: 2015/07/08) indicating the analysis extent.

As illustrated in FIG. 19, the result image 74 illustrates the analysis results of the number of specific persons appearing in the wide angle images 60 for each of the groups classified according to the classification conditions of the photographed date and time and the specific person. In other words, the result image 74 includes an analysis result image G indicating the analysis results for each of the groups (i.e., for each photographed date and time and each specific person).

In FIG. 19, the analysis result images Gj1 and Gj2 indicate the respective analysis results of the numbers of specific persons identified by the person ID "h0011" appearing in the wide angle images 60 photographed by the photographing apparatus 14 identified by the photographing apparatus ID "t001", in each time scale "1 day" from the photographing start date and time "2015/07/05". The analysis result images Gk1-Gk4 indicate the respective analysis results of the numbers of specific persons identified by the person ID "h0012" appearing in the wide angle images 60 photographed by the photographing apparatus 14 identified by the photographing apparatus ID "t001", in each time scale "1 day" from the photographing start date and time "2015/07/05". The analysis result images Gm2 and Gm4 indicate the respective analysis results of the numbers of specific persons identified by the person ID "h0013" appearing in the wide angle images 60 photographed by the photographing apparatus 14 identified by the photographing apparatus ID "t001", in each time scale "1 day" from the photographing start date and time "2015/07/05".

Returning to FIG. 12, the result image generation unit 12T thus generates the result image 70 indicating the analysis results received from the analysis unit 12R. The result image generation unit 12T outputs the generated result image 70 and the analysis results of the analysis unit 12R to the display information generation unit 12S.

The display information generation unit 12S generates the display information. The display information is information concerning displaying the wide angle image 60 (the base image) used as a base to derive the analysis result indicated by the result image 70 and the result image 70 (details will be described later).

The display information generation unit 12S includes an initial image setting unit 12V (a first setting unit), an initial viewpoint direction setting unit 12W (a second setting unit), and an embedding unit 12X.

The initial image setting unit 12V is one example of a first setting unit. The initial image setting unit 12V sets, for each of the plurality of groups classified according to the classification conditions, initial image information indicating a wide angle image 60 to be displayed first on the information processing terminal 18 from among the plurality of wide angle images 60 belonging to the group.

For example, the initial image setting unit 12V sets, as the initial image information of the wide angle image 60 to be displayed first, the image ID of the wide angle image 60 having the latest (or oldest) photographed date and time indicated by the photographed date and time information from among the plurality of wide angle images 60 belonging to the group.

According to the first embodiment, the initial image setting unit 12V sets the initial image information for the wide angle images 60 corresponding to each group.

Note that, the initial image setting unit 12V is desired to set the initial image information according to the analysis contents indicated by the analysis content information received by the reception unit 12Q. That is, the initial image setting unit 12V is desired to set the initial image information according to the analysis content information indicating the analysis contents used by the analysis unit 12R.

For example, it is assumed that the analysis contents indicated by the analysis content information are the number of persons appearing in the wide angle image 60. In this case, the initial image setting unit 12V may set, as the initial image information, the image ID of the wide angle image 60 including the greatest (or smallest) number of persons, from among the wide angle images 60 belonging to each group.

Note that, if there are a plurality of wide angle images 60 each including the greatest (or smallest) number of persons, the initial image setting unit 12V may set, as the initial image information, the image ID of the wide angle image 60 having the latest (or oldest) photographed date and time from among these wide angle images 60.

For example, it is assumed that the analysis contents indicated by the analysis content information are the number of persons appearing in the specific area of the wide angle image 60. In this case, the initial image setting unit 12V may set, as the initial image information, the image ID of the wide angle image 60 including the greatest (or smallest) number of persons included in the specific area, from among the wide angle images 60 belonging to each group.

Note that, if there are a plurality of wide angle images 60 each including the greatest (or smallest) number of persons included in the specific area, the initial image setting unit 12V may set, as the initial image information, the image ID of the wide angle image 60 having the latest (or oldest) photographed date and time from among these wide angle images 60.

For example, it is assumed that the analysis contents indicated by the analysis content information are the number of drawn images drawn in the wide angle image 60. In this case, the initial image setting unit 12V may set, as the initial image information, the image ID of the wide angle image 60 where the greatest (or smallest) number of drawn images were drawn, from among one or more wide angle images 60 included in the base images corresponding to each group.

Note that, if there are a plurality of wide angle images 60 in each of which the greatest (or smallest) number of drawn images were drawn, the initial image setting unit 12V may set, as the initial image information, the image ID of the wide angle image 60 having the latest (or oldest) photographed date and time from among these wide angle images 60.

For example, it is assumed that the analysis contents indicated by the analysis content information are the number of specific persons appearing in the wide angle image 60. In this case, the initial image setting unit 12V may set, as the initial image information, the image ID of the wide angle image 60 including the greatest (or smallest) number of specific persons, from among one or more wide angle images 60 included in the base images corresponding to each group.

Note that, if there are a plurality of wide angle images 60 each including the greatest (or smallest) number of specific persons, the initial image setting unit 12V may set, as the initial image information, the image ID of the wide angle image 60 having the latest (or oldest) photographed date and time from among these wide angle images 60.

Thus, the initial image setting unit 12V sets the initial image information for each of the groups classified by the analysis unit 12R.

The initial viewpoint direction setting unit 12W is one example of a second setting unit. The initial viewpoint direction setting unit 12W sets the initial viewpoint direction information indicating the initial viewpoint direction for the wide angle image 60. The initial viewpoint direction is the initial direction of the viewpoint direction.

According to the first embodiment, the initial viewpoint direction setting unit 12W sets the initial viewpoint direction information indicating the initial viewpoint direction for the wide angle image 60 identified by the initial image information that is set by the initial image setting unit 12V. That is, the initial viewpoint direction information is the initial value of the viewpoint direction information.

As described above, according to the first embodiment, the viewpoint direction information includes the three-dimensional coordinate information (x, y, z) of one corner CP of the four corners of the rectangular area S in the wide angle image 60 assumed as having a three-dimensional spherical shape, and the extent (the width and the height (w, h)) of the area S. Thus, it is assumed that, also the initial viewpoint direction information indicates the three-dimensional coordinate information (x, y, z) and the extent (the width and the height (w, h)) of the area S. Note that, the initial viewpoint direction information may also include an angle of view or an angle, and thus, is not limited to including three-dimensional coordinate information and the width and the height.

According to the first embodiment, the initial viewpoint direction setting unit 12W sets, for the wide angle images 60 belonging to each group, the initial viewpoint direction information for the wide angle image 60 to be displayed first indicated by the initial image information.

The initial viewpoint direction setting unit 12W is desired to set the initial viewpoint direction information according to the analysis contents indicated by the analysis content information.

For example, it is assumed that the analysis contents indicated by the analysis content information are the number of persons appearing in the wide angle image 60. In this case, the initial viewpoint direction setting unit 12W sets, as the initial viewpoint direction information, an area where a person is present or an area where the greatest number of persons are present in the wide angle image 60 indicated by the initial image information that is set by the initial image setting unit 12V.

Also, for example, it is assumed that the analysis contents indicated by the analysis content information are the number of persons appearing in the specific area of the wide angle image 60. In this case, the initial viewpoint direction setting unit 12W sets, as the initial viewpoint direction information, an area including the specific area in the wide angle image 60 indicated by the initial image information that is set by the initial image. Note that, if the wide angle image 60 indicated by the initial image information includes a plurality of the specific areas, an area including the specific area where the greatest (or smallest) number of persons are present may be set as the initial viewpoint direction information.

Also, for example, it is assumed that the analysis contents indicated by the analysis content information are the number of drawn images drawn in the wide angle image 60. In this case, the initial viewpoint direction setting unit 12W sets, as the initial viewpoint direction information, an area where a drawn image is present in the wide angle image 60 indicated by the initial image information that is set by the initial image setting unit 12V. Note that, if the wide angle image 60 indicated by the initial image information has a plurality of drawn images, an area where the greatest number of drawn images are present may be set as the initial viewpoint direction information.

Also, for example, it is assumed that the analysis contents indicated by the analysis content information are the number of specific persons appearing in the wide angle image 60. In this case, the initial viewpoint direction setting unit 12W sets, as the initial viewpoint direction information, an area in which a specific person appears in the wide angle image 60 indicated by the initial image information that is set by the initial image setting unit 12V. Note that, if the wide angle image 60 indicated by the initial image information has a plurality of specific persons, an area where the greatest number of specific persons appear may be set as the initial viewpoint direction information.

The embedding unit 12X embeds the display information in the result image 70 generated by the result image generation unit 12T.

The display information is, as described above, information concerning the wide angle images (the base images) used as a base to derive the analysis result indicated by the result image 70, and concerning displaying the result image 70. According to the first embodiment, the display information includes identification information for identifying the wide angle images 60 (the base images) used as a base to derive the analysis result, initial image information that is set by the initial image setting unit 12V, and the initial viewpoint direction information that is set by the initial viewpoint direction setting unit 12W. Actually, the display information includes the identification information (for example, the base ID, the photographing apparatus ID, or the images ID) for identifying the wide angle images 60 (the base images) used as a base to derive the analysis result, the classification conditions (the time scale of photographed time, or the like) used for the group classification analysis, the group ID, and, the initial image information and the initial viewpoint direction information corresponding to the group.

Note that, the data format of the display information is not limited. For example, the display information is expressed by a URL (Uniform Resource Locator) for identifying these items of information.

According to the first embodiment, the embedding unit 12X embeds the display information in the analysis result image G corresponding to each group, included in the result image 70.

Embedding the display information will be described in detail.

For example, it is assumed that the result image generation unit 12T generates the result image (see FIG. 16). The result image 71 is, as described above, one example of the result image 70 for a case where the analysis content information is "the number of persons appearing in the wide angle image 60".

In this case, the embedding unit 12X embeds, in each of the analysis result images Ga1-Ga4, Gb1-Gb4, and Gc1-Gc4 of the groups, the corresponding display information.

For example, the analysis result image Ga1 is the analysis result of the number of persons concerning the wide angle images 60 photographed by the photographing apparatus 14 having the photographing apparatus ID "t001" placed in the base B identified by the base ID during the time scale "10 minutes" from the photographing start date and time (2015/07/05 10:00). Then, it is assumed that the base images of the analysis result indicated by the analysis result image Ga1 in the group is the plurality of wide angle images 60 photographed by the photographing apparatus 14. Then, it is assumed that the initial image setting unit 12V sets one of the plurality of wide angle images 60 as the initial image information, and the initial viewpoint direction setting unit 12W sets the initial viewpoint direction information for the wide angle image 60 identified by the initial image information.

In this case, the embedding unit 12X embeds the display information including the above-mentioned information in the area of the analysis result image Ga1 included in the result image 71. Actually, embedding unit 12X embeds the display information including the identification information (for example, the base ID, the photographing apparatus ID, and the image IDs) for identifying the base images, the classification conditions (the photographing start date and time, the time scale, and the photographing apparatus ID) for the group, the group ID, and, the initial image information and the initial viewpoint direction information corresponding to the group.

Note that, the display information may further include information with which it is possible to identify a layout image of the base B where the photographing apparatus 14 that photographed the base images is installed.

Thus, the embedding unit 12X embeds, in each of the analysis result images G (Ga1-Ga4, Gb1-Gb4, and Gc1-Gc4) for the groups in the result image 71, the corresponding display information. As a result, it is possible to associate the analysis result image G of each group with the corresponding display information.

That is, as a result of embedding the display information in the result image 71, the information concerning displaying the wide angle images 60 (the base images) that are the base to derive the analysis result indicated by the analysis result image G corresponding to each of the analysis result images G of the groups, is associated.

The embedding unit 12X embeds the display information in each of the analysis result images G of the groups, also for each of the other result images 70 concerning the different analysis content information, in the same way.

Note that, the display information may further include comparison identification information for identifying, in addition to the wide angle images (the base images) used as the base to derive the analysis result indicated by the result image 70, other wide angle images 60 to be used for comparison corresponding to the respective wide angle images 60 included in the base images.

Actually, the reception unit 12Q of the control unit 12A may carry out such a process when the reception unit 12Q has received the analysis result acquisition request including the comparison instruction information. The comparison instruction information indicates a request for another analysis result where some of the classification items included in the classification conditions are different.

Figure 20:
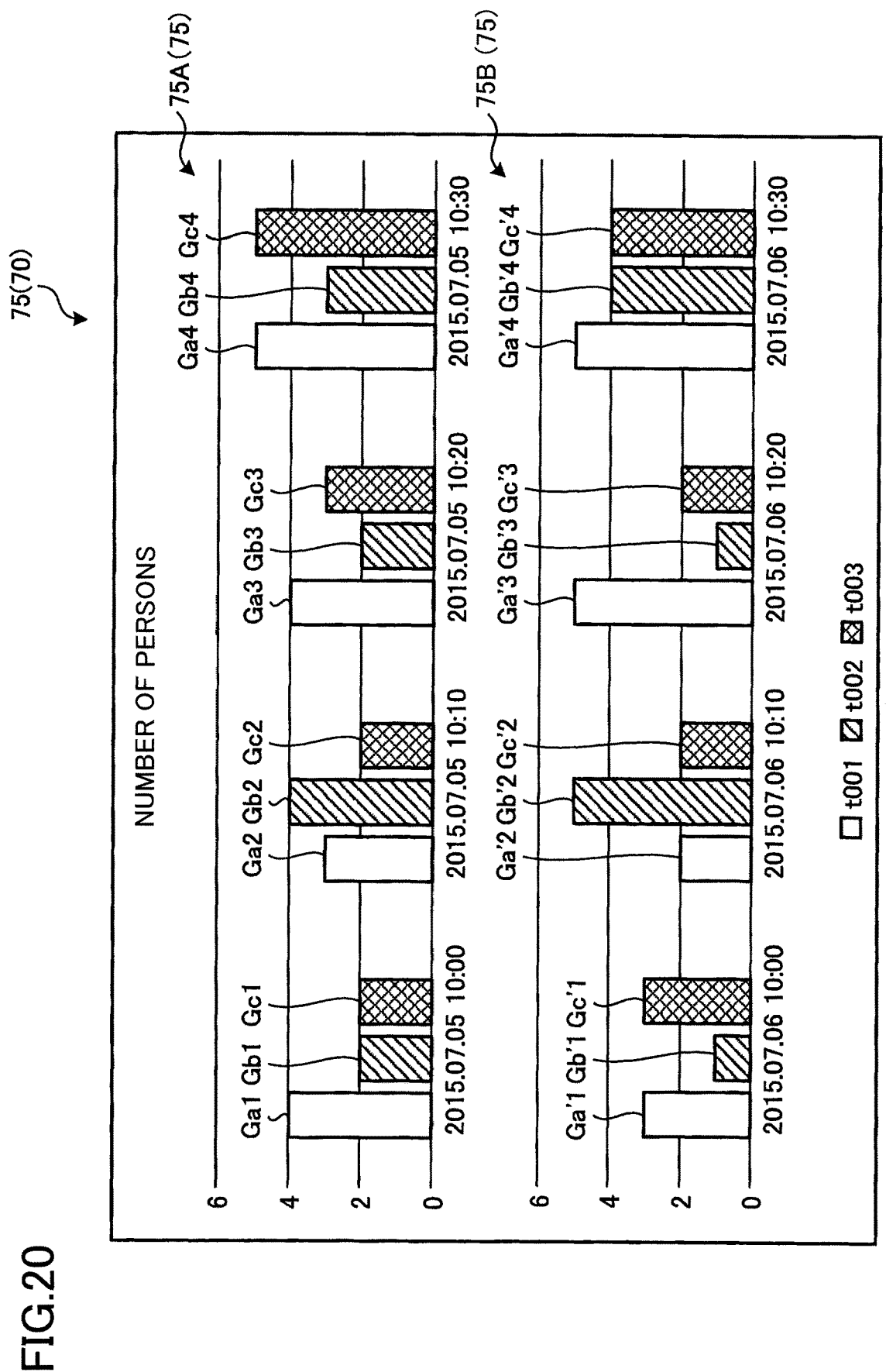

In this case, the result image generation unit 12T generates a plurality of result images 70 where the classification items are partially different, using the analysis results received from the analysis unit 12R. FIG. 20 is a schematic diagram illustrating one example of a result image 75.

As illustrated in FIG. 20, if the analysis result acquisition request includes the comparison instruction information, the result image generation unit 12T may generate, for example, the result image 75 including a plurality of result images (a result images 75A and 75B) for which the photographed date that is one of the classification items is different.

The result image 75A is the same as the result image 71 (see FIG. 16). The result image 75A includes the analysis result images G (Ga1-Ga4, Gb1-Gb4, and Gc1-Gc4) corresponding to the respective groups. The result image 75B includes the analysis result images G (Ga' 1-Ga' 4, Gb' 1-Gb' 4, and Gc' 1-Gc' 4) according to the analysis contents the same as the analysis contents of the result image 75 except that the photographed date that is one of the classification items is different.

Then, in the same way as the above-mentioned way, the embedding unit 12X embeds, in each of the analysis result images G of the groups, the display information. Note that, if the analysis result acquisition request includes the comparison instruction information, the comparison identification information (for example, the image IDs) for identifying the other wide angle images for which some of the classification items are different (for example, the photographed date is different) for comparison purpose is further embedded in each of the analysis result images G of the result image 75.

Returning to FIG. 12, the display information generation unit 12S outputs the result image 70 where the display information is embedded to the transmission and receiving unit 12K. The transmission and receiving unit 12K transmits the result image 70 to the information processing terminal 18 that has sent the analysis result acquisition request.

On the other hand, the receiving unit 12H receives, from the information processing terminal 18, a base image acquisition request. The base image acquisition request includes the display information embedded in the analysis result images G included in the result image 70. That is, as a result of the user selecting a desired analysis result image G included in the displayed result image 70, the base image acquisition request including the display information embedded in the selected analysis result image G is transmitted to the server apparatus 12 (details will be described later).

The receiving unit 12H outputs the received base image acquisition request to the base image identification unit 12J.

The base image identification unit 12J is one example of an identification unit. The base image identification unit 12J determines, as the base images, the wide angle images 60 used as a base to derive the analysis result indicated by the result image 70 generated by the result image generation unit 12T.

The base image identification unit 12J determines, as the base images, the plurality of wide angle images 60 used by the analysis unit 12R for deriving the analysis result indicated by the result image 70. According to the first embodiment, the base image identification unit 12J determine the wide angle image 60 used as a base of derivation for the analysis result of each of the groups classified by the analysis unit 12R.

In more detail, the base image identification unit 12J reads the identification information for identifying the base images indicated by the display information included in the base image acquisition request. According to the first embodiment, the base image identification unit 12J reads, from the display information, the base ID, the photographing apparatus ID, or the image IDs as the identification information. Here, it is assumed that the display information includes the base ID as the identification information. In this case, the base image identification unit 12J identifies, from the base management DB 12D (see TABLE 1A), the photographing apparatus ID corresponding to the base ID included in the display information. Then, the base image identification unit 12J identifies, from the image management DB 12C (see TABLE 2), the wide angle images 60 corresponding to the identified photographing apparatus ID. Thus, the base image identification unit 12J determines the base images.

That is, the base image identification unit 12J determines, as the base images, the wide angle image 60s belonging to the group of the indicated analysis result image G and used as the base of the analysis result indicated by the analysis result image G.

Then, the base image identification unit 12J outputs the plurality of wide angle images 60 as the determined base images, and the received base image acquisition request (including the display information) to the transmission and receiving unit 12K.

The transmission and receiving unit 12K transmits the plurality of wide angle image 60 as the base images received from the base image identification unit 12J and the display information included in the base image acquisition request received from the information processing terminal 18 to the information processing terminal 18.

Next, the functional configuration of the information processing terminal 18 will be described. The information processing terminal 18 includes a transmission and receiving unit 18A, a reception unit 18C, a display control unit 18D, a storing and reading unit 18B, a storage unit 18E, an input unit 18F, and a display unit 18G.

The transmission and receiving unit 18A, the storing and reading unit 18B, the reception unit 18C, the display control unit 18D, and the storage unit 18E are connected together in a manner of being able to transmit and receive data and signals.

The reception unit 180 is connected to the input unit 18F. The reception unit 18C receives the user's operation instruction performed on the input unit 18F. The input unit 18F includes the keyboard 511 and the mouse 512 (see FIG. 9). The display control unit 18D displays, on the display unit 18G, various images. The display unit 18G corresponds to the display 508 (see FIG. 9). The transmission and receiving unit 18A carries out communications with the server apparatus 12 via the network 20. The storage unit 18E stores various sorts of data. For example, the storage unit 18E stores the user ID of the user who operates the information processing terminal 18. The storing and reading unit 18B stores, in the storage unit 18E, various sorts of data; and reads, from the storage unit 18E, various sorts of data.

The user operates the input unit 18F to input the analysis result acquisition request or the base image acquisition request.

For example, the user inputs the analysis result acquisition request while reading information on the display unit 18G.

Actually, the display control unit 18D displays the operation screen page 50 illustrated in FIG. 15, on the display unit 18G. As described above, the operation screen page 50 includes the list of selectable base IDs ($50_1$ and $50_2$), and the plurality of items of analysis content information (50A-50C). The user selects the line of the desired base ID and one of the display fields $50_1$A-$50_1$C and $50_2$A-$50_2$C from the operation screen page 50. For example, if the user has selected the display field $50_1$A, the user can select the base B identified by the base ID "s001" and the analysis content information "the number of persons". The reception unit 18C transmits the analysis result acquisition request including the selected base ID and analysis content information to the server apparatus 12 through the transmission and receiving unit 18A.

Note that, at this time, the user may operate the input unit 18F to further input the classification conditions and the comparison instruction information. In this case, reception unit 18C transmits the analysis result acquisition request further including the classification conditions and the comparison instruction information to the server apparatus 12 through the transmission and receiving unit 18A.

The transmission and receiving unit 18A receives, from the server apparatus 12, the result image 70 as a response to the analysis result acquisition request transmitted to the server apparatus 12. The result image 70 includes, as described above, the analysis result images G indicating the respective analysis results for the groups classified according to the classification conditions, where the display information is embedded in each analysis result image G.

After receiving the result image 70, the transmission and receiving unit 18A outputs the result image 70 to the display control unit 18D. The display control unit 18D displays the received result image 70 on the display unit 18G.

Therefore, if the analysis content information included in the analysis result acquisition request that is input by the user through the input unit 18F is "the number of persons appearing in the wide angle image 60", the display unit 18G displays, for example, the result image 71 illustrated in FIG. 16.

If the analysis content information included in the analysis result acquisition request that is input by the user through the input unit 18F is "the number of persons appearing in the specific area of the wide angle image 60", the display unit 18G displays, for example, the result image 72 illustrated in FIG. 17.

If the analysis content information included in the analysis result acquisition request that is input by the user through the input unit 18F is "the number of drawn images drawn in the wide angle image 60", the display unit 18G displays, for example, the result image 73 illustrated in FIG. 18.

If the analysis content information included in the analysis result acquisition request that is input by the user through the input unit 18F is "the number of specific persons appearing in the wide angle image 60", the display unit 18G displays, for example, the result image 74 illustrated in FIG. 19.

If the analysis content information included in the analysis result acquisition request that is input by the user through the input unit 18F is "the number of persons appearing in the wide angle image 60", and also, the comparison instruction information is included, the display unit 18G displays, for example, the result image 75 illustrated in FIG. 20.

Then, by operating the input unit 18F, the user inputs the base image acquisition request for the base images that are the wide angle images 60 used as a base to derive the analysis result indicated by the result image 70.

According to the first embodiment, the user performs operation on the display area of the analysis result image G corresponding to any one of the groups in the result image 70 displayed on the display unit 18G. As a result, the base image acquisition request for the base images as the base of the analysis result indicated by the analysis result image G corresponding to the group is input.

As described above, the display information is embedded in each of the analysis result images G corresponding to the groups in the result image 70. The reception unit 18C then transmits the base image acquisition request including the display information corresponding to the analysis result image G corresponding to the group on which the user performs the operation using the input unit 18F, to the server apparatus 12 through the transmission and receiving unit 18A.

Actually, for example, if the user operates the input unit 18F to indicate the display area of the analysis result image Ga1 in the result image 71 illustrated in FIG. 16, the reception unit 18C identifies the display information embedded in the analysis result image Ga1, and transmits the base image acquisition request including the identified display information to the server apparatus 12 through the transmission and receiving unit 18A.

As described above, the display information includes the identification information (for example, the base ID, the photographing apparatus ID, or the image IDs) for identifying the wide angle images 60 (i.e., the base images) used as the base to derive the analysis result, the classification conditions (the time scale of the photographed time, or the like) used for the group classification, the group ID, and, the initial image information and the initial viewpoint direction information corresponding to the group.

Thus, the transmission and receiving unit 18A of the information processing terminal 18 transmits the base image acquisition request including the display information, to transmit the identification information for identifying the base images corresponding to the analysis result image G of the group indicated by the user, to the server apparatus 12.

Then, the transmission and receiving unit 18A of the information processing terminal 18 receives the base images and the display information from the server apparatus 12.

The base images received from the server apparatus 12 include the plurality of wide angle image 60 as the base of the analysis. The display control unit 18D displays the wide angle image 60 indicated by the initial image information included in the received display information from among the plurality of wide angle images 60 included in the base images, in the viewpoint direction indicated by the initial viewpoint direction information included in the display information, on the display unit 18G.

Thus, the information processing terminal 18 displays the wide angle image 60 used as the base of the analysis result indicated by the result image 70. Also, the information processing terminal 18 displays the wide angle image 60 according to the analysis content information from among the plurality of wide angle images 60 used as the base of the analysis result indicated by the result image 70, in the viewpoint direction according to the analysis content information.

Displaying the base image will now be described in detail. FIGS. 21-26 illustrate displaying the base image.

Figure 21:
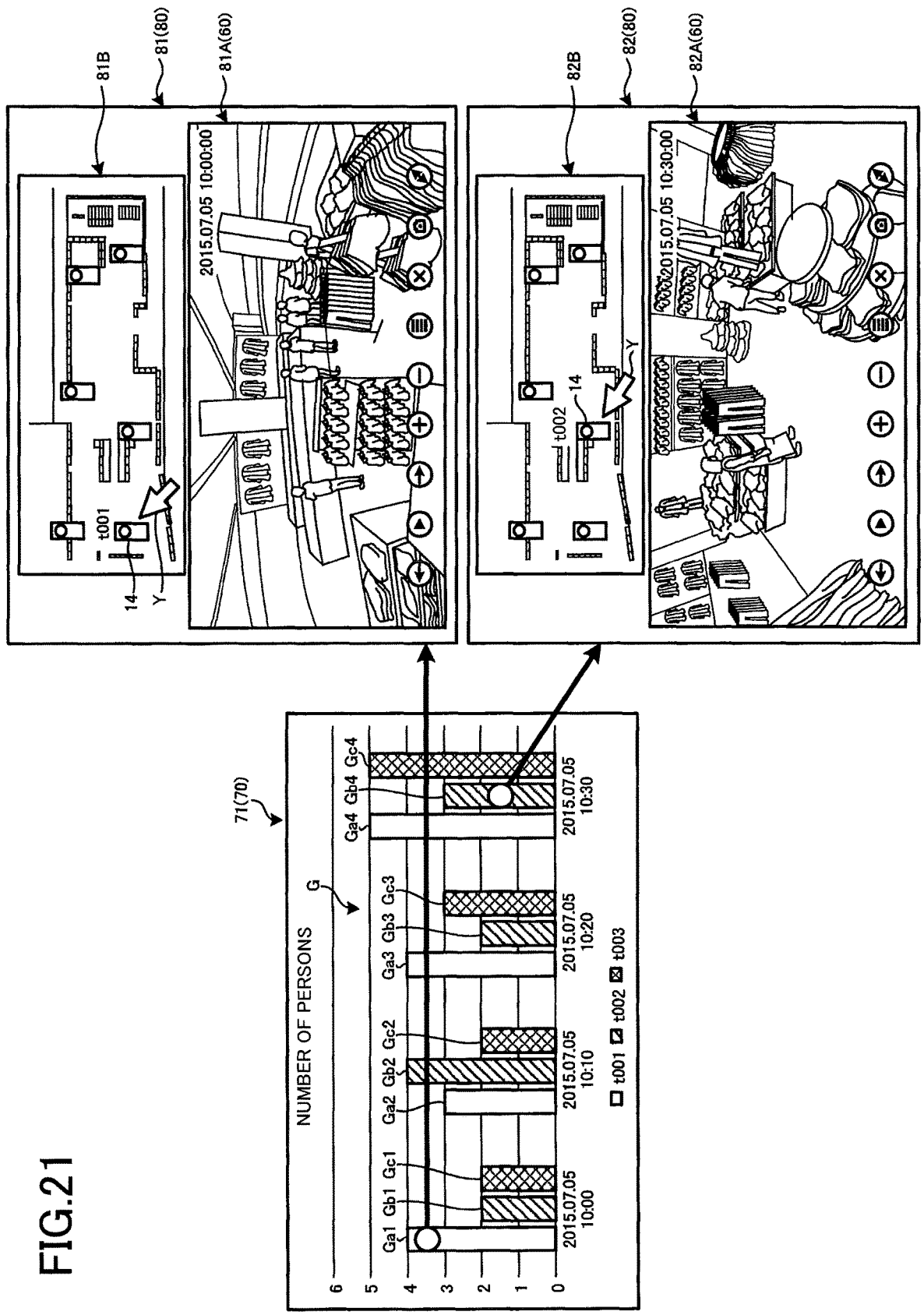
FIGS. 21-26 are schematic diagrams illustrating actual examples of displaying a base image according to the first embodiment.

First, description will be made using FIG. 21. For example, the result image 71 is assumed as being displayed on the display unit 18G of the information processing terminal 18. The result image illustrated in FIG. 21 is the same as the image of FIG. 16. That is, the result image 71 is the result image 71 for a case where the analysis content information included in the analysis result acquisition request that is input by the user's operation performed on the input unit 18F is "the number of persons appearing in the wide angle image 60".

Then, for example, if the user operates the input unit 18F to input an instruction to indicate the display area of the analysis result image Ga1, the reception unit 18C acquires the display information embedded in the analysis result image Ga1, and transmits the base image acquisition request including the display information to the server apparatus 12 through the transmission and receiving unit 18A. As a result, the transmission and receiving unit 18A of the information processing terminal 18 will receive the base images and display information corresponding to the base image acquisition request from the server apparatus 12. The display control unit 18D of the information processing terminal 18 then displays the wide angle image 81A indicated by the initial image information included in the received display information from among the plurality of wide angle images 60 included in the base images in the viewpoint direction indicated by the initial viewpoint direction information included in the display information, on the display unit 18G.

Thus, for example, as mentioned above, it is assumed that the displayed area of the analysis result image Ga1 is indicated by the user. As a result, as the base image to derive the analysis result indicated by the analysis result image Ga1, for example, the display screen page 81 including the wide angle image 81A is displayed on the display unit 18G. The display screen page 81 is one example of the display screen page 80 to be displayed. Note that, it is also possible that, in the display screen page 81, as illustrated in FIG. 21, the layout image 81B of the base B where the photographing apparatus 14 that has photographed the wide angle image 81A is installed is displayed together. In this case, it is desired that, in the layout image 81B, an image Y (for example, an arrow image) urging the user to pay attention to the photographing apparatus 14 that has photographed the wide angle image 81A is displayed together.

If, in another example, the displayed area of the analysis result image Gb4 in the result image 71 is indicated, for example, the display screen page 82 including the wide angle image 82A is displayed on the display unit 18G as the base image to derive the analysis result indicated by the analysis result image Gb4. Note that, it is also possible that, in the display screen page 82, as illustrated, the layout image 82B of the base B where the photographing apparatus 14 that has photographed the wide angle image 82A is installed is displayed together. In this case, it is desired that, in the layout image 82B, an image Y (for example, an arrow image) urging the user to pay attention to the photographing apparatus 14 that has photographed the wide angle image 82A is displayed together.

Note that, it is also possible that the display control unit 18D displays two or more wide angle images 60 included in the base images received from the server apparatus 12 on the display unit 18G.

Figure 22:
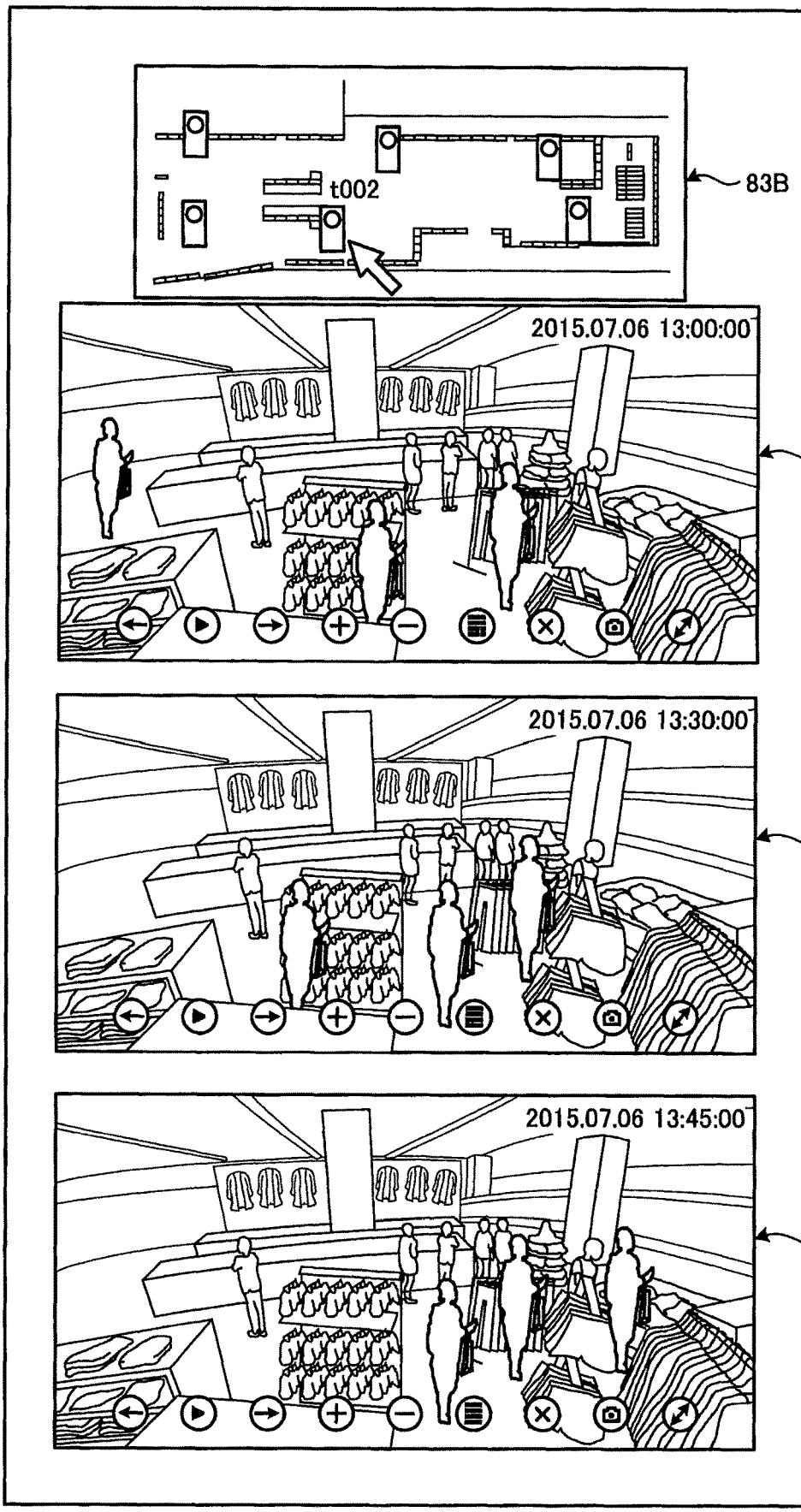

That is, if, for example, the displayed area of the analysis result image Gb4 in the result image 71 illustrated is indicated, it is also possible that, as the base images to drive the analysis result indicated by the analysis result image Gb4, for example, the display screen page 83 including all the wide angle images 83A (wide angle images 83A$_1$-83A$_3$) included in the base images, illustrated in FIG. 22, is displayed on the display unit 18G. Also in this case, it is possible that the layout image 83B of the base B where the photographing apparatus 14 having photographed these wide angle images 83A (the wide angle images 83A$_1$-83A$_3$) is installed is displayed together.

Figure 23:
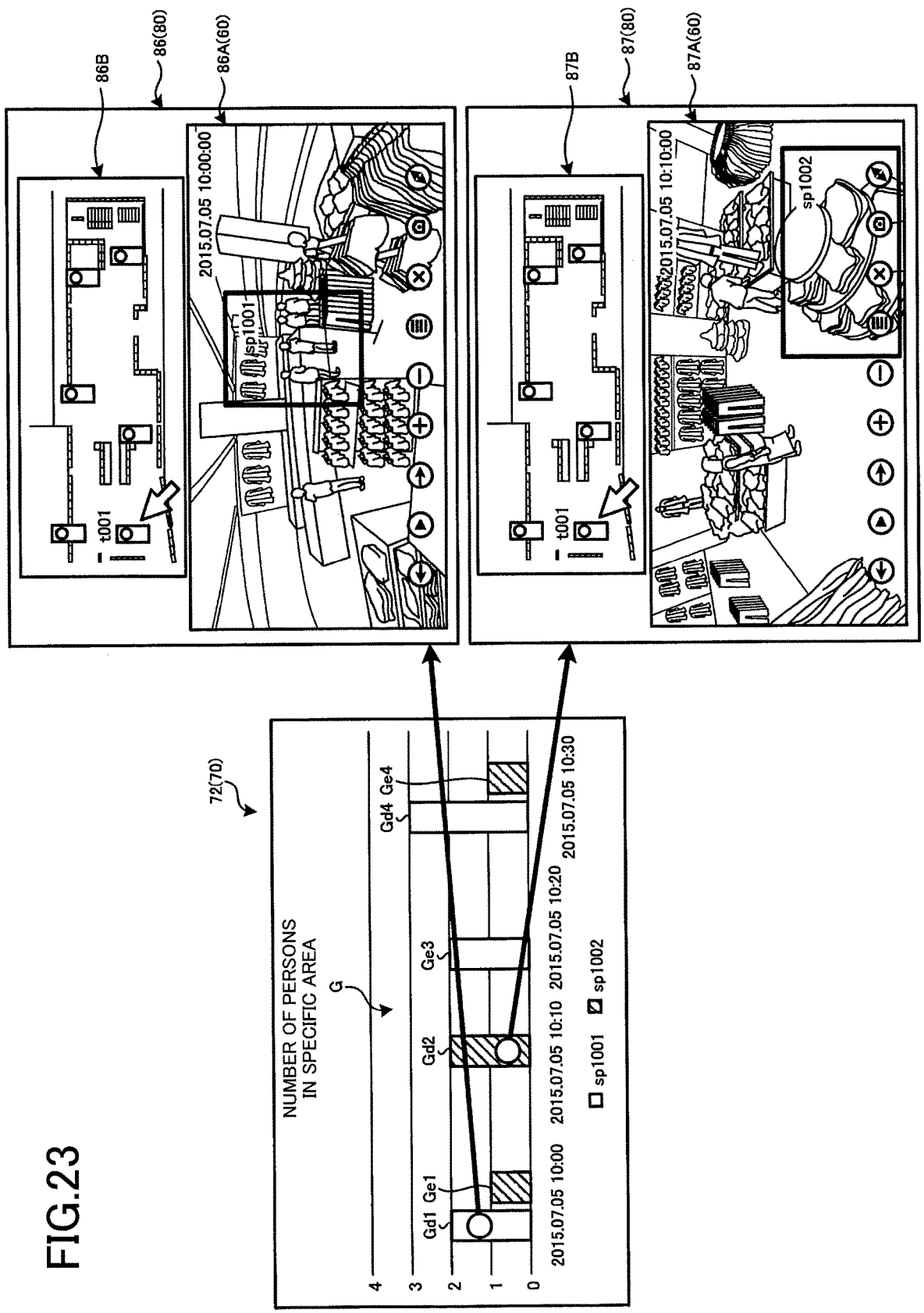

Next, description will be made using FIG. 23. For example, it is assumed that the result image 72 illustrated in FIG. 23 is displayed on the display unit 18G of the information processing terminal 18. The result image 72 illustrated is the same as the image of FIG. 17. That is, the result image 72 is the result image 72 of a case where the analysis content information included in the analysis result acquisition request that is input by the user's operation performed on the input unit 18F is "the number of persons appearing in the specific area of the wide angle image 60".

Then, if, for example, the user operates the input unit 18F to indicate the display area of the analysis result image Gd1, the reception unit 18C acquires the display information embedded in the analysis result image Gd1, and transmits the base image acquisition request including the display information to the server apparatus 12 through the transmission and receiving unit 18A. Thus, the transmission and receiving unit 18A of the information processing terminal 18 will receive the base images and the display information corresponding to the base image acquisition request from the server apparatus 12. The display control unit 18D of the information processing terminal 18 displays the wide angle image 86A indicated by the initial image information included in the received display information from among the plurality of wide angle images 60 included in the base images in the viewpoint direction indicated by the initial viewpoint direction information included in the display information, on the display unit 18G.

That is, as mentioned above, for example, it is assumed that the displayed area of the analysis result image Gd1 is indicated by the user. As a result, as the base image to derive the analysis result indicated by the analysis result image Gd1, for example, the display screen page 86 including the wide angle image 86A is displayed on the display unit 18G. Note that, if the analysis content information is thus "the number of persons appearing in the specific area of the wide angle image 60", it is desired to also display an image such as a frame image indicating the specific area in the wide angle image 86A in a superposing manner.

It is also possible that, in the display screen page 86, as illustrated, the layout image 86B of the base B where the photographing apparatus 14 that has photographed the wide angle image 86A is installed is displayed together.

If, in another example, the displayed area of the analysis result image Gd2 in the result image 72 is indicated, for example, the display screen page 87 including the wide angle image 87A is displayed on the display unit 18G as the base image to derive the analysis result indicated by the analysis result image Gd2. Note that, it is also possible that, in the display screen page 87, as illustrated, the layout image 87B of the base B where the photographing apparatus 14 that has photographed the wide angle image 87A is installed is displayed together.

Figure 24:
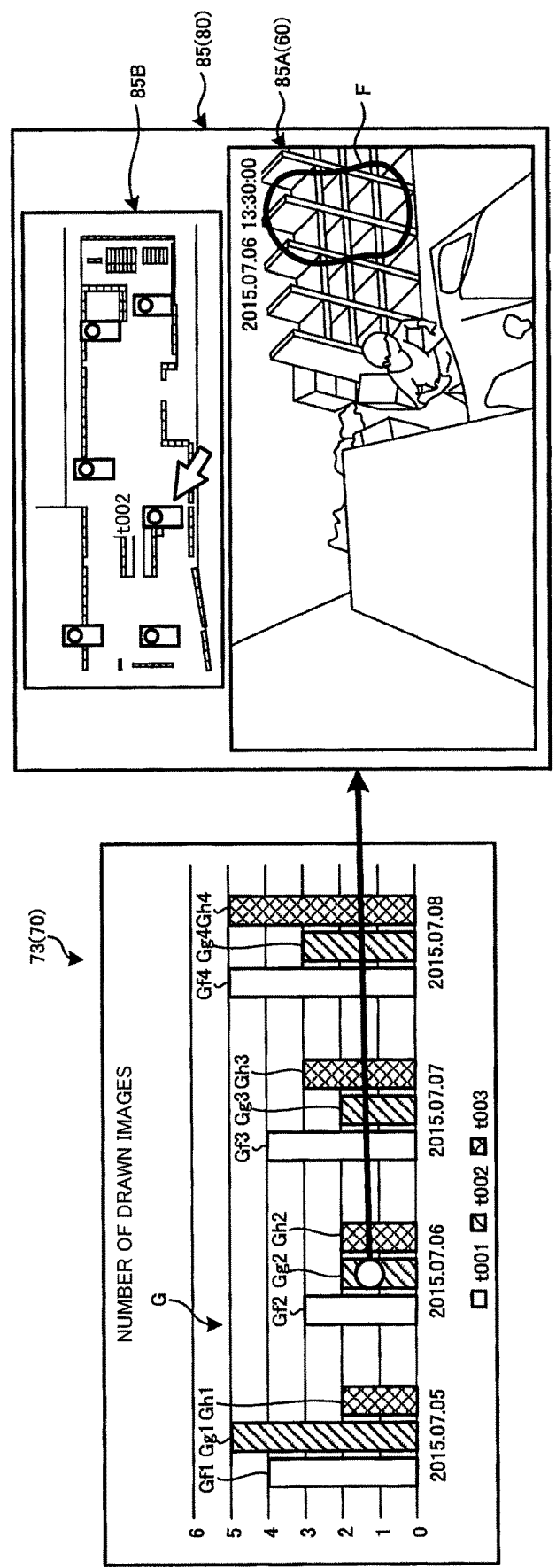

Next, description will be made using FIG. 24. For example, it is assumed that the result image 73 illustrated in FIG. 24 is displayed on the display unit 18G of the information processing terminal 18. The result image 73 illustrated is the same as the image of FIG. 18. That is, the result image 73 is the result image 73 for a case where the analysis content information included in the analysis result acquisition request that is input by the user's operation performed on the input unit 18F is "the number of drawn images drawn in the wide angle image 60".

Then, if, for example, the user operates the input unit 18F to indicate the displayed area of the analysis result image Gg2, the reception unit 18C acquires the display information embedded in the analysis result image Gg2, and transmits the base image acquisition request including the display information to the server apparatus 12 through the transmission and receiving unit 18A. Thus, the transmission and receiving unit 18A of the information processing terminal 18 will receive the base images and the display information corresponding to the base image acquisition request, from the server apparatus 12. The display control unit 18D of the information processing terminal 18 displays the wide angle image 85A indicated by the initial image information included in the received display information from among the plurality of wide angle images 60 included in the base images in the viewpoint direction indicated by the initial viewpoint direction information included in the display information, on the display unit 18G.

That is, for example, as mentioned above, it is assumed that the displayed area of the analysis result image Gg2 in the result image 73 is indicated by the user. As a result, as the base image to derive the analysis result indicated by the analysis result image Gg2, for example, the display screen page 85 including the wide angle image 85A is displayed on the display unit 18G. As illustrated in FIG. 24, the wide angle image 85A displays the drawn image F.

It is also possible that, in the display screen page 85, as illustrated, the layout image 85B of the base B where the photographing apparatus 14 that has photographed the wide angle image 85A is installed is displayed together.

Figure 25:
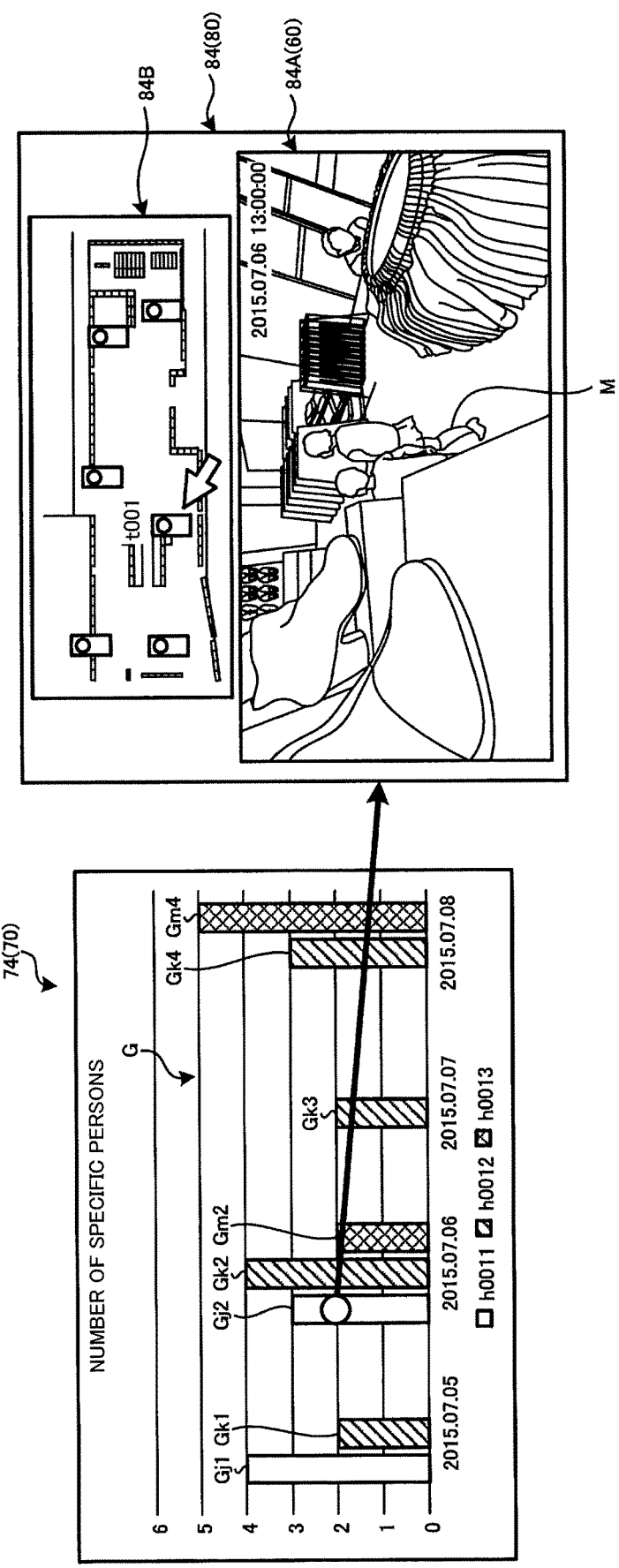

Next, description will be made using FIG. 25. For example, it is assumed that the result image 74 illustrated in FIG. 25 is displayed on the display unit 18G of the information processing terminal 18. The result image 74 illustrated is the same as the image of FIG. 19. That is, the result image 74 is the result image 74 for a case where the analysis content information included in the analysis result acquisition request that is input by the user's operation performed on the input unit 18F is "the number of specific persons appearing in the wide angle image 60".

Then, if, for example, the user operates the input unit 18F to indicate the displayed area of the analysis result image Gj2, the reception unit 18C acquires the display information embedded in the analysis result image Gj2, and transmits the base image acquisition request including the display information to the server apparatus 12 through the transmission and receiving unit 18A. Thus, the transmission and receiving unit 18A of the information processing terminal 18 will receive the base images and the display information corresponding to the base image acquisition request from the server apparatus 12. The display control unit 18D of the information processing terminal 18 displays the wide angle image 84A indicated by the initial image information included in the received display information from among the plurality of wide angle images 60 included in the base images in the viewpoint direction indicated by the initial viewpoint direction information included in the display information, on the display unit 18G.

That is, for example, as mentioned above, it is assumed that the displayed area of the analysis result image Gj2 in the result image 74 is indicated by the user. As a result, as the base image to derive the analysis result indicated by the analysis result image Gj2, for example, the display screen page 84 including the wide angle image 84A is displayed on the display unit 18G. The wide angle image 84A includes the specific person M.

It is also possible that, in the display screen page 84, as illustrated, the layout image 84B of the base B where the photographing apparatus 14 that has photographed the wide angle image 84A is installed is displayed together.

Figure 26:
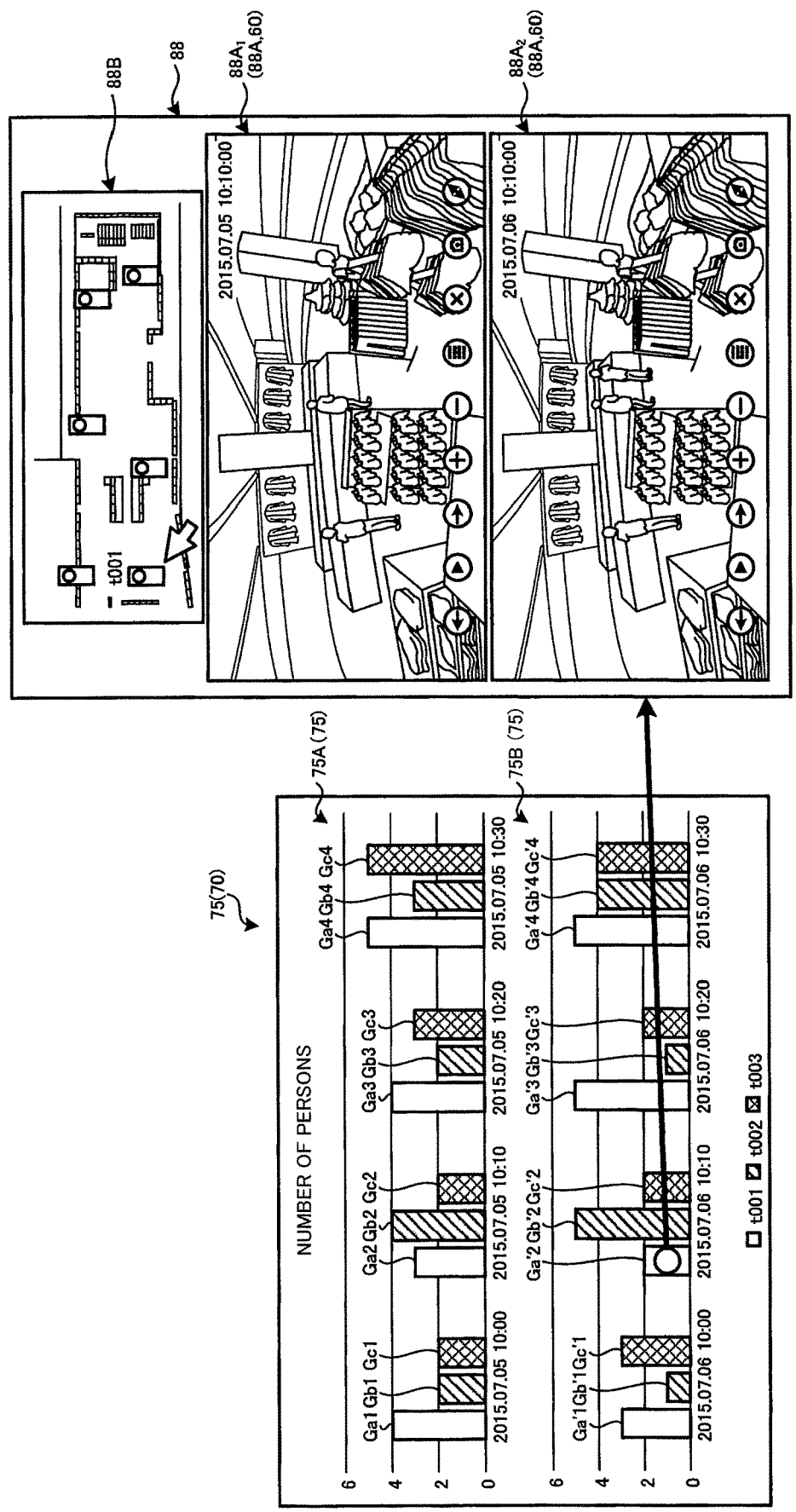

Next, description will be made using FIG. 26. For example, it is assumed that the result image 75 illustrated in FIG. 26 is displayed on the display unit 18G of the information processing terminal 18. The result image 75 illustrated is the same as the image of FIG. 20. That is, the result image 75 is the result image 75 for a case where the analysis content information included in the analysis result acquisition request that is input by the user's operation performed on the input unit 18F is "the number of persons appearing in the wide angle image 60", and also, the analysis result acquisition request includes the comparison instruction information.

Then, if, for example, the user operates the input unit 18F to indicate the displayed area of the analysis result image Ga'2, the reception unit 18C acquires the display information embedded in the analysis result image Ga'2, and transmits the base image acquisition request including the display information to the server apparatus 12 through the transmission and receiving unit 18A. Thus, the transmission and receiving unit 18A of the information processing terminal 18 will receive the base images and the display information corresponding to the base image acquisition request from the server apparatus 12. In this case, the display information includes the comparison identification information.

The display control unit 18D of the information processing terminal 18 displays the wide angle image 88A$_2$ indicated by the initial image information included in the received display information from among the plurality of wide angle images 60 included in the base images in the viewpoint direction indicated by the initial viewpoint direction information included in the display information, on the display unit 18G. Also, the display control unit 18D displays the wide angle image 88A$_1$ that is another wide angle image 60 to be compared corresponding to the wide angle image 88A$_2$ on the display unit 18G.

That is, for example, as mentioned above, it is assumed that the displayed area of the analysis result image Ga'2 in the result image 75B is indicated by the user. As a result, as the base image to derive the analysis result indicated by the analysis result image Ga'2, for example, the display screen page 88 including the wide angle image 88A$_2$ is displayed on the display unit 18G. Also, the wide angle image 88A$_1$ identified by the comparison identification information corresponding to the wide angle image 88A$_2$ is displayed together.

In the example illustrated in FIG. 26, the wide angle image 88A$_1$ that is another wide angle image 60 to be compared is a wide angle image 60 that is photographed by the same photographing apparatus 14 at the same time point in a different photographed day with respect to the wide angle image 88A$_2$ that is one of the base images to drive the analysis result indicated by the analysis result image Ga'2 indicated by the user.

Thus, the information processing terminal 18 displays the base images (the wide angle images 60) used as the base of the analysis result indicated by the result image 70. Also, the information processing terminal 18 displays the wide angle image 60 according to the analysis content information from among the plurality of wide angle images 60 used as the base of the analysis result indicated by the result image 70, in the viewpoint direction according to the analysis content information. Note that, the display screen page 88 also displays the layout image 88B together.

Next, one example of a flow of data registration with the image management DB 12C of the server apparatus 12 in the information processing system 10 according to the first embodiment will be described.

Figure 27:
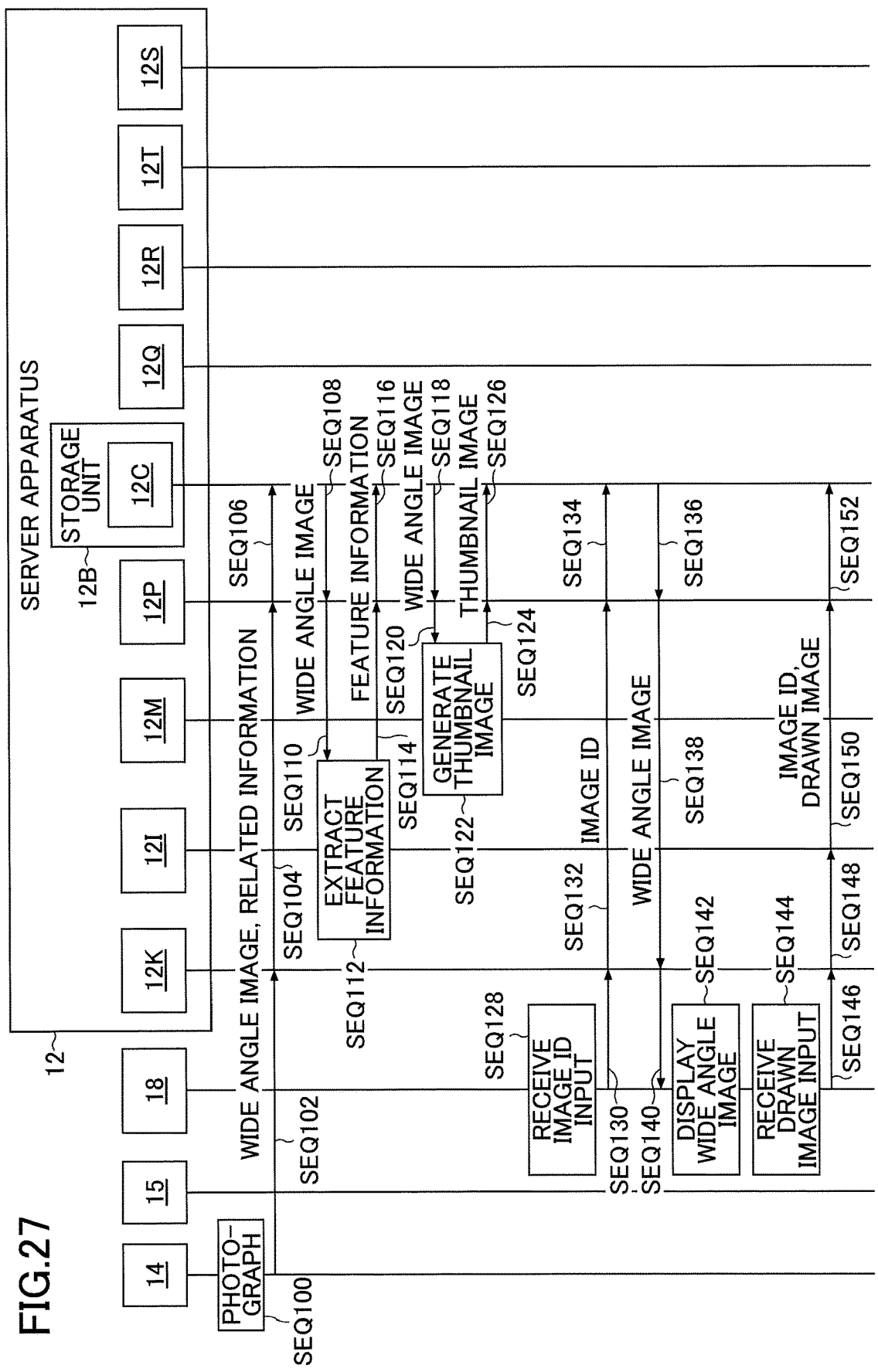
FIG. 27 is a sequence diagram illustrating one example of a flow of data registration carried out in the information processing system according to the first embodiment.

FIG. 27 is a sequence diagram illustrating one example of a flow of data registration carried out in the information processing system 10.

First, the photographing apparatus 14 photographs a wide angle image 60 (step SEQ100). As a result, the photographing apparatus 14 transmits the photographed wide angle image 60 and corresponding related information 61 to the server apparatus 12 (step SEQ102).

The transmission and receiving unit 12K of the server apparatus 12 receives the wide angle image 60 and the related information 61 from the photographing apparatus 14 and outputs the wide angle image 60 and the related information 61 to the storage control unit 12P (step SEQ104). The storage control unit 12P receives the wide angle image 60 and the related information 61 from the transmission and receiving unit 12K, and registers the wide angle image 60 and the related information 61 with the image management DB 12C of the storage unit 12B (step SEQ106).

Next, the storage control unit 12P reads the wide angle image 60 registered with the image management DB 12C in step SEQ106 (step SEQ108) and outputs the wide angle image 60 to the feature information extraction unit 12I (step SEQ110).

The feature information extraction unit 12I extracts the feature information from the wide angle image 60 received in step SEQ110 (step SEQ112). Then, the feature information extraction unit 12I outputs the extracted feature information to the storage control unit 12P (step SEQ114). The storage control unit 12P associates the feature information extracted by the feature information extraction unit 12I with the corresponding image ID, and registers the associated information with the image management DB 12C (see TABLE 2) (step SEQ116).

Next, the storage control unit 12P reads the wide angle image 60 registered with the image management DB 12C in step SEQ106 (step SEQ118), and outputs the wide angle image 60 to the thumbnail generation unit 12M (step SEQ120).

The thumbnail generation unit 12M generates the thumbnail image of the received wide angle image (step SEQ122). Note that the thumbnail generation unit 12M may receive the wide angle image 60 photographed by the photographing apparatus 14 from the transmission and receiving unit 12K, and use the wide angle image 60 to generate the thumbnail image.

Then, the thumbnail generation unit 12M outputs the generated thumbnail image to the storage control unit 12P (step SEQ124). The storage control unit 12P associates the thumbnail image received from the thumbnail generation unit 12M with the image ID of the wide angle image 60 used to generate the thumbnail image, and registers the associated information with the image management DB 12C (see TABLE 2) (step SEQ126).

Thus, the server apparatus 12 extracts the feature information, generates the thumbnail image, and updates the image management DB 12C each time of receiving, from the photographing apparatus 14, the wide angle image 60 and the related information 61.

On the other hand, in the information processing terminal 18, the reception unit 18C receives an input of the image ID of the wide angle image 60 from the input unit 18F (step SEQ128). For example, the user of the information processing terminal 18 operates the input unit 18F to make an input of the image ID of the wide angle image 60 in which the user will draw an image. Thus, the reception unit 18C receives, from the input unit 18F, the image ID.

The transmission and receiving unit 18A of the information processing terminal 18 transmits the image ID received in step SEQ128 to the server apparatus 12 (step SEQ130). The transmission unit 12L of the server apparatus 12 receives, from the information processing terminal 18, the image ID, and outputs the received image ID to the storage control unit 12P (step SEQ132).

The storage control unit 12P reads the wide angle image 60 corresponding to the received image ID from the image management DB 12C (step SEQ134 and step SEQ136). Then, the storage control unit 12P outputs the read wide angle image 60 and the image ID of the wide angle image 60 to the transmission and receiving unit 12K (step SEQ138).

The transmission and receiving unit 12K transmits the wide angle image 60 and the image ID received from the storage control unit 12P to the information processing terminal 18 from which the image ID of step SEQ130 has been received (step SEQ140).

The transmission and receiving unit 18A of the information processing terminal 18 receives the wide angle image 60 from the server apparatus 12. The display control unit 18D of the information processing terminal 18 displays the wide angle image 60 on the display unit 18G (step SEQ142). The user of the information processing terminal 18 operates the input unit 18F while viewing the wide angle image 60 displayed on the display unit 18G, to draw an image in the wide angle image 60. Thus, the reception unit 18C receives, from the input unit 18F, the drawn image (step SEQ144).

The transmission and receiving unit 18A of the information processing terminal 18 transmits the drawn image acquired through the user's operation of the information processing terminal 18, and the image ID of the wide angle image 60 in which the image has been drawn to the server apparatus 12 (step SEQ146). Note that, at this time, the transmission and receiving unit 18A also transmits the position area information indicating the position at which the image has been drawn to the server apparatus 12.

The transmission and receiving unit 12K of the server apparatus 12 receives, from the information processing terminal 18, the drawn image, the image ID, and the position area information (step SEQ148), and then, outputs the drawn image, the image ID, and the position area information to the feature information extraction unit 12I. The feature information extraction unit 12I registers the received position area information with the position management DB 12F (see TABLE 3B), and gives a new position area ID to the position area information. Also, the feature information extraction unit 12I gives a drawn image ID to the received drawn image.

Then, the feature information extraction unit 12I associates the position area ID, the drawn image ID, and the received drawn image with the received image ID, and registers the associated information with the image management DB 12C through the storage control unit 12P (step SEQ150 and step SEQ152).

Though the processes of step SEQ128-step SEQ152, the server apparatus 12 updates the image management DB 12C each time of receiving the drawn image from the information processing terminal 18.

Next, one example of a flow of a process to display a result of analyzing wide angle images 60 according to the information processing system 10 in the first embodiment will be described.

Figure 28:
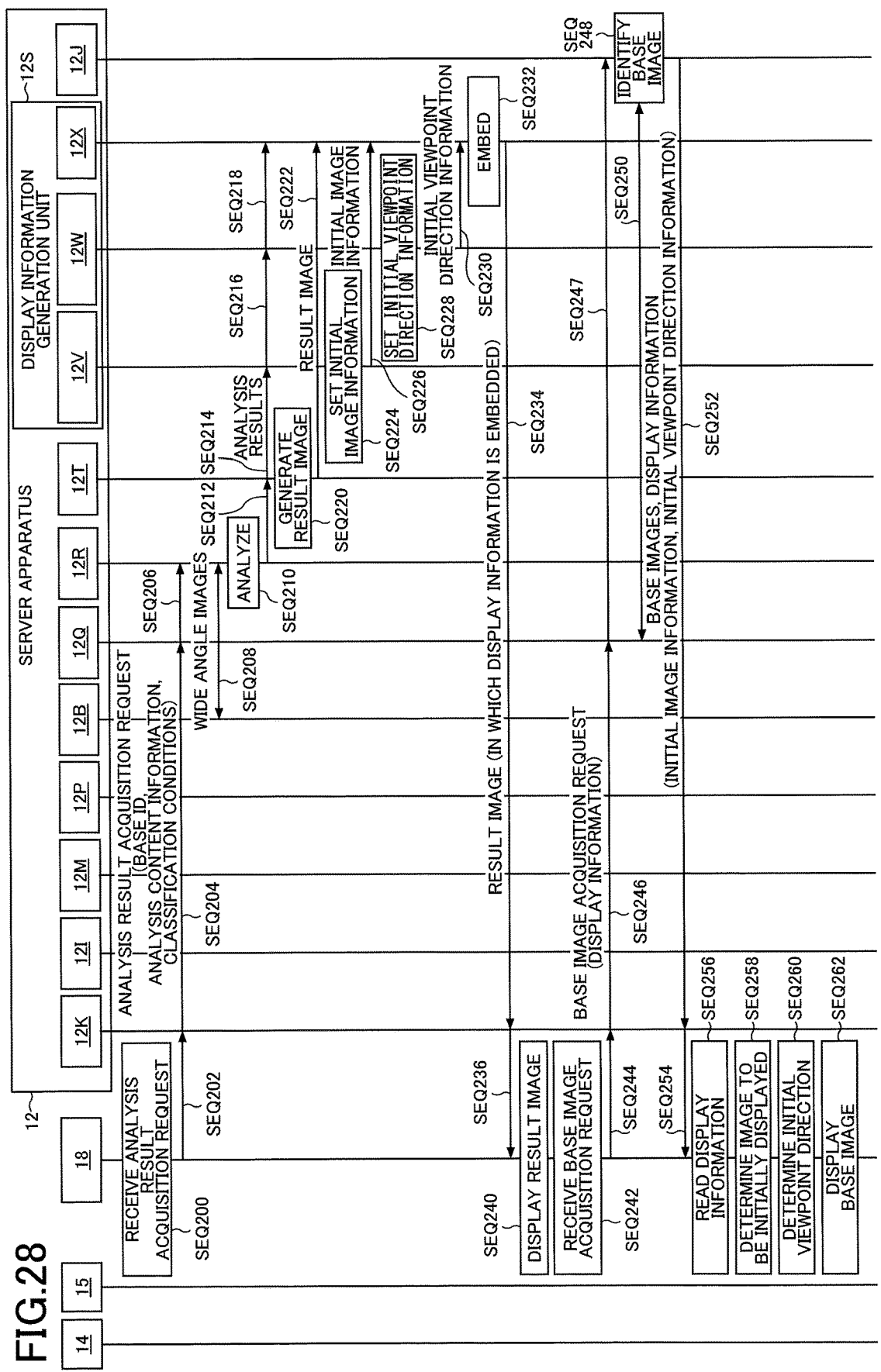
FIG. 28 is a sequence diagram illustrating one example of a flow of a process to display a result of analyzing wide angle images carried out by the information processing system according to the first embodiment.

FIG. 28 is a sequence diagram illustrating one example of a flow of a process to display a result of analyzing wide angle images 60 carried out by the information processing system 10.

First, the reception unit 18C of the information processing terminal 18 receives, from the input unit 18F, the analysis result acquisition request (step SEQ200). The analysis result acquisition request includes, as described above, the base ID, the analysis content information, and the classification conditions. Note that, as described above, the analysis result acquisition request may further include the comparison instruction information.

The transmission and receiving unit 12K of the server apparatus 12 receives, from the information processing terminal 18, the analysis result acquisition request (step SEQ202), and outputs the analysis result acquisition request to the analysis unit 12R (step SEQ204 and step SEQ206).

The analysis unit 12R reads the base ID, the analysis content information, and the classification conditions from the analysis result acquisition request received from the reception unit 12Q. If the analysis result acquisition request further includes the comparison instruction information, the analysis unit 12R further reads the comparison instruction information.

Then, the analysis unit 12R reads all the wide angle images 60, photographed by the photographing apparatus 14 installed in the base B identified by the base ID that has been read, from the storage unit 12B (step SEQ208). Then, the analysis unit 12R analyzes the plurality of wide angle images 60 that have been read, according to the analysis content information included in the analysis result acquisition request (step SEQ210).

Then, the analysis unit 12R outputs the analysis results to the result image generation unit 12T and the display information generation unit 12S (steps SEQ212, SEQ214, SEQ216, and SEQ218).

The result image generation unit 12T generates the result image 70 indicating the analysis results received from the analysis unit 12R (step SEQ220). Then, the result image generation unit 12T outputs the generated result image 70 to the embedding unit 12X (step SEQ222).

The initial image setting unit 12V sets the initial image information indicating the wide angle image 60 to be displayed first, using the analysis results received by the analysis unit 12R, for each of the groups classified by the analysis unit 12R (step SEQ224). Then, the initial image setting unit 12V outputs the initial image information that has been set to the embedding unit 12X (step SEQ226).

The initial viewpoint direction setting unit 12W sets the initial viewpoint direction information indicating the initial viewpoint direction in the wide angle image 60 (step SEQ228). The initial viewpoint direction setting unit 12W sets the initial viewpoint direction information indicating the initial viewpoint direction, for each of the wide angle images 60 identified by the initial image information that is set by the initial image setting unit 12V.

Then, the initial viewpoint direction setting unit 12W outputs the initial viewpoint direction information that has been set to the embedding unit 12X (step SEQ230).

The embedding unit 12X embeds, in the result image 70 generated by the result image generation unit 12T, the display information that includes the initial image information and the initial viewpoint direction information (step SEQ232). The embedding unit 12X outputs the result image 70 in which the display information is embedded to the transmission and receiving unit 12K (step SEQ234). The transmission and receiving unit 12K transmits the result image 70 in which the display information is embedded to the information processing terminal 18 from which the analysis result acquisition request has been received in step SEQ202 (step SEQ236).

The display control unit 18D of the information processing terminal 18 displays the received result image 70 on the display unit 18G (step SEQ240).

The user of the information processing terminal 18 operates the input unit 18F to indicate an analysis result image G included in the result image 70. Thus, the reception unit 18C of the information processing terminal 18 receives the base image acquisition request (step SEQ242). Then, the transmission and receiving unit 18A of the information processing terminal 18 transmits the base image acquisition request received by the reception unit 18C to the server apparatus 12 (step SEQ244).

The transmission and receiving unit 12K of the server apparatus 12 that has received the base image acquisition request outputs the base image acquisition request to the reception unit 12Q (step SEQ246). The reception unit 12Q outputs the received base image acquisition request to the base image identification unit 12J (step SEQ247).

The base image identification unit 12J identifies the wide angle images 60, identified by the display information included in the received base image acquisition request, as the base images (step SEQ248, step SEQ250). Then, the base image identification unit 12J outputs the identified base images and the display information included in the base image acquisition request received in step SEQ247, to the transmission and receiving unit 12K (step SEQ252). As mentioned above, the initial image information and the initial viewpoint direction information are included in the display information.

The transmission and receiving unit 12K transmits the received base images and the display information to the information processing terminal 18 from which the base image acquisition request has been received in step SEQ244 (step SEQ254).

The display control unit 18D of the information processing terminal 18 reads the initial image information and the initial viewpoint direction information from the received display information (step SEQ256). Then, the display control unit 18D determines the wide angle image 60 to be displayed first from among the plurality of wide angle images 60 included in the received base images (step SEQ258).

Also, the display control unit 18D reads the initial viewpoint direction information from the received display information, to determine the initial viewpoint direction (step SEQ260). Then, the display control unit 18D displays the identified wide angle image 60, in the viewpoint direction indicated by the identified initial viewpoint direction information, on the display unit 18G (step SEQ262).

Note that, the user may operate the input unit 18F to operate the wide angle image 60 displayed on the display unit 18G to perform rotation, moving, or the like, on the wide angle image 60 (i.e., the user may input an screen page operation). In this case, the reception unit 18C of the information processing terminal 18 receives the screen page operation. As a result, the display control unit 18D of the information processing terminal 18 displays the wide angle image 60 for which the viewpoint direction is rotated, or magnification or size-reduction is performed, on the display unit 18G, according to the received screen page operation.

Also, the user may operate the input unit 18F, to change the time scale in the result image 70 displayed in step SEQ236. In this case, the process is returned to step SEQ200, and the information processing terminal 18 transmits the analysis result acquisition request including the changed time scale as the classification conditions to the server apparatus 12. As a result, the information processing terminal 18 can receive the result image 70 having the changed time scale, and display the result image on the display unit 18G.

Next, storage and analysis processes carried out by the server apparatus 12 will be described.

Figure 29:
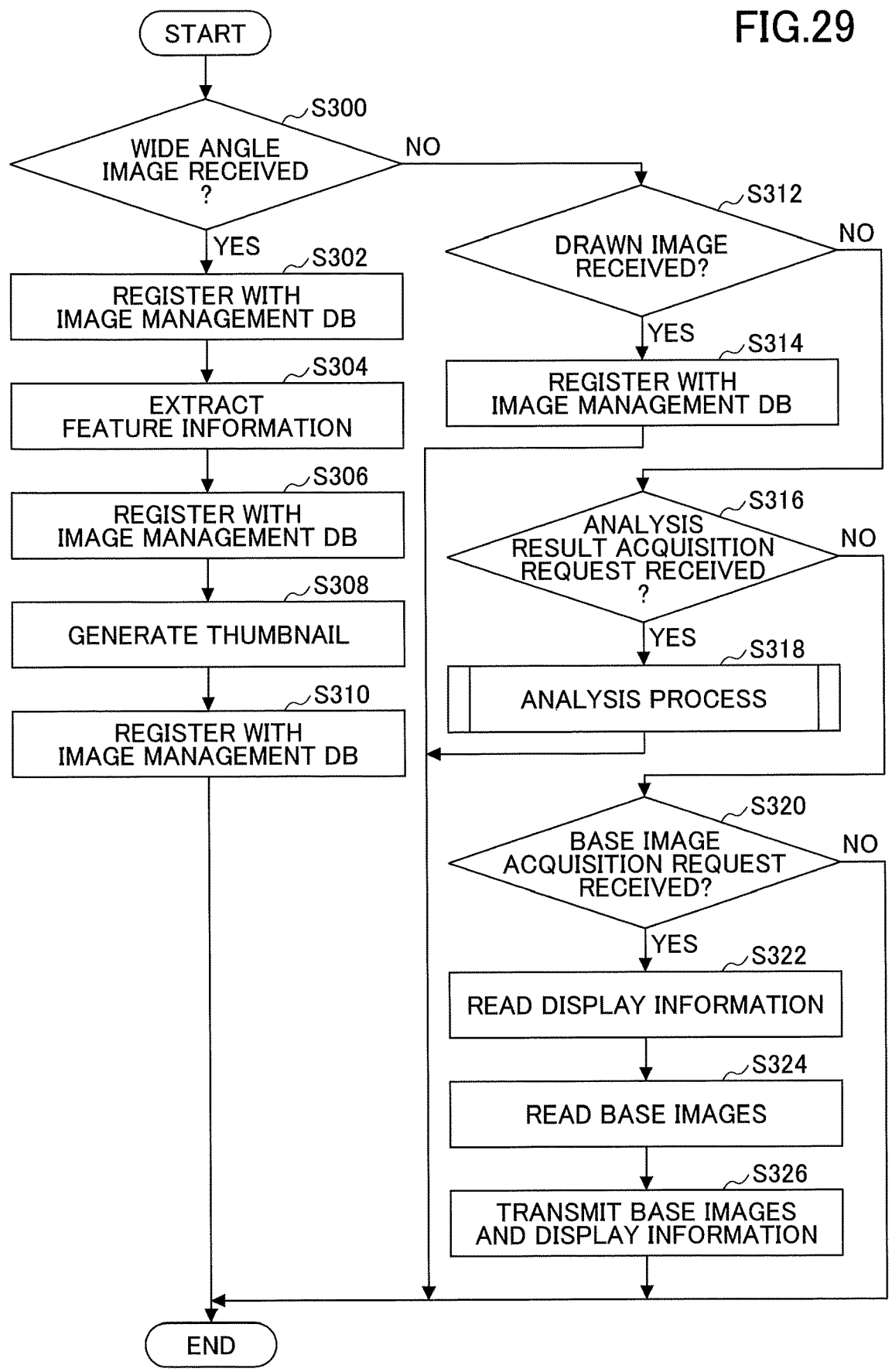
FIG. 29 is a flowchart illustrating one example of a storing and analyzing process carried out by the server apparatus according to the first embodiment.

FIG. 29 is a flowchart illustrating one example of storage and analysis processes carried out by the server apparatus 12.

First, the receiving unit 12H of the server apparatus 12 determines whether the receiving unit has received, from the photographing apparatus 14, a wide angle image 60 and related information 61 (step S300). If the determination result in step S300 is an affirmative determination (YES in step S300), the process proceeds to step S302.

In step S302, the storage control unit 12P registers the wide angle image 60 and the related information 61 received in step S300 with the image management DB 12C (step S302).

Next, the feature information extraction unit 12I extracts the feature information from the wide angle image 60 received in step S300 (step S304). Next, the storage control unit 12P registers the feature information extracted in step S304 with the image management DB 12C (step S306).

Next, the thumbnail generation unit 12M generates the thumbnail image of the wide angle images 60 received in step S300 (step S308). Next, the storage control unit 12P registers the thumbnail image generated in step S308 with the image management DB 12C (step S310). Then, the current routine ends.

On the other hand, if the determination result in step S300 is the negative determination (NO in step S300), the process proceeds to step S312. In step S312, the receiving unit 12H determines whether the receiving unit 12H has received the drawn image and the image ID from the information processing terminal 18. If the affirmative determination results from step S312 (YES in step S312), the process proceeds to step S314.

In step S314, the feature information extraction unit 12I associates the drawn image, the drawn image ID, and the image ID together, and registers the associated information with the image management DB 12C, through the storage control unit 12P (step S314). Then, the current routine ends.

On the other hand, if the negative determination results from step S312 (NO in step S312), the process proceeds to step S316. In step S316, the reception unit 12Q determines whether the reception unit 12Q has received the analysis result acquisition request. If the affirmative determination results from step S316 (YES in step S316), the process proceeds to step S318. In step S318, the analysis unit 12R, the result image generation unit 12T, and the display information generation unit 12S carries out the analysis process (step S318) (details will be described later). Then, the current routine ends.

On the other hand, if the negative determination results from step S316 (NO in step S316), the process proceeds to step S320. In step S320, the reception unit 12Q determines whether the reception unit 12Q has received the base image acquisition request (step S320). If the negative determination results from step S320 (NO in step S320), the current routine ends. If the affirmative determination results from step S320 (YES in step S320), the process proceeds to step S322.

In step S322, the base image identification unit 12J reads the display information from the base image acquisition request received in step S320 (step S322). Then, the base image identification unit 12J uses the read display information to read the wide angle images 60 as the base images from the storage unit 12B (step S324). Then, the base image identification unit 12J transmits the base images read in step S324, and the display information read in step S322, to the information processing terminal 18 through the transmission and receiving unit 12K (step S326). Then, the current routine ends.

Figure 30:
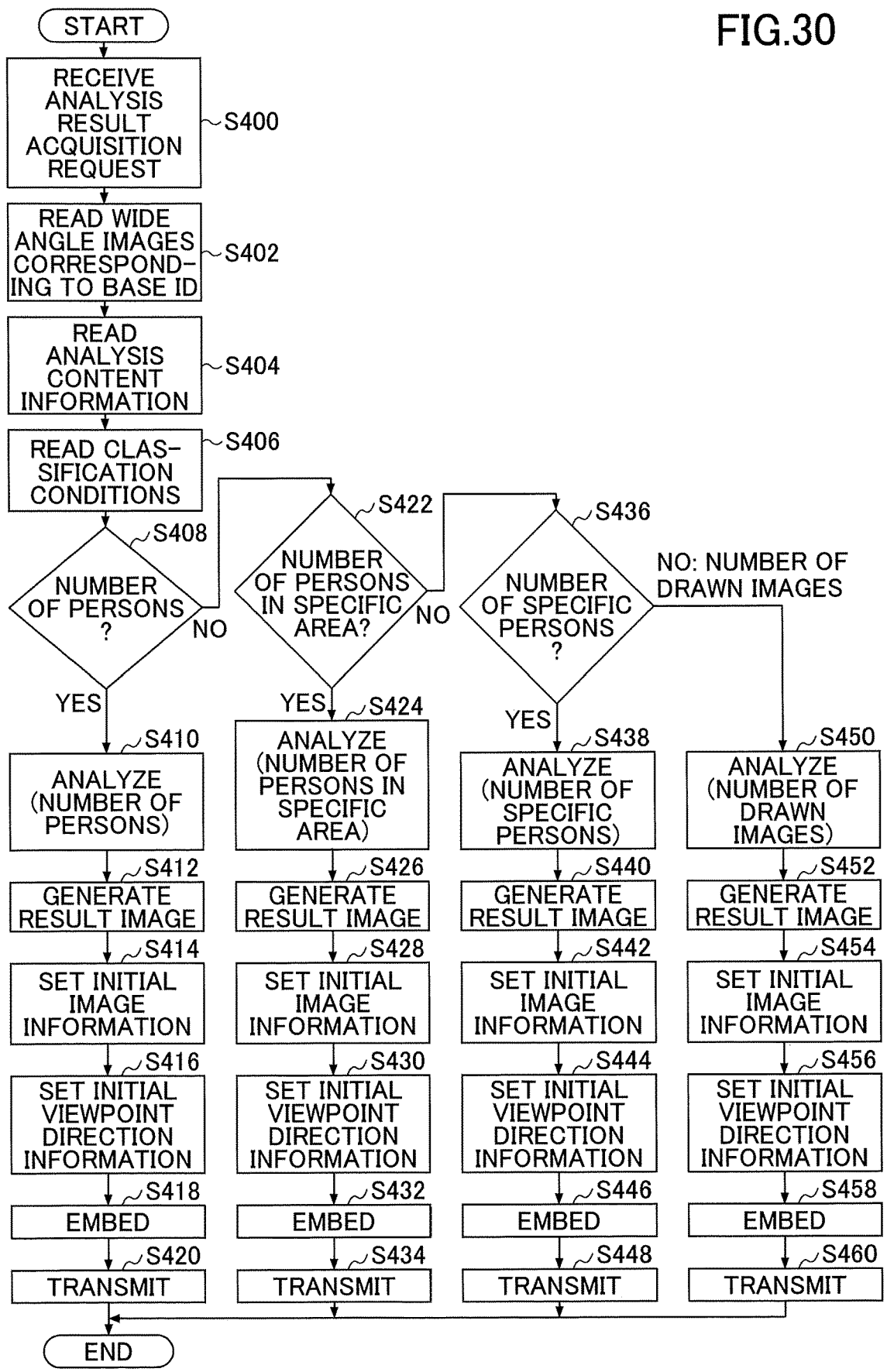
FIG. 30 is a flowchart illustrating one example of an analysis process carried out by the server apparatus according to the first embodiment.

Next, one example of the analysis process in step S318 of FIG. 29 will be described. FIG. 30 is a flowchart illustrating one example of the analysis process carried out by the server apparatus 12 (step S318 of FIG. 29).

First, the reception unit 12Q of the server apparatus 12 receives, from the information processing terminal 18, the analysis result acquisition request (step S400). The analysis unit 12R reads, from the image management DB 12C, the wide angle images 60 corresponding to the base ID included in the analysis result acquisition request received in step S400 (step S402). That is, the analysis unit 12R reads, from the base management DB 12D (see TABLE 1A), the photographing apparatus ID corresponding to the base ID included in the analysis result acquisition request received in step S400. Then, the analysis unit 12R reads, from the image management DB 12C (see TABLE 2), the wide angle images 60 corresponding to the read photographing apparatus ID. Thus, the analysis unit 12R reads the wide angle images 60 corresponding to the base ID.

Next, the analysis unit 12R reads the analysis content information included in the analysis result acquisition request received in step S400 (step S404). Also, the analysis unit 12R reads the classification conditions included in the analysis result acquisition request received in step S400 (step S406).

Then, the analysis unit 12R determines whether the analysis content information that has been read in step S404 indicates "the number of persons appearing in the wide angle image 60" (step S408). If step S408 results in the affirmative determination (YES in step S408), the process proceeds to step S410.

In step S410, the analysis unit 12R classifies the plurality of wide angle images 60 that have been read in step S402 into a plurality of groups according to the classification conditions that have been read in step S406. Then, the analysis unit 12R analyzes the plurality of wide angle images 60 included in each of the classified groups to determine the number of persons appearing in the wide angle images 60.

Next, the result image generation unit 12T generates the result image 70 indicating the analysis result of step S410 (step S412). According to the first embodiment, the result image generation unit 12T generates the result image 70 including the plurality of analysis result images G indicating the analysis results of the respective groups acquired through the analysis in step S410.

Next, the initial image setting unit 12V sets the initial image information indicating the wide angle image 60 to be displayed first on the information processing terminal 18, from among the plurality of wide angle images 60 included in each of the groups classified according to the classification conditions (step S414).

Next, the initial viewpoint direction setting unit 12W sets the initial viewpoint direction information for the wide angle image 60 that is set in step S414 by the initial image information corresponding to each group, according to the analysis content information (step S414).

Next, the embedding unit 12X embeds the display information in the analysis result image G corresponding to each group included in the result image 70 generated in step S412 (step S418). That is, the embedding unit 12X embeds, in the corresponding analysis result image G, the display information corresponding to each group including the identification information for identifying wide angle images 60 used as the base to derive the analysis result indicated by the analysis result image G corresponding to the group, the classification conditions included in the analysis result acquisition request received in step S400, and, the initial image information and the initial viewpoint direction information that have been set in steps S414 and S416.

Next, the transmission unit 12L transmits the result image 70 generated in step S412 and including the display information that is embed in step S418, to the information processing terminal 18 (step S420). Then, the current routine ends.

On the other hand, if step S408 results in the negative determination (NO in step S408), the process proceeds to step S422. In step S422, the analysis unit 12R determines whether the analysis content information that has been read in step S404 indicates "the number of persons appearing in the specific area of the wide angle image 60" (step S422). If step S422 results in the affirmative determination (YES in step S422), the process proceeds to step S424.

In step S424, the analysis unit 12R classifies the plurality of wide angle images 60 that have been read in step S402 into a plurality of groups according to the classification conditions that have been read in step S406. Then, the analysis unit 12R analyses the plurality of wide angle images 60 included in each of the classified groups to determine the number of persons appearing in the specific areas of the wide angle images 60.

Next, the result image generation unit 12T generates the result image 70 indicating the analysis results of step S424 (step S426). According to the first embodiment, the result image generation unit 12T generates the result image 70 including the plurality of analysis result images G indicating the analysis results for the respective groups acquired through the analysis in step S424.

Next, the initial image setting unit 12V sets the initial image information indicating the wide angle image 60 to be displayed first on the information processing terminal 18, from among the plurality of wide angle images 60 belonging to each of the groups classified according to the classification conditions (step S428).

Next, the initial viewpoint direction setting unit 12W sets the initial viewpoint direction information for each of the wide angle images 60 indicated by the initial image information that is set in step S428, according to the analysis content information (step S430).

Next, the embedding unit 12X embeds the display information in the analysis result image G corresponding to each group included in the result image 70 generated in step S426 (step S432). That is, the embedding unit 12X embeds the display information corresponding to each group, including the identification information for identifying the wide angle images 60 used as the base to derive the analysis result corresponding to each group; the classification conditions included in the analysis result acquisition request received in step S400; and the initial image information and the initial viewpoint direction information that have been set in steps S428 and S430, in the corresponding analysis result image G.

Next, the transmission unit 12L transmits the result image 70 generated in step S426 and including the display information that is embedded in step S432, to the information processing terminal 18 (step S434). Then, the current routine ends.

On the other hand, if step S422 results in the negative determination (NO in step S422), the process proceeds to step S436. In step S436, the analysis unit 12R determines whether the analysis content information that has been read in step S404 indicates "the number of specific persons appearing in the wide angle image 60" (step S436). If step S436 results in the affirmative determination (YES in step S436), the process proceeds to step S438.

In step S438, the analysis unit 12R classifies the plurality of wide angle images 60 that have been read in step S402 into a plurality of group according to the classification conditions that have been read in step S406. Then, the analysis unit 12R analyses the plurality of wide angle images 60 included in each of the classified groups to determine the number of specific persons appearing in the wide angle images 60.

Next, the result image generation unit 12T generates the result image 70 indicating the analysis results of step S438 (step S440). According to the first embodiment, the result image generation unit 12T generates the result image 70 including the plurality of analysis result images G indicating the analysis results for the respective groups acquired through the analysis in step S438.

Next, the initial image setting unit 12V sets the initial image information indicating the wide angle image 60 to be displayed first on the information processing terminal 18, from among the plurality of wide angle images 60 belonging to each of the groups classified according to the classification conditions (step S442).

Next, the initial viewpoint direction setting unit 12W sets the initial viewpoint direction information for each of the wide angle images 60 indicated by the initial image information that is set in step S442, according to the analysis content information (step S444).

Next, the embedding unit 12X embeds the display information in the analysis result image G corresponding to each group included in the result image 70 generated in step S440 (step S446). That is, the embedding unit 12X embeds the display information corresponding to each group, including the identification information for identifying the wide angle images 60 used as the base to derive the analysis result corresponding to each group; the classification conditions included in the analysis result acquisition request received in step S400; and the initial image information and the initial viewpoint direction information that have been set in steps S442 and S444, in the corresponding analysis result image G.

Next, the transmission unit 12L transmits the result image 70 generated in step S440 and including the display information that is embedded in step S446 to the information processing terminal 18 (step S449). Then, the current routine ends.

On the other hand, if step S436 results in the negative determination (NO in step S436), the process proceeds to step S450. A case where step S436 results in the negative determination is a case where the analysis content information that is read in step S404 indicates "the number of drawn images drawn in the wide angle image 60".

In step S450, the analysis unit 12R classifies the plurality of wide angle images 60 that have been read in step S402 into a plurality of group according to the classification conditions that has been read in step S406. Then, the analysis unit 12R analyses the plurality of wide angle images 60 included in each of the classified groups to determine the number of drawn images drawn in the wide angle images 60.

Next, the result image generation unit 12T generates the result image 70 indicating the analysis results of step S450 (step S452). According to the first embodiment, the result image generation unit 12T generates the result image 70 including the plurality of analysis result images G indicating the analysis results for the respective groups acquired through the analysis in step S450.

Next, the initial image setting unit 12V sets the initial image information indicating the wide angle image 60 to be displayed first on the information processing terminal 18, from among the plurality of wide angle images 60 belonging to each of the groups classified according to the classification conditions (step S442).

Next, the initial viewpoint direction setting unit 12W sets the initial viewpoint direction information for each of the wide angle images 60 indicated by the initial image information that is set in step S454, according to the analysis content information (step S456).

Next, the embedding unit 12X embeds the display information in the analysis result image G corresponding to each group included in the result image 70 generated in step S452 (step S458). That is, the embedding unit 12X embeds the display information corresponding to each group, including the identification information for identifying the wide angle images 60 used as the base to derive the analysis result corresponding to each group; the classification conditions included in the analysis result acquisition request received in step S400; and the initial image information and the initial viewpoint direction information that have been set in steps S454 and S456, in the corresponding analysis result image G.

Next, the transmission unit 12L, transmits the result image 70 generated in step S452 and including the display information that is embedded in step S458 to the information processing terminal 18 (step S460). Then, the current routine ends.

Figure 31:
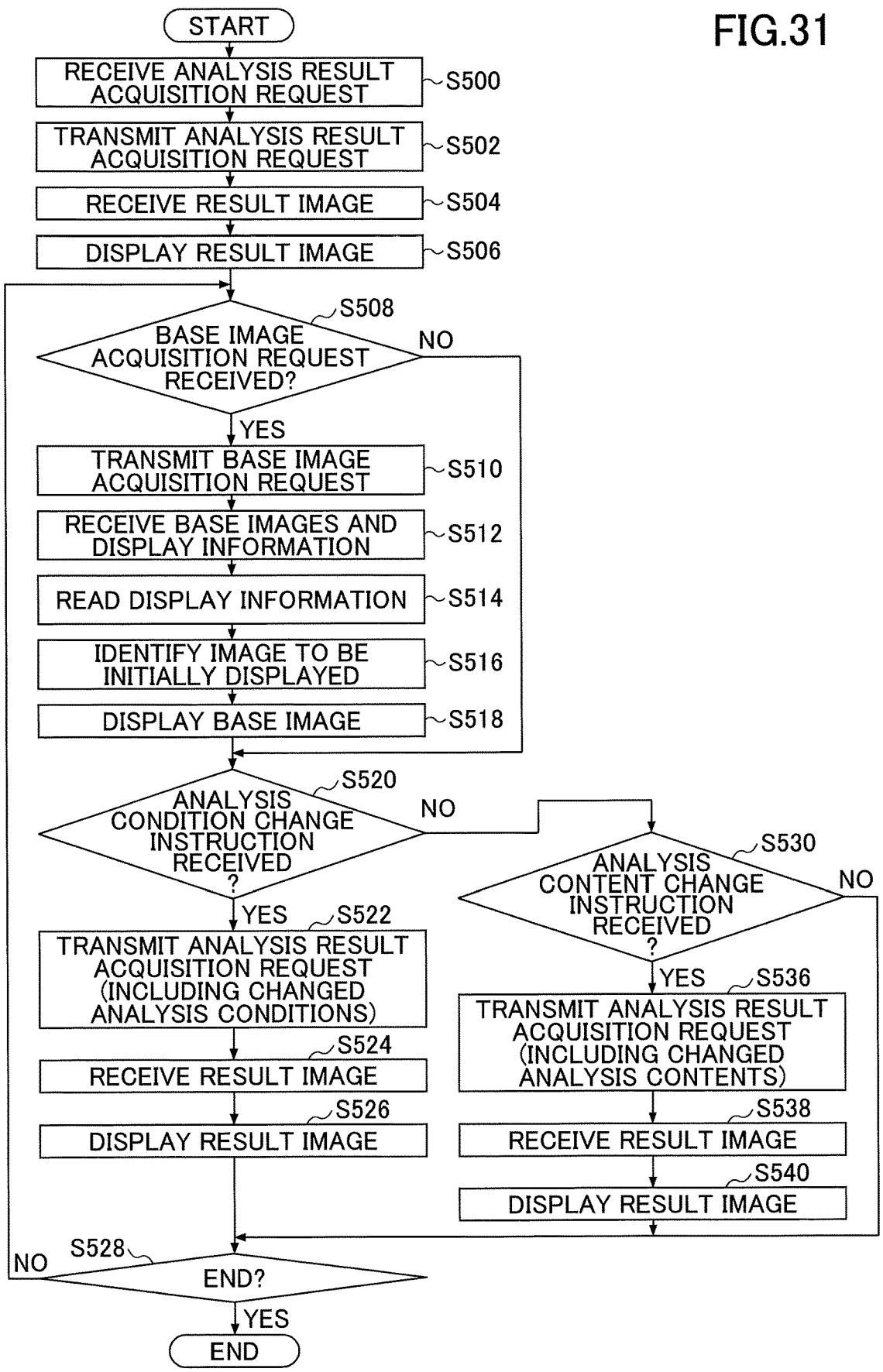
FIG. 31 is a flowchart illustrating one example of information processing carried out by the information processing terminal according to the first embodiment.

Next, one example of information processing carried out by the information processing terminal 18 will be described. FIG. 31 is a flowchart illustrating one example of information processing carried out by the information processing terminal 18.

First, the reception unit 18C of the information processing terminal 18 receives the analysis result acquisition request (step S500). As a result, the transmission and receiving unit 18A transmits the analysis result acquisition request received in step S500 to the server apparatus 12 (step S502).

Next, the transmission and receiving unit 18A receives the result image 70 from the server apparatus 12 (step S504). The display control unit 18D displays the result image 70 received in step S504 on the display unit 18G (step S506). Thus, the information processing terminal 18 displays the result image 70 according to the analysis result acquisition request transmitted in step S502 on the display unit 18G.

Next, the reception unit 18C determines whether the reception unit 18C has received the base image acquisition request (step S508). If step S508 results in the negative determination (NO in step S508), the process proceeds to step S520 described later. On the other hand, if step S508 results in the affirmative determination (YES in step S508), the process proceeds to step S510.

In step S510, the base image acquisition request received in step S508 is transmitted to the server apparatus 12 (step S510). As a result, the transmission and receiving unit 18A will receive, from the server apparatus 12, the base images and the display information (step S512).

The display control unit 18D reads the display information received in step S512 (step S514), and identifies the wide angle image 60 indicated by the initial display image information included in the display information from among the plurality of wide angle images 60 included in the base images received in step S512 (step S516).

Then, the display control unit 18D displays the wide angle image 60 identified in step S516 in the viewpoint direction indicated by the initial viewpoint direction information included in the display information received in step S512 on the display unit 18G (step S518).

Next, the reception unit 18C determines whether the reception unit 18C has received an analysis content change instruction (step S520). If step S520 results in the affirmative determination (YES in step S520), the process proceeds to step S522. In step S522, the transmission and receiving unit 18A transmits the analysis result acquisition request including the analysis contents after being changed according to the analysis content change instruction received in step S520 to the server apparatus 12 (step S522). As a result, the transmission and receiving unit 18A will receive the result image 70 from the server apparatus 12 (step S524). Next, the display control unit 18D displays the result image 70 received in step S524 on the display unit 18G (step S526).

Next, the information processing terminal 18 determines whether to end the process (step S528). For example, the information processing terminal 18 makes the determination in step S528 by determining whether the user has inputted an instruction to end the process by operating the input unit 18F.

If step S528 results in the affirmative determination (YES in step S528), the current routine ends. On the other hand, if step S528 results in the negative determination (NO in step S528), the process returns to step S508.

On the other hand, if step S520 results in the negative determination (NO in step S520), the process proceeds to step S530. In step S530, the reception unit 18C determines whether the reception unit 18C has received an analysis content change instruction from the input unit 18F (step S530). If step S530 results in the negative determination (NO in step S530), the process proceeds to the above-mentioned step S528. On the other hand, if step S530 results in the affirmative determination (YES in step S530), the process proceeds to step S536.

In step S536, the transmission and receiving unit 18A transmits the analysis result acquisition request including the analysis contents after being changed according to the analysis condition change information received in step S530 to the server apparatus 12 (step S536). As a result, the transmission and receiving unit 18A will receive the result image 70 from the server apparatus 12 (step S538). Next, the display control unit 18D displays the result image 70 received in step S538 on the display unit 18G (step S540). Then, the process proceeds to the above-mentioned step S528.

As described above, the information processing system 10 according to the first embodiment includes the server apparatus 12 and the information processing terminal 18 communicatable with the server apparatus 12. The server apparatus 12 includes the analysis unit 12R and the transmission unit 12L. The analysis unit 12R analyzes a plurality of wide angle images 60. The transmission unit 12L transmits the result image 70 indicating the analysis results of the analysis unit 12R to the information processing terminal 18. The information processing terminal 18 includes the transmission and receiving unit 18A (receiving unit) and the display control unit 18D. The transmission and receiving unit 18A receives the result image 70. The display control unit 18D displays the result image 70 on the display unit 18G.

Thus, according to the first embodiment, the analysis unit 12R of the server apparatus 12 analyzes the wide angle images 60, and transmits the result image 70 indicating the analysis results to the information processing terminal 18.

Therefore, the information processing system 10 according to the first embodiment can easily provide the analysis results of the plurality of wide angle images 60.

The server apparatus 12 includes the reception unit 12Q. The reception unit 12Q receives the analysis content information indicating the analysis contents for the wide angle images 60. The analysis unit 12R analyzes the wide angle images 60 concerning the analysis contents according to the analysis content information.

The analysis contents include the number of objects appearing in the wide angle images 60; the number of objects appearing in the predetermined specific areas of the wide angle images 60; the number of drawn images drawn in the wide angle images 60; or the number of specific objects appearing in the wide angle images 60.

The server apparatus 12 includes the base image identification unit 12J (identification unit). The base image identification unit 12J identifies the wide angle images 60 used as a base to derive the analysis result indicated by the result image 70 as the base images. The transmission unit 12L of the server apparatus 12 transmits the base images to the information processing terminal 18. The transmission and receiving unit 18A of the information processing terminal 18 (receiving unit) receives the base images. The display control unit 18D of the information processing terminal 18 displays the wide angle image 60 as the base image on the display unit 18G.

The server apparatus 12 includes the initial image setting unit 12V (first setting unit). The initial image setting unit 12V sets the initial image information indicating the wide angle image 60 to be displayed first on the information processing terminal 18, from among the plurality of wide angle images 60 included in the base images. The transmission unit 12L of the server apparatus 12 transmits the base images and the initial image information to the information processing terminal 18. The transmission and receiving unit 18A (receiving unit) of the information processing terminal 18 receives the base images and the initial image information. The display control unit 18D of the information processing terminal 18 displays, from among the plurality of wide angle images 60 included in the base images, the wide angle image 60 indicated by the initial image information on the display unit 18G.

The initial image setting unit 12V (first setting unit) of the server apparatus 12 sets the initial image information according to the analysis contents indicated by the analysis content information.

The transmission unit 12L of the server apparatus 12 transmits the base images as the plurality of wide angle images 60 used as a base to derive the analysis result indicated by the result image 70, and the comparison identification information to identify another wide angle image 60 corresponding to each of the plurality of wide angle images 60 as the base images to the information processing terminal 18. The transmission and receiving unit 18A (receiving unit) of the information processing terminal 18 receives the base images and the comparison identification information. The display control unit 18D of the information processing terminal 18 displays the wide angle image 60 included in the base images, and the corresponding wide angle image 60 identified by the comparison identification information on the display unit 18G.

The server apparatus 12 includes the initial viewpoint direction setting unit 12W (second setting unit). The initial viewpoint direction setting unit 12W sets the initial viewpoint direction information indicating the initial viewpoint direction in the wide angle image 60. The transmission unit 12L of the server apparatus 12 transmits the base images, the initial image information, and the initial viewpoint direction information to the information processing terminal 18. The transmission and receiving unit 18A (receiving unit) of the information processing terminal 18 receives the base images, the initial image information, and the initial viewpoint direction information. The display control unit 18D of the information processing terminal 18 displays, from among the plurality of wide angle image 60 included in the base images, the wide angle image 60 indicated by the initial image information, using the initial viewpoint direction indicated by the initial viewpoint direction information as a viewpoint direction, on the display unit 18G.

The initial viewpoint direction setting unit 12W (second setting unit) of the server apparatus 12 sets, according to the analysis contents indicated by the analysis content information, the initial viewpoint direction information.

The analysis unit 12R of the server apparatus 12 analyses the plurality of wide angle images belonging to each of the plurality of groups acquired through classifying the plurality of wide angle images 60 into the groups according to the predetermined classification conditions. The transmission unit 12L of the server apparatus 12 transmits the result image 70 including the plurality of analysis result images G indicating the analysis results for the respective groups, to the information processing terminal 18.

The classification conditions include a classification item of at least either the photographed date and time or the photographed place.

The information processing system 10 includes one or more of the server apparatuses 12. Each server apparatus 12 includes the analysis unit 12R and the transmission unit 12L. The analysis unit 12R analyzes the plurality of wide angle images 60. The transmission unit 12L transmits the result image 70 indicating the analysis results of the analysis unit 12R to the information processing terminal 18.

The information processing terminal 18 includes the display unit 18G, the transmission and receiving unit 18A (receiving unit), and the display control unit 18D. The transmission and receiving unit 18A receives the result image 70. The display control unit 18D displays the result image 70 on the display unit 18G.

Programs according to the first embodiment cause a computer to receive the result image 70 indicating the analysis results of the plurality of wide angle images 60 acquired through photographing; and display the result image 70 on the display unit 18G.

Programs according to the first embodiment also cause a computer to analyze the plurality of wide angle images 60; and transmit the result image 70 indicating the analysis results to the information processing terminal 18.

Note that, the respective programs executed in the server apparatus 12, the photographing apparatus 14, and the information processing terminal 18 to carry out the above-mentioned processes are previously stored in non-volatile storage media such as NV-RAMs, ROMs, or the like, and are then provided. Also, the respective programs executed in the server apparatus 12, the photographing apparatus 14, and the information processing terminal 18 to carry out the above-mentioned processes may be stored in computer readable recording media such as CD-ROMs, flexible disks (FD), CD-Rs, or DVDs (Digital Versatile Disks) in installable or executable forms, and may be then provided.

It is also possible to store the respective programs executed in the server apparatus 12, the photographing apparatus 14, and the information processing terminal 18 to carry out the above-mentioned processes in computers connected via networks such as the Internet, cause the programs to be downloaded via the networks, and thus, provide or distribute the programs.

Also, the respective programs executed in the server apparatus 12, the photographing apparatus 14, and the information processing terminal 18 to carry out the above-mentioned processes may be stored in a ROM or the like and then provided.

Also, the respective programs executed in the server apparatus 12, the photographing apparatus 14, and the information processing terminal 18 to carry out the above-mentioned processes have module configurations including the above-mentioned respective units. As actual hardware, a CPU (processor) is used to read the programs from storage media, and execute the programs. Thus, the above-mentioned respective units are implemented in the main storages.

Note that, the various sorts of information stored in the storage unit 12B of the server apparatus 12 may be stored also in an external apparatus. In this case, the external apparatus and the server apparatus 12 may be connected via a network or the like.

According to the first embodiment, it is possible to easily acquire a result of analyzing a plurality of wide angle images.

A second embodiment of the present invention will now be described.

Conventionally, a store manager or the like analyzes the customers' behavior and reflects the analysis results in store management and product planning. In this regard, images inside the store taken by cameras installed in the store may be used for the analysis. Then, the store manager or the like can determine how the customers move in the store and where the customers stay in the store by checking the thus taken store inside images. As a result, it may be possible to determine the customers' flow lines in the store, and also, it may be possible to determine which products or which product display methods are effective to cause the customers to be more interest in the products. Thus, it is possible to reflect the analysis results in store management and product planning.

According to a monitoring system (for example, see Japanese Laid-Open Patent Application No. 2009-048229), such information is provided as to allow a store manager or the like to easily analyze the information after modifying images taken by cameras by combining cameras with an image processing technology. Japanese Laid-Open Patent Application No. 2009-048229 discloses a person behavior analysis apparatus by which a store inside space is finely divided, and thus, a plurality of sub-areas are acquired. Then, a flow line of a person who passes through a certain sub-area is extracted from flow line data stored in a flow line database.

By thus detecting persons from an image, such a person detection result may be added to the original image in a form of a distribution expression such as a heat map where an object is divided into squares and a display color of each square depends an attention degree of the square.

In this regard, by using a wide angle camera having a wide angle of view as a monitoring camera, it is possible to reduce the cost because a wide area can be covered by a single camera. Therefore, cases where wide angle cameras are used as monitoring cameras have been increased.

However, if a wide angle image having a wide angle of view is used for the above-mentioned distribution expression such as a heat map, it may be difficult to acquire desired information. For example, no person is present on a ceiling of a store. Therefore, if a ceiling appears in a wide angle image, a heat map of the store inside including the ceiling is generated. In such a case, because persons are far more likely present in a passage than the ceiling, the passage may be clearly colored red in the heat map. From such a heat map, it may be difficult to finely determine how many persons are present in each zone of the passage.

In consideration of the situation, an area may be set at a desired position in a wide angle image, and objects such as persons may be detected from the area that is set. In this regard, an image analysis process such as a person detection process may be carried out in a state where the wide angle image has been transformed into a planar image. Then, a store manager or the like may study such an image analysis result in a state where the image analysis result is applied to the wide angle image. However, in the related art, it may be difficult to apply such a person detection result or the like to an area that is set in a wide angle image.

The second embodiment of the present invention has been made in consideration of the situation, and an object is to provide an information processing system with which it is possible to add additional information to a wide angle image.

According to the second embodiment that will now be described, it is possible to provide an information processing system with which it is possible to add additional information to a wide angle image.

Below, the second embodiment of the present invention will be described with reference to the drawings.

The description of the second embodiment that will now be made includes mainly the different points from the first embodiment described above, and duplicate description will be omitted.

Figure 32A:
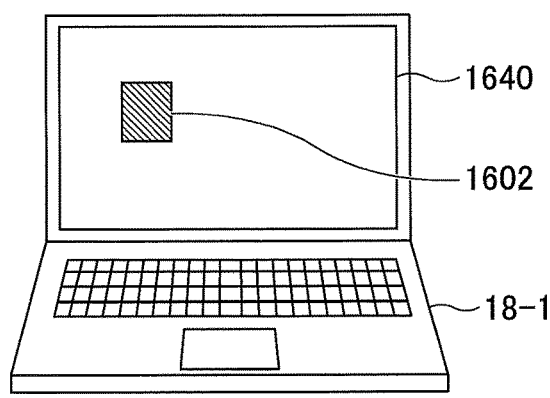
FIGS. 32A-32C illustrate one example of an outline of a process of an information processing system according to a second embodiment of the present invention.
Figure 32B:
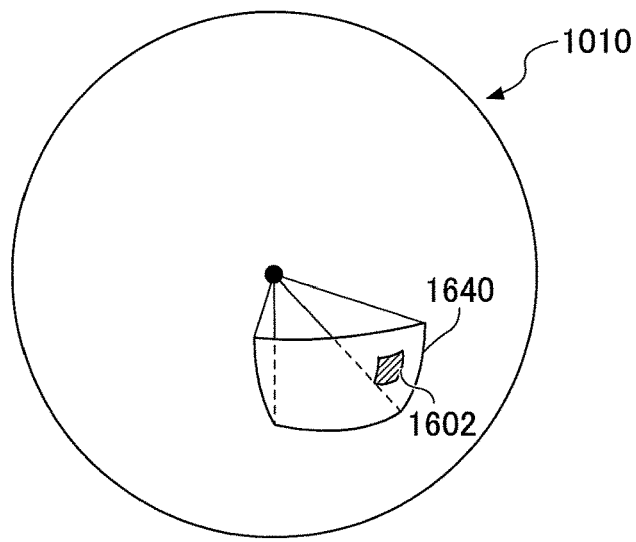
Figure 32C:
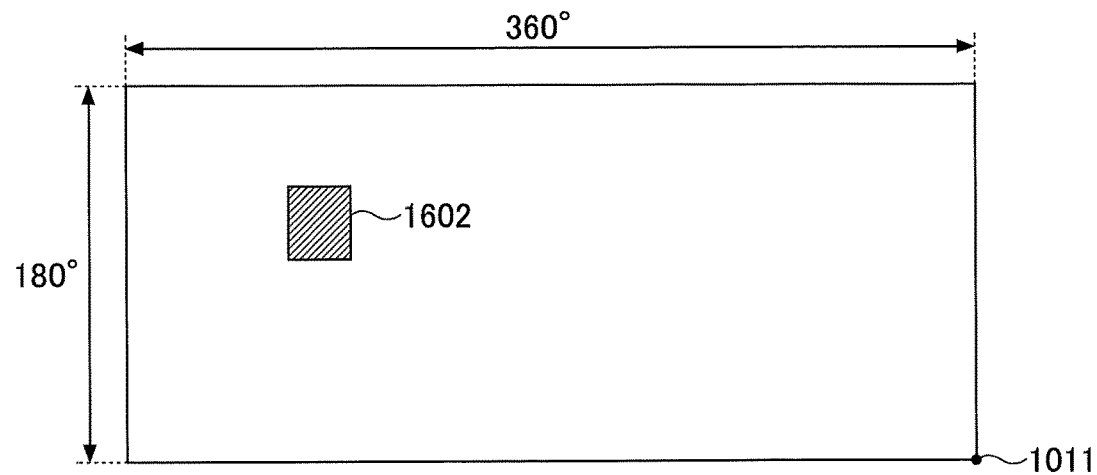

FIGS. 32A-32C illustrates one example of an outline of a process of an information processing system 10-1 according to the second embodiment. The information processing system 10-1 includes a photographing apparatus 14-1 capable of photographing a surrounding angle of view of 360°. However, the photographing apparatus 14-1 is not limited to having such a function. Hereinafter, images photographed by the photographing apparatus 14-1 will be referred to as wide angle images.

As illustrated in FIG. 32A, a viewer Y of an information processing terminal 18-1 may operate the information processing terminal 18-1 to view a desired area of a given wide angle image 1010 from a display screen 1640 of the information processing terminal 18-1 by rotating, magnifying, reducing the size of, or the like, the wide angle image 1010. The wide angle image 1010 has a spherical shape, and therefore, strictly speaking, the area of the wide angle image displayed on the display screen 1640 is also curved three-dimensionally. However, because the area in the display screen 1640 is merely a small portion of the wide angle image 1010, the viewer Y hardly feels uneasy due to this fact.

The viewer Y may set a desired area 1602 in the wide angle image 1010 in a state where the wide angle image 1010 has not been transformed into a planar image. For example, opposing corners of the area 1602 are identified by, for example, coordinates on the display screen 1640 (hereinafter, referred to as screen coordinates).

Although the display screen 1640 is two-dimensional, the area 1602 that is set by the viewer Y is present actually on a curved surface. Therefore, as illustrated in FIG. 32B, the information processing terminal 18-1 transforms the screen coordinates representing the area 1602 that is set by the viewer Y into a world coordinate system (three-dimensional coordinates). Thereby, the position of the area 1602 on the curved surface will be accurately identified.

As illustrated in FIG. 32B, the information processing terminal 18-1 then transforms the three-dimensional coordinates of the area 1602 in the world coordinate system into two-dimensional coordinates. The two-dimensional coordinates are the coordinates in the coordinate system that is used before the wide angle image is transformed into the planar image. Therefore, the position of the area 1602 in the planar image 1011 is appropriately identified.

The planar image 1011 is an image to be used for person detection analysis. A person detected area (an object area) where a person is detected is also identified as two-dimensional coordinates of the planar image 1011. Therefore, it is possible to treat the person detected area and the area 1602 that is set by the viewer Y in the same coordinate system, and it is possible to determine whether a person is present in the area 1602 based on the positional relationships between the person detected area and the area 1602.

Also, if the information processing terminal 18-1 will again display the area 1602, the coordinates of the area 1602 are transformed into the three-dimensional coordinates the same as the coordinates of the wide angle image 1010. Therefore, the area 1602 that has been set by the viewer Y is displayed in the same conditions as the conditions where the area has been set.

Thus, the information processing system according to the second embodiment can reduce the cost by using the photographing apparatus 14-1 that photographs the wide angle image 1010. Also, because the viewer Y sets the area 1602 in wide image data such as the wide angle image 1010, it is possible to exclude the ceiling or the like from being used as a place from where detection is carried out. Also, even when the area 1602 is set in warped image data such as the wide angle image 1010, the coordinates of the area 1602 is transformed into the coordinates of the coordinate system of the planar image 1011 from which analysis (image processing) such as a person detection process will be carried out. Therefore, it is easy to apply a result of analysis such as a result of a person detection process to the area 1602 that has been set.

Note that the photographing apparatus 14-1 initially outputs a planar image. However when the viewer Y finally views the image from the photographing apparatus 14-1, the wide angle image 1010 where the planar image is pasted on the wide angle image surface such as an entire celestial sphere surface is generated. According to the second embodiment, after the area 1602 is set by the viewer Y, the coordinate system of the area 1602 is transformed into the coordinate system of the planar image 1011.

Information concerning an area means information concerning an area generated based on a result of analyzing a wide angle image. If a result of analyzing a wide angle image is a result of detecting an object, information concerning an area means information as to where an object is present. If a result of analyzing a wide angle image is contents of a movement of an object, information concerning an area is information concerning how the object is moving. If a result of analyzing a wide angle image is a state of an object, information concerning an area is information concerning the state of the object. Information concerning an area may be information acquired from modifying a result of analyzing a wide angle image. For example, if there is a result of analyzing a wide angle image for a certain period of time, information concerning an area is information acquired from modifying information concerning the number of times or the frequency of detecting an object, the number of times or the frequency of changes of a state of the object, or the like.

The system configuration of the information processing system 10-1 according to the second embodiment is generally the same as the configuration of the information processing system 10 according to the first embodiment described above. Therefore, duplicate description will be omitted. In order to clearly distinguish the respective elements of the information processing system 10-1 from the corresponding but not the same elements of the information processing system 10 of the first embodiment, the reference signs of the respective elements of the second embodiment have the suffix "–1". Thus, as illustrated in FIG. 33, the information processing system 10-1 according to the second embodiment includes a server apparatus 12-1 corresponding to but not the same as the server apparatus 12 of the first embodiment, a photographing apparatus 14-1 corresponding to but not the same as the photographing apparatus 14 of the first embodiment, and an information processing terminal 18-1 corresponding to but not the same as the information processing terminal 18 of the first embodiment.

Figure 33:
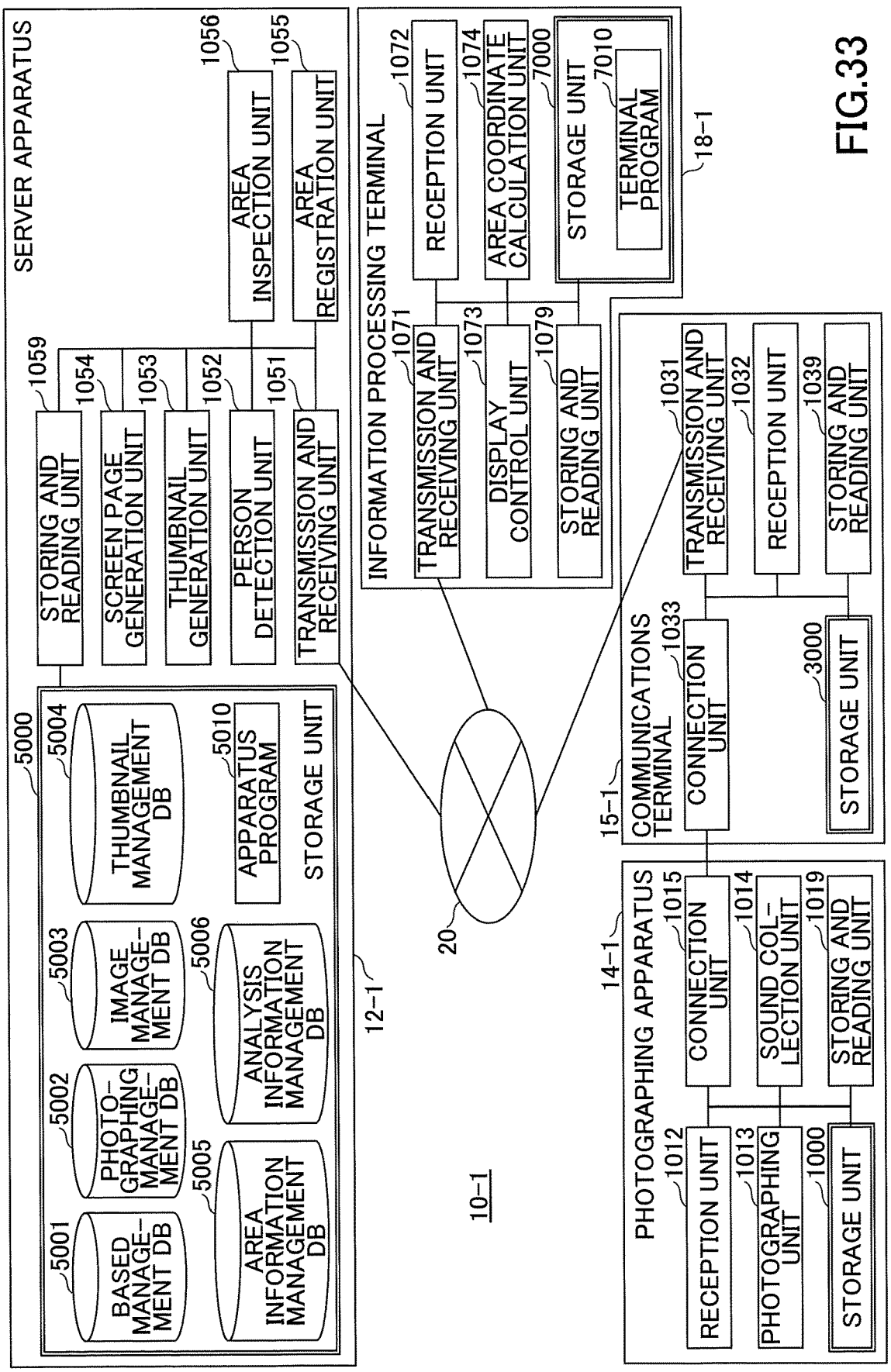
FIG. 33 is a block diagram illustrating examples of functional configurations of a photographing apparatus, a communications terminal, a server apparatus, and an information processing terminal in the information processing system according to the second embodiment.

FIG. 33 is a block diagram illustrating examples of functional configurations of the photographing apparatus 14-1, the communications terminal 15-1, the server apparatus 12-1, and the information processing terminal 18-1 in the information processing system 10-1.

The photographing apparatus 14-1 includes a reception unit 1012, a photographing unit 1013, a sound collection unit 1014, a connection unit 1015, and a storing and reading unit 1019. These units are functions or devices implemented as a result of some of the respective elements illustrated in FIG. 8 operating according to instructions from the CPU 111 according to a photographing apparatus program written in the DRAM 114 from the SRAM 113.

Also, the photographing apparatus 14-1 includes a storage unit 1000 implemented by one or more of the ROM 112, the SRAM 113, and the DRAM 114 of FIG. 8. The storage unit 1000 stores the photographing apparatus program and terminal IDs.

The reception unit 1012 of the photographing apparatus 14-1 is implemented mainly by the operation unit 115 and a process of the CPU 111 of FIG. 8, and receives an inputting operation of the user who may be a person who has installed the photographing apparatus 14-1 in a store or the like. Note that, the photographing apparatus 14-1 automatically and periodically photographs the surroundings even without being operated by the user. The actual period of the periodical photographing may be set by the user to the photographing apparatus 14-1, or the viewer Y may set the actual period through the server apparatus 12-1.

The photographing unit 1013 is implemented mainly by the photographing unit 101, the image processing unit 104, the photographing control unit 105, and a process of the CPU 111 of FIG. 8, photographs scenery or the like, and generate corresponding image data.

The sound collection unit 1014 is implemented mainly by the microphone 108, the sound processing unit 109, and a process of the CPU 111 of FIG. 8, and collects sound around the photographing apparatus 14-1.

The connection unit 1015 is implemented mainly by the network I/F 116 and a process of the CPU 111 of FIG. 8, receives the power supply from the communications terminal 15-1, and carries out data communications with the communications terminal 15-1.

The storing and reading unit 1019 is implemented mainly by a process of the CPU 111 of FIG. 8, stores various sorts of data in the storage unit 1000, and reads various sorts of data from the storage unit 1000. Note that, below, the mention of "through the storing and reading unit 1010" may be omitted when the photographing apparatus 14-1 stores data in or reads data from the storage unit 1000.

The communications terminal 15-1 includes a transmission and receiving unit 1031, a reception unit 1032, a connection unit 1033, and a storing and reading unit 1039.

photographing management DB 5002, an image management DB 5003, a thumbnail management DB 5004, an area information management DB 5005, and an analysis information management DB 5006 are built. These databases will now be described.

TABLE 4

| DISTRICT ID | DISTRICT NAME | BASE ID | BASE NAME | BASE LAYOUT MAP | TERMINAL ID |
|---|---|---|---|---|---|
| a001 | TOKYO | s001 | SHIBUYA SHOP | 100008ifauy.jpg | t0001, t0002 t0003, t0004 t0005, t0006 |
| a001 | TOKYO | s002 | YURAKUCHO SITE | 100009ifauy.jpg | t0021, t0022 t0023, t0024 |
| . | . | . | . | . | . |
| . | . | . | . | . | . |

These units are functions or devices implemented as a result of some of the respective elements illustrated in FIG. 10 operating according to instructions from the CPU 1301 according to a communications terminal program written in the RAM 1304 from the ROM 1302.

Also, the communications terminal 15-1 includes a storage unit 3000 implemented by the ROM 1302 and the RAM 1304 of FIG. 10. The storage unit 3000 stores the communications terminal program.

The transmission and receiving unit 1031 of the communications terminal 15-1 is implemented mainly by the communications unit 1305 and a process of the CPU 1301 of FIG. 10, and transmits various sorts of data to and receives various sorts of data from the server apparatus 12-1 via the wireless router 16 (see FIG. 1) and the communications network 20. Note that, below, the mention of "through the transmission and receiving unit 1031" may be omitted when the communications terminal 15-1 carries out communications with the server apparatus 12-1.

The reception unit 1032 is implemented mainly by a process the CPU 1301 of FIG. 10, and receives the user's inputting operation.

The connection unit 1033 is implemented mainly by the USB I/F 1303 and a process of the CPU 1301 of FIG. 10, supplies the power to the photographing apparatus 14-1, and carries out data communications with the photographing apparatus 14-1.

The storing and reading unit 1039 is implemented mainly by a process of the CPU 1301 of FIG. 10, stores various sorts of data in the storage unit 3000, and reads various sorts of data from the storage unit 3000. Note that, below, the mention of "through the storing and reading unit 1039" may be omitted when the communications terminal 15-1 stores data in or reads data from the storage unit 3000.

The server apparatus 12-1 includes a transmission and receiving unit 1051, a person detection unit 1052, a thumbnail generation unit 1053, a screen page generation unit 1054, an area registration unit 1055, an area inspection unit 1056, and a storing and reading unit 1059. These units are functions or devices implemented as a result of some of the respective elements illustrated in FIG. 9 operating according to instructions from the CPU 501 according to a server apparatus program 5010 written in the RAM 503 from the HD 505.

Also, the server apparatus 12-1 includes a storage unit 5000 implemented by the RAM 503 and HDD 505 of FIG. 9. In the storage unit 5000, a base management DB 5001, a TABLE 4 is a base management table illustrating respective items of information stored in the base management DB 5001 in a form of a table. In the base management table, respective fields of a district ID, a district name, a base ID, a base name, a base layout map, and an apparatus ID are associated with each other and are stored. Each line in the base management table may be called a record. This manner is also applied to any other tables. The district ID is identification information for identifying a district. One example of the district ID is a combination of different numerals and alphabets.

The district name indicates an area or a region of a land, i.e., for example, Kanto, Tokyo, Shibuya Ward, New York State, New York City, or the like. A district name may also be called a region name. Note that identification information means a name, a code, a character string, a numerical value, or any combination of a name, a code, a character string, and a numerical value, to be used to distinguish a specific object from among a plurality of objects. This manner is also applicable to IDs or identification information mentioned below.

The base ID is one example of identification information to identify a base. The base ID is determined to be different from the base name. The base ID may also be called base unique information. One example of the base ID is a combination of different numerals and alphabets. The base means a place as a ground where the photographing apparatus 14-1 is installed and photographs the surroundings. One example of the base is a store.

The base name is a store name such as Shibuya shop, a site name such as Shibuya site, or the like. As the base layout map, a file name of image data of a layout of each base, a map, or the like, is registered. By the base layout map, the positions the photographing apparatuses 14-1, the products sold in the shop, or the like, are determined as the two-dimensional coordinates.

The terminal ID is identification information for identifying the photographing apparatus 14-1, and may be called terminal unique information. The terminal ID is, for example, a numerical value, an IP address, or a MAC address different from the serial number, the product number, and the model number. However, the terminal ID is not limited to these numbers, and so forth. As illustrated in TABLE 4, one or more photographing apparatuses (terminal IDs) are installed in one base, and the positions of the photographing apparatuses are managed using the layout map or the like. The base management table may be registered by the user or the viewer Y. The base management table may be registered also by a supplier of the information processing system 10-1.

TABLE 5

| BASE ID | PHOTO-GRAPHING TITLE | PHOTO-GRAPHING START DATE AND TIME | PHOTO-GRAPHING END DATE AND TIME |
|---|---|---|---|
| s001 | SATURDAY AND SUNDAY SALE | 2015.7.4.10:00 | 2015.7.4.12:00 |
| s002 | INAUGURATION FESTIVAL | 2015.7.4.18:00 | 2015.7.4.19:00 |
| . | . | . | . |
| . | . | . | . |
| . | . | . | . |

TABLE 5 is a photographing management table indicating each item of information stored in the photographing management DB 5002 in a form of a table. In the photographing management table, for each base ID, respective fields of a photographing title, photographing start date and time, and photographing end date and time are associated and are stored. The photographing title is a title of an event that the viewer Y inputs. That is, if a certain event where the viewer Y wishes to monitor activity of consumers will be held in a store, the name of the event is the photographing title. Because the viewer Y can determine the photographing title, the photographing title may be different from the actual event name. For example, simply the photographed year, month and day may be used. When the viewer Y will extract desired image data from a plurality of files of image data, the viewer Y can use the corresponding photographing title. Note that, in one event, a plurality of sets of image data are photographed in a time-series manner (periodically). The photographing start date and time is date and time that are input by the viewer Y, and indicate date and time at which the photographing apparatus 14-1 starts (or has started) photographing. The photographing end date and time is date and time that are input by the viewer Y, and indicate date and time at which the photographing apparatus 14-1 ends (or has ended) photographing. The viewer Y can previously register the photographing start date and time and the photographing end date and time (i.e., photographing reservation). Mainly the server apparatus 12-1 registers the photographing management table.

TABLE 6

| TERMINAL ID | IMAGE ID | IMAGE DATA FILE NAME | PHOTOGRAPHED DATE AND TIME |
|---|---|---|---|
| t0001 | au123456ifauy | au123456ifauy.jpg | 2015.7.4.10:00 |
| t0001 | au123457ifauy | au123467ifauy.jpg | 2015.7.4.10:10 |
| . | . | . | . |
| . | . | . | . |
| . | . | . | . |

TABLE 6 is an image management table illustrating respective items of information stored in the image management DB 5003 in a form of a table. In the image management table, for each terminal ID, an image ID, an image data file name, and photographed date and time are associated and stored. The image ID is one example of identification information for uniquely identifying image data. The image ID may also be called image unique information. The image data file name is a file name of the image data identified by the image ID. The photographed date and time are date and time at which the image data is photographed by the photographing apparatus 14-1 indicated by the terminal ID. Also the image data is stored in the storage unit 5000.

For example, when the viewer Y wishes to view an image file, the viewer Y uses the information processing terminal 18-1 to access the server apparatus 12-1, and selects the corresponding photographing title from the photographing management table of TABLE 5. The server apparatus 12-1 then reads the terminal ID associated with the base ID of the photographing title from the base management table of TABLE 4. Because the terminal ID is thus known, the server apparatus 12-1 can determine the image data having the photographed dates and times included in the interval between the photographing start date and time and the photographing end date and time from among the image data associated with the terminal ID in the image management table.

It is also possible for the viewer Y to directly input the terminal ID or the base ID. According to the second embodiment, for the sake of simplification, a case will be mainly assumed where the viewer Y inputs the terminal ID to view corresponding image data. Mainly the server apparatus 12-1 registers the image management table.

TABLE 7

| IMAGE ID | THUMBNAIL ID | THUMBNAIL IMAGE DATA FILE NAME | PREDETERMINED AREA INFORMATION |
|---|---|---|---|
| au123456ifauy | th123456 | au123456ifauy.thum.jpg | rH234, rV450, angle32 |
| au123457ifauy | th123457 | au123457ifauy.thum.jpg | rH134, rV350, angle35 |
| . | . | . | . |
| . | . | . | . |
| . | . | . | . |

TABLE 7 is a thumbnail management table illustrating respective items of information stored in the thumbnail management DB 5004 in a form of a table. A thumbnail means a size like a thumbnail. A thumbnail image means image data reduced in size or reduced in the number of pixels for being used in a list.

In the thumbnail management table, for each image ID, a thumbnail ID, a thumbnail image data file name, and predetermined area information are associated and stored. The thumbnail ID is one example of identification information for uniquely identifying a thumbnail image generated based on the image data indicated by the image ID. The thumbnail ID may be also called as thumbnail unique information. The thumbnail image data file name is a file name of the thumbnail image indicated by the thumbnail ID. The thumbnail image data file name is determined by the server apparatus 12-1. The predetermined area information represents a predetermined area for which the thumbnail image is generated in the image data indicated by the image ID. Mainly the server apparatus 12-1 registers the thumbnail management table.

TABLE 8

| TERMINAL ID | REGISTERED AREA ID | REGISTERED AREA NAME | VALUE | ASSOCIATING |
|---|---|---|---|---|
| t0001 | area_1 | REFRIGERATOR | x1, y1, width1, height1 | area_3 |
| | area_2 | SPECIAL PRICES FOR WINTER GOODS | x2, y2, width2, height2 | — |
| | area_3 | IN FRONT OF CASH REGISTER | x3, y3, width3, height3 | — |
| ... | ... | ... | ... | ... |
| . | . | . | . | . |
| . | . | . | . | . |
| . | . | . | . | . |

TABLE 8 is an area information management table illustrating respective items of information stored in the area management DB 5005 in a form of a table. In the area information table, for each terminal ID, respective fields of a registered area ID, a registered area name, a value, and an associating are associated and stored. The terminal ID is the same as above. The registered area ID is one example of identification information for uniquely identifying the register area. The registered area ID may also be called area unique information. The registered area name is an area name determinable by the viewer Y. The value is information for identifying the area. If the area is rectangular, for example, the value includes the coordinates (x, y) of the upper-left corner, the width, and the height. The value may instead include the coordinates of opposing two corners. The values in the area information table are determined based on the planar-image coordinate system (i.e., the coordinate system of the planar image). In the "associating" field, the registered area ID of another area associated with the area is registered. For example, in TABLE 8, area_1 is associated with area_3. Such association of an area may be performed by the viewer Y freely. Also three or more areas may be associated with each other.

The coordinates of respective areas may overlap. It is possible to register two areas (area_A, area_B) in such relationships (i.e., an inclusion relation) that one area includes the other area (area_A ⊃ area_B). As a result, if the viewer Y wishes to analyze as to whether a person is present in the specific area (area_B) that is included in the area_A, such areas having the inclusion relation may be registered. Thereby, it is possible to further determine the number of persons detected in the area_B with respect to the number of persons detected in the area_A. By registering a plurality of areas_B within an area_A, it is possible to generate a heat map from which the ceiling where no person is present is excluded. Thus, it is possible to limit parameters to be used in analysis with respect to the entire image, and it is possible to implement analysis excluding useless information.

TABLE 9

| IMAGE ID | PERSON DETECTED AREA ID | VALUE |
|---|---|---|
| au123456ifauy | human_1 | xh1, yh1, width1, height1 |
| | human_2 | xh2, yh2, width2, height2 |

TABLE 9-continued

| IMAGE ID | PERSON DETECTED AREA ID | VALUE |
|---|---|---|
| au123457ifauy | human_1 | xh1, yh1, width1, height1 |
| | human_2 | xh2, yh2, width2, height2 |
| | human_3 | xh3, yh3, width3, height3 |
| . | . | . |
| . | . | . |
| . | . | . |

TABLE 9 is an analysis information management table illustrating respective items of information stored in the area management DB 5006 in a form of a table. In the analysis information table, for each image ID, a person detected area ID, and a value are managed in a manner being associated together. The image ID is the same as above. The person detected area ID is one example of identification information for uniquely identifying an area where a person is detected. The person detected area ID may also be called person detected area unique information. The value is information for identifying the person detected area. The data format is the same as the data format of the registered area. For example, the wide angle image (i.e., the planar image before being transformed into the wide angle image) having the image ID=au123456ifauy has two person detected areas, and the corresponding values have been registered.

Returning to the description of FIG. 33, the transmission and receiving unit 1051 of the server apparatus 12-1 is implemented mainly by the network I/F 509 and a process of the CPU 501 of FIG. 9, and transmits various sorts of data to and receives various sorts of data from the communications terminal 15-1 or the information processing terminal 18-1 through the communications network 20. Note that, below, the mention of "through the transmission and receiving unit 1051" may be omitted when the server apparatus 12-1 carries out communications with the information processing terminal 18-1.

The person detection unit 1052 is implemented mainly by a process of the CPU 501 of FIG. 9, and detects persons from image data. The person detection is implemented by setting an appropriate feature amount, and setting a learning identification apparatus. For example, as the feature amount, a Haar-like feature, a LBP (Local Binary Patterns) feature, and a HOG (Histogram of Oriented Gradients) feature are known. As the learning identification apparatus, SVM (Support Vector Machines) and a cascade classifier using AdaBoost are known. However, as long as a person can be detected, any other technologies may also be used.

The thumbnail generation unit 1053 is implemented mainly by a process of the CPU 501 of FIG. 9, and generates thumbnail images of area images.

The screen page generation unit 1054 is implemented mainly by a process of the CPU 501 of FIG. 9, and generates screen page information for the information processing terminal 18-1 to display image data using HTML data, JavaScript (registered trademark), CSS, and so forth, when image data is transmitted to the information processing terminal 18-1. The information for identifying an area is described according to the planar-image coordinate system. Therefore, when image data for displaying an area will be transmitted, the screen page generation unit 1054 transforms the coordinates of the area into the coordinates of the world coordinate system.

The area registration unit 1055 is implemented mainly by a process of the CPU 501 of FIG. 9, acquires information to be registered with the area information table from the information processing terminal 18-1, and registers the information with the area information management DB 5005.

The area inspection unit 1056 is implemented mainly by a process of the CPU 501 of FIG. 9, carries out inspection on an area using analysis information, and generates information concerning the area.

The storing and reading unit 1059 is implemented mainly by the HDD 505 and a process of the CPU 501 of FIG. 9, stores various sorts of data in the storage unit 5000, and reads various sorts of data from the storage unit 5000. Note that, below, the mention of "through the storing and reading unit 1059" may be omitted when the server apparatus 12-1 stores data in or reads data from the storage unit 5000.

The information processing terminal 18-1 includes a transmission and receiving unit 1071, a reception unit 1072, a display control unit 1073, an area coordinate calculation unit 1074, and a storing and reading unit 1079. These units are functions or devices implemented as a result of some of the respective elements illustrated in FIG. 9 operating according to instructions from the CPU 501 according to a program 7010 for the information processing terminal 18-1 written in the RAM 503 from the HDD 505.

Also, the information processing terminal 18-1 includes a storage unit 7000 implemented by the RAM 503 and HDD 505 of FIG. 9. The storage unit 7000 stores the program 7010 for the information processing terminal 18-1. The program 7010 for the information processing terminal 18-1 is, for example, browser software. However, the program 7010 for the information processing terminal 18-1 may be application software having a communication functions as the communications function of browser software. Also, because the browser software processes image data to display a screen page, or receiving an operation from a user, the program 7010 for the information processing terminal 18-1 includes screen page data (HTML, JavaScript (registered trademark), or the like) that the server apparatus 12-1 transmits.

The transmission and receiving unit 1071 of the information processing terminal 18-1 is implemented mainly by the network I/F 509 and a process of the CPU 501 of FIG. 9, and transmits various sorts of data to and receive various sorts of data from the server apparatus 12-1 through the communications network 20. Note that, below, the mention of "through the transmission and receiving unit 1071" may be omitted when the information processing terminal 18-1 carries out communications with the server apparatus 12-1.

The reception unit 1072 is implemented mainly by the keyboard 511, the mouse 512, and a process of the CPU 501 of FIG. 9, and receives an inputting operation from the user (or the viewer Y).

The display control unit 1073 is implemented mainly by a process of the CPU 501 of FIG. 9, interprets screen page information transmitted from the server apparatus 12-1 to carry out a control process to display various screen pages on the display 508 of the information processing terminal 18-1.

The area coordinate calculation unit 1074 transforms the coordinates in a screen page in which an area is set through the reception unit 1072 into the coordinates of a planar image. That is, transform into the world coordinate system, and transform into two-dimensional coordinates of a planar image are carried out by the area coordinate calculation unit 1074.

The storing and reading unit 1079 is implemented mainly by the HDD 505 and a process of the CPU 501 of FIG. 9, stores various sorts of data in the storage unit 7000, and reads various sorts of data from the storage unit 7000. Note that, below, the mention of "through the storing and reading unit 1079" may be omitted when the information processing terminal 18-1 stores data in or reads data from the storage unit 7000.

Using FIGS. 34A-34D, area registration will be described. FIGS. 34A-34D illustrate examples of a trajectory of a pointing device operated by the viewer Y to set an area to be registered. The viewer Y operates the pointing device of the information processing terminal 18-1 such as the keyboard 511, the mouse 512, or a touch panel, to perform dragging from a point through another point. The reception unit 1072 of the information processing terminal 18-1 receives the dragging operation, and acquires the trajectory indicated by an arrow such as that illustrated in FIG. 34A. The coordinates illustrated in FIGS. 34A-34D are screen coordinates in a case where a wide angle image is displayed on the display 508 as it is.

Figure 34A:
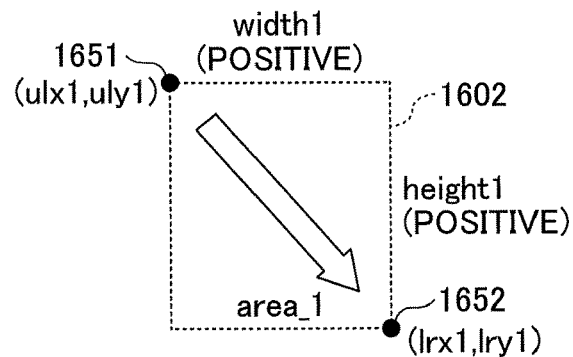
FIGS. 34A-34D illustrate one example of a trajectory of a pointing device operated by a viewer to set an area to be registered according to the second embodiment.

One example of operation of the user for registering an area is a dragging operation using the pointing device to perform dragging along desired positions. If the display 508 has a touch panel, a touch dragging operation, a pinching operation, or the like, may be performed for registering an area. In such a case, the reception unit 1072 acquires the coordinates of a start point 1651 and an end point 1652 of the dragging operation. In FIG. 34A, the start point 1651 is the upper-left corner of the area 1602, and the end point 1652 is the lower-right corner of the area 1602. However, which corners of the area 1602 are the start point 1651 and the end point 652 of the dragging operation depends on the dragging direction.

Figure 34B:
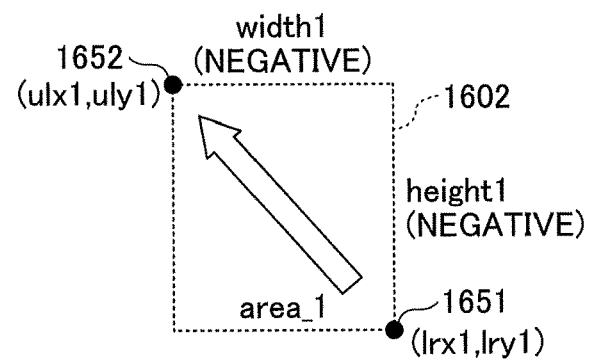

As illustrated in FIG. 34B, if the viewer Y performs dragging from lower-right through upper-left, the coordinates of the end point is smaller than the coordinates of the start point. In this case, the area coordinate calculation unit 1074 determines the dragging direction from the coordinates of the trajectory for the end point 1652 based on the start point 1651. If the dragging direction is determined from the trajectory as upper-left, a negative width and a negative height with respect to the start point 1651 are detected.

Figure 34C:
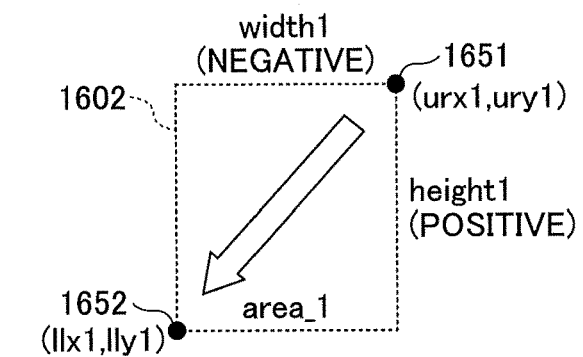
Figure 34D:
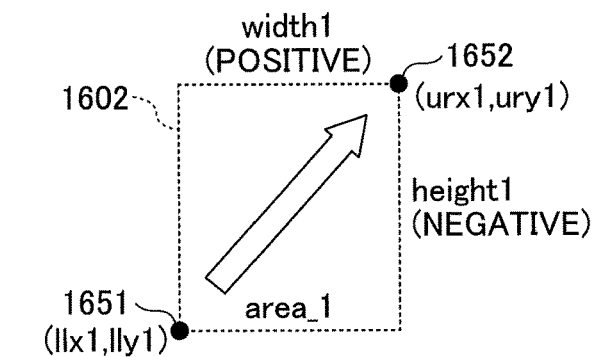

As illustrated in FIG. 34C, if the dragging direction is determined as lower-left, a negative width and a positive height with respect to the start point 1651 are detected. As illustrated in FIG. 34D, if the dragging direction is determined as upper-right, a positive width and a negative height with respect to the start point 1651 are detected.

The reception unit 1072 detects the dragging direction of the viewer Y to calculate the origin (that may be the start point, the end point, or another point), the width (lrx1−ulx1) or (urx1−llx1), and the height (lry1−uly1) or (lly1−ury1). The origin is assumed as the upper-left corner of the area. For example, by adding the negative width and the negative height to the start point 1651 of FIG. 34B, it is possible to acquire the coordinates of the origin (the upper-left corner). The same method can be used also for FIGS. 34C and 34D.

By recording the width and the height with respect to the origin instead of the coordinates of opposing two corners, it is possible to appropriately set an area even in a wide angle image, in particular, an entire celestial sphere image. In fact, an entire celestial sphere image does not have a boundary, and therefore, if an area is defined by two points, two different area settings may be made (i.e., (i) an area defined by the upper-left corner through the lower-right corner passing through the same area, and (ii) an area defined from the lower-right corner through the upper-left corner passing through outside a desired area). Therefore, according to the second embodiment of the present invention, as a process unique to an entire celestial sphere image as one example of a wide angle image, differences in various ways are absorbed even if the user's dragging operations are in the various ways, and it is possible to appropriately calculate information identifying an area.

Note that, the shape of an area is not limited to rectangular, and it is possible to identify an area of any shape enclosed by a trajectory written by a dragging operation using the pointing device. In this case, the area is identified by the coordinates recorded in time-series manner. It is also possible to identify the area using the coordinates acquired when the viewer Y indicates desired two points using the pointing device. In this case, it is desired for the viewer Y to comply with a rule, i.e., for example, the viewer Y first indicates an upper-left corner of the area and then, indicates a lower-right corner of the area.

Figure 35A:
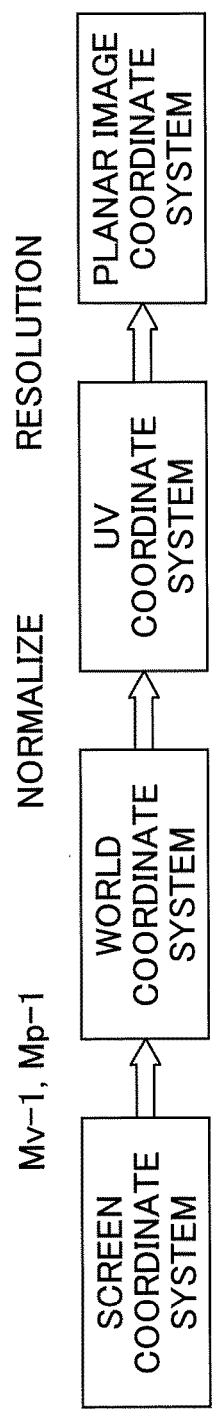
FIGS. 35A and 35B illustrate one example of image modes in respective phases of processing a wide angle image, and coordinate transform according to the second embodiment.
Figure 35B:
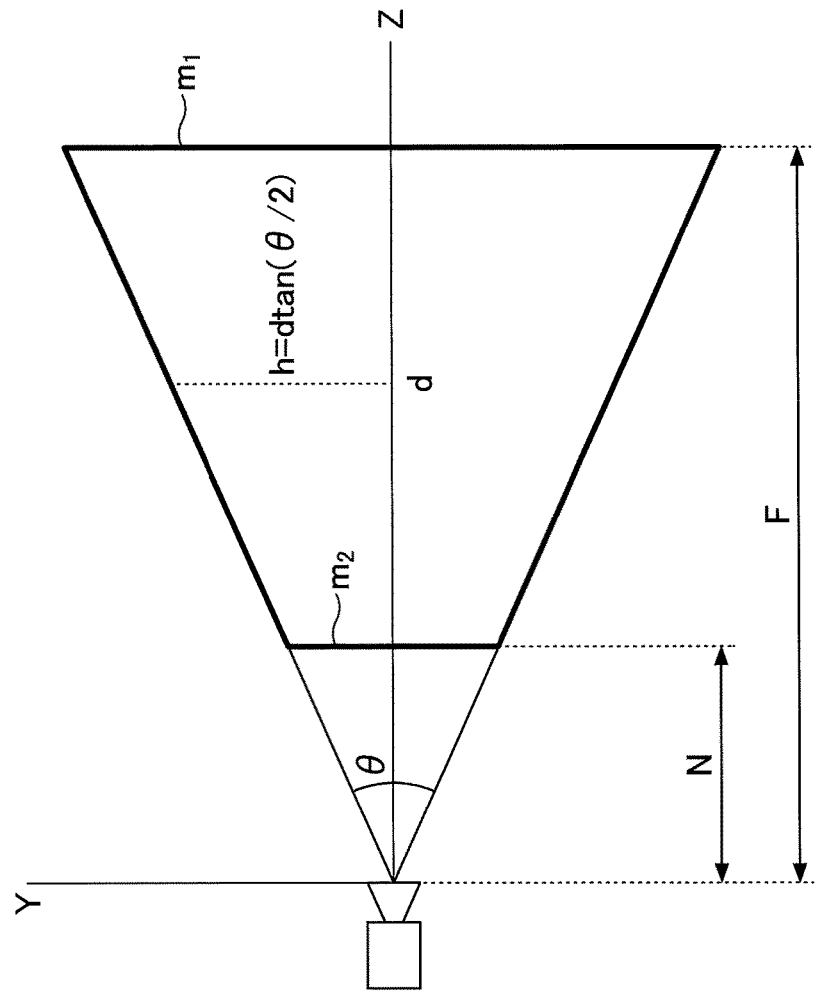

FIGS. 35A and 35B illustrates one example of image modes in respective phases of processing a wide angle image, and coordinate transform. FIG. 35A illustrates a transform procedure.

Coordinate transform from the screen coordinate system to the world coordinate system will be described first.

This transform uses viewing transform and projective transform. In general, transform is made from the world coordinate system into the screen coordinate system. Therefore, according to the second embodiment, reverse transform of each of viewing transform and projective transform is made. Viewing transform is transform to rotate and parallely shift the coordinates of a virtual camera, and corresponds to a process of transforming a three-dimensional object into an image depending on the direction of the camera. A transform matrix My of viewing transform is illustrated below.

$$M_v = \begin{bmatrix} X_x & X_y & X_z & -P \cdot X \\ Y_x & Y_y & Y_z & -P \cdot Y \\ Z_x & Z_y & Z_z & -P \cdot Z \\ 0 & 0 & 0 & 1 \end{bmatrix}$$

There, Xx, Yx, and Zx denote the X-axis of the camera; Xy, Yy, and Zy denote the Y-axis of the camera; and Xz, Yz, and Zz denote the Z-axis of the camera. P denotes a position vector of the camera, and X, Y, and Z denote respective direction cosines of the X-axis, Y-axis, and Z-axis.

Projective transform transforms the coordinates of a three-dimensional object into two-dimensional coordinates in a case where the object is projected onto a screen of a predetermined distance. FIG. 35B illustrate projective transform. It is assumed that the distance from the camera to the screen m2 is N, and the range where the object may be present is the distance F through the plane m1. θ denotes the angle of view of the screen of the information processing terminal 18-1 in the width direction. Under these conditions, the projective transform matrix Mp is illustrated below. Note that, as the distances N and F, predetermined values are set.

$$M_p = \begin{bmatrix} \dfrac{\cot\left(\dfrac{\theta}{2}\right)}{\text{ASPECT RATIO}} & 0 & 0 & 0 \\ 0 & \cot\left(\dfrac{\theta}{2}\right) & 0 & 0 \\ 0 & 0 & \dfrac{F}{F-N} & -\dfrac{FN}{F-N} \\ 0 & 0 & 1 & 0 \end{bmatrix}$$

Thus, the coordinates $(x_c, y_c, z_c)$ of a certain point in a wide angle image in the screen coordinate system is transformed into the coordinates $(x_w, y_w, z_w)$ in the world coordinate system, as illustrated below. $z_c$ is calculated by the following formula. Z denotes the distance to the object.

$$z_c = \{(N+F)Z - 2NF\}/(N-F)$$

$$\begin{pmatrix} x_w \\ y_w \\ z_w \end{pmatrix} = M_v^{-1} M_p^{-1} \begin{pmatrix} x_c \\ y_c \\ z_c \\ 1 \end{pmatrix}$$

Transform from the world coordinate system into the uv coordinate system will now be described.

This transform is implemented by normalizing a wide angle image in the world coordinate system. Normalizing means making the range of the coordinates to fall within the range between (0, 0) and (1, 1). The coordinates in the uv coordinate system are assumed as (u, v). The distance from the virtual camera is assumed as r; and the ratios of $x_w$, $y_w$, $z_w$ with respect to the distance r are assumed as dx, dy, dz, as follows:

$r=sqrt(x^2+y^2+z^2)$ $dx=x/r$ $dy=y/r$ $dz=z/r$

Thus, the u coordinate is illustrated as below.

$u=1/2+\arctan(dz/dx)/2*PI+1/4$ where u=u−1, when u≥1

Also, the v coordinate is illustrated as below.

$v=1/2-\arcsin(dy)/PI$

Transform from the uv coordinate system into the planar-image coordinate system will now be described.

This transform is to calculate a product between the normalized uv coordinates and the resolution of the planar image. The resolution of the planar image in x direction is assumed as resolutionWidth and the resolution of the planar image in y direction is assumed as resolutionHeight. Then, the coordinates in the planar-image coordinate system is illustrated as below.

coordinates (x,y) of planar image=
(u*resolutionWidth,v*resolutionHeight)

Thus, the screen coordinates of an area that is set in the information processing terminal 18-1 can be transformed into the planar-image coordinates.

Note that, when a planar image will be displayed on the display 508, the transform process reverse to the above-mentioned transform process is carried out.

Using FIGS. 36-40, operations in the information processing system 10-1 to register an area will now be described.

Figure 36:
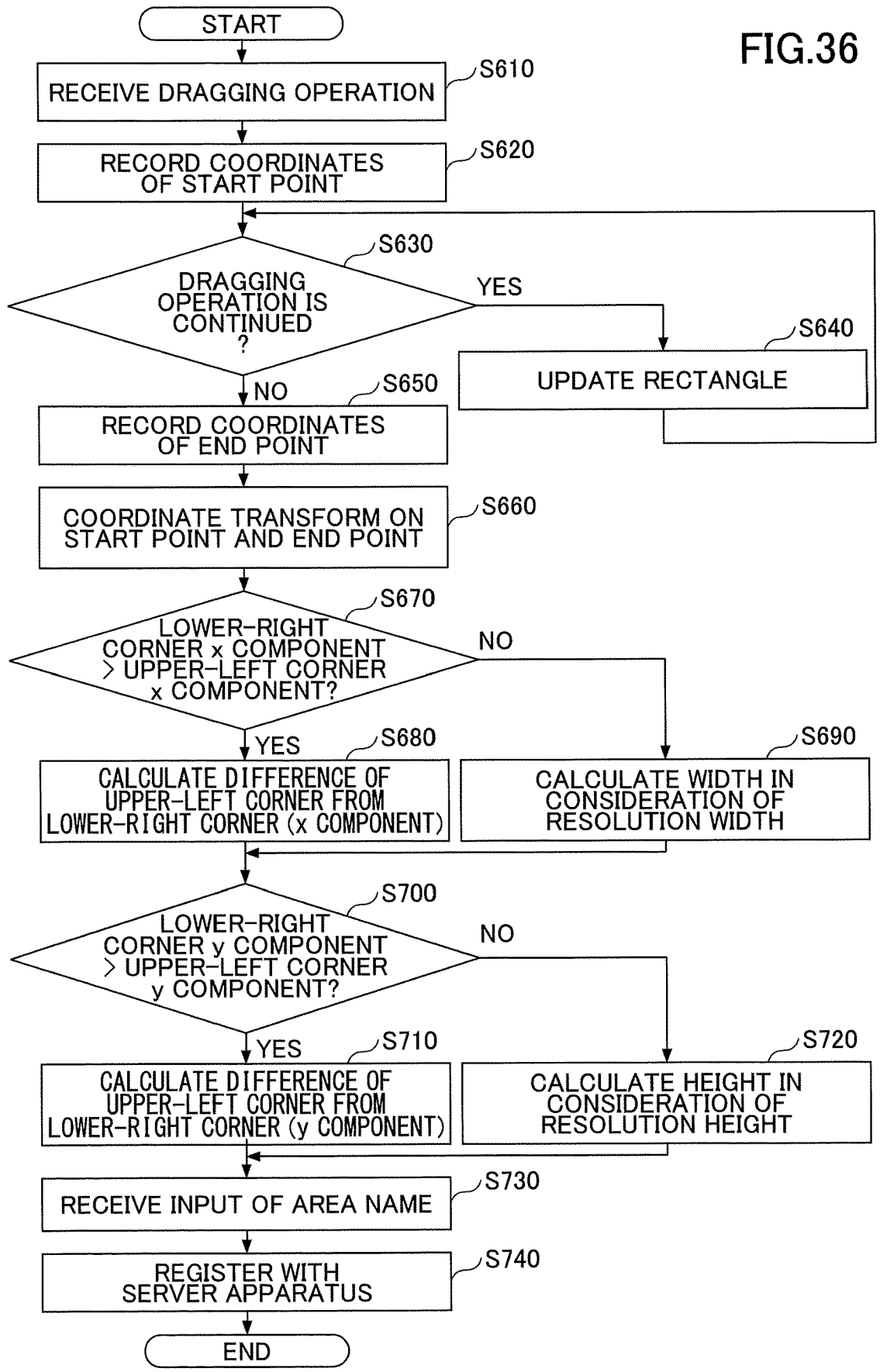
FIG. 36 is a flowchart illustrating one example of a procedure to register an area that is set by a viewer with the server apparatus from the information processing terminal according to the second embodiment.

FIG. 36 is a flowchart illustrating one example of a procedure to register an area that is set by the viewer Y with the server apparatus 12-1 from the information processing terminal 18-1. The process of FIG. 36 is started when the viewer Y performs operation to start registration of the area. The description will be made also with reference to FIGS.

Figures 37A, 37B:
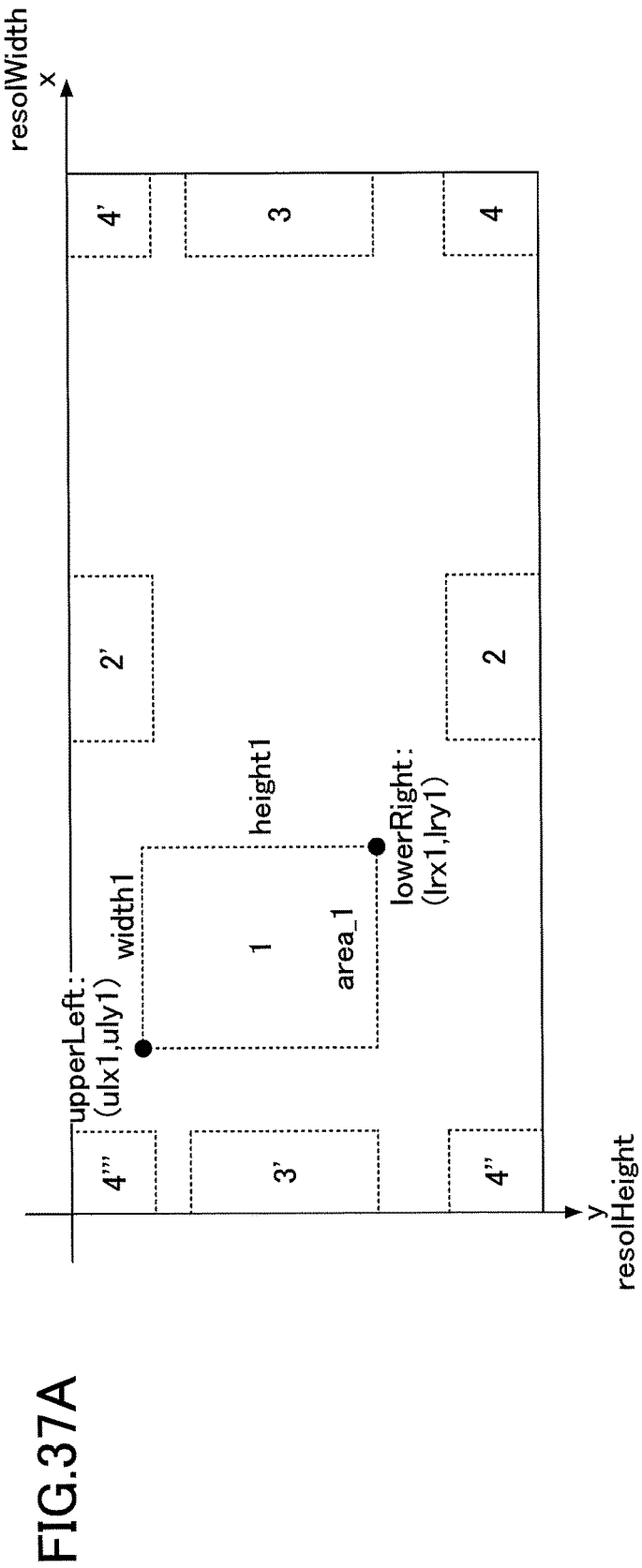
FIGS. 37A and 37B illustrate one example of such an area that an end point of the area goes across an end of a planar image according to the second embodiment.

37A and 37B. FIGS. 37A and 37B illustrate one example of cases where a lower-right corner goes across an end of a planar image.

In the information processing terminal 18-1, image data is downloaded. Because the image data is associated with a terminal ID, the information processing terminal 18-1 has the terminal ID. The viewer Y starts a dragging operation using the pointing device. The reception unit 1072 of the information processing terminal 18-1 receives the dragging operation (S610). The reception unit 1072 actually acquires, for example, an on-mouse-down event of the mouse or a touch event of the touch panel. At this time, the screen coordinates with respect to the upper-left corner of the display 508 as the origin is acquired.

Next, the area coordinate calculation unit 1074 records the coordinates of the start point 1651 in the storage unit 7000 or the like (S620).

Next, the area coordinate calculation unit 1074 determines whether the dragging operation is continued (S630). If the reception unit 1072 detects, for example, an on-mouse-up event, the determination in step S630 results in NO.

While the determination in step S630 results in YES, the area coordinate calculation unit 1074 updates the rectangle of the area as long as the dragging continues, and records the current coordinates of the pointing device (S640).

If the determination in step S630 results in No, the area coordinate calculation unit 1074 determines that the current coordinates when the dragging operation has ended is the coordinates of the end point 1652 (S650). Note that, as described above with reference to FIGS. 34A-34D, the coordinates of the pointing device is detected continuously, and therefore, the dragging direction is detected. Thus, the coordinates of the area (upper-left corner and the lower-right corner) independent of the dragging direction is acquired.

Next, the area coordinate calculation unit 1074 carries out coordinate transform on the coordinates of the upper-left corner and the coordinates of the lower-right corner. As mentioned above, transform is carried as below (S660).
screen coordinate system→world coordinate system→uv coordinate system→planar-image coordinate system The coordinates finally acquired through the transform are the planar-image coordinates where a wide angle image, in particular, an entire celestial sphere image, is two-dimensionally expressed. Therefore, the upper-left corner or the lower-right corner may go across an end of the planar image. In this case, it is not possible to correctly determine the area unless the width and the height of the area are calculated in consideration of going across the end of the planar image because the width or the height may otherwise have a negative value.

FIG. 37A illustrates an upper-left corner and a lower-right corner go across an end of a planar image. As illustrated in FIG. 37A, setting an area in a planar image has four patterns. A pattern 1 is a pattern where the lower-right corner goes across neither the x-direction end nor the y-direction end. In the pattern 1, the area will now be divided. Going across an end means that the lower-right corner is beyond the x-direction resolution or the y-direction resolution. In other words, going across an end means that the coordinates of the lower-right corner are less than the coordinates of the upper-left corner.

The pattern 2 is a pattern where the lower-right corner goes across the y-direction end. In this case, the area will be divided vertically into an upper division and a lower division. The pattern 3 is a pattern where the lower-right corner goes across the x-direction end. In this case, the area is horizontally divided into two to left and right divisions. The pattern 4 is a pattern where the lower-right corner goes across the ends both in x direction and y direction. In this case, the area will be divided vertically and horizontally into four divisions. The area coordinate calculation unit 1074 determines which pattern the area setting corresponds to, and appropriately calculates the width and the height of the area. It is assumed that the areas 1-4, illustrated in FIGS. 37A and 37B, correspond to the patterns 1-4, respectively. The coordinates of the upper-left corners and the lower-right corners of the respective areas 1-4 are as follows:

area 1: upper-left corner (ulx1, uly1), lower-right corner (lrx1, lry1)

area 2: upper-left corner (ulx2, uly2), lower-right corner (lrx2, lry2)

area 3: upper-left corner (ulx3, uly3), lower-right corner (lrx3, lry3)

area 4: upper-left corner (ulx4, uly4), lower-right corner (lrx4, lry4)

As can be clearly seen from FIGS. 37A and 37B, the respective widths and heights of the areas can be calculated as follows:

$$\text{width} = lrx1 - ulx1$$

$$\text{height} = lry1 - ulx1 \quad \text{area 1:}$$

$$\text{width} = lrx2 - ulx2$$

$$\text{height} = (\text{resolution in height}) - uly2 + lry2 \quad \text{area 2:}$$

$$\text{width} = (\text{resolution in width}) - ulx3 + lrx3$$

$$\text{height} = lry3 - ulx3 \quad \text{area 3:}$$

$$\text{width} = (\text{resolution in width}) - ulx4 + lrx4$$

$$\text{height} = (\text{resolution in height}) - uly4 + lry4 \quad \text{area 4:}$$

Returning to FIG. 36, next, it is determined whether the x coordinate of the lower-right corner is greater than the x coordinate of the upper-left corner (S670). That is, it is determined whether the current pattern is pattern 3 or 4.

If the determination in step S670 results in YES, the current pattern is the pattern 1 or 2. Therefore, the area coordinate calculation unit 1074 calculates the difference of the x coordinate of the upper-left corner from the x coordinate of the lower-right corner (S680). That is, the difference between the lower-right corner and the upper-left corner is used as the width of the area as it is.

If the determination in step S670 results in NO, the current pattern is the pattern 3 or 4. Therefore, the area coordinate calculation unit 1074 calculates the width in consideration of the resolution in width (S690). Actually, the above-mentioned calculation formula for the width of the area 3 or 4 is used.

Next, it is determined whether the y coordinate of the lower-right corner is greater than the y coordinate of the upper-left corner (S700). That is, it is determined where the current pattern is the pattern 2 or 4.

If step S700 results in YES, the current pattern is pattern 1 or 3. Therefore, the area coordinate calculation unit 1074 calculates the difference of the y coordinate of the upper-left corner from the y coordinate of the lower-right corner (S710). That is, the difference between the lower-right corner and the upper-left corner is used as the height of the area as it is.

If step S700 results in NO, the current pattern is pattern 2 or 4. Therefore, the area coordinate calculation unit 1074 calculates the height in consideration of the resolution in height (S720). Actually, the above-mentioned calculation formula for the height of the area 2 or 4 is used.

Thus, according to the second embodiment, it is determined whether the lower-right corner goes across an end of the planar image. Then, if the lower-right corner goes across an end of the planar image, the width or the height is calculated in consideration of the resolution. Thereby, it is possible to correctly calculate the width and height with respect to the upper-left corner of the area. Thus, even if the viewer Y sets an area in a wide angle image, in particular, an entire celestial sphere image, as it is, it is possible to correctly determine the area in the planar image.

After calculation of the width and the height is completed, the area coordinate calculation unit 1074 receives an input of a name of the area (S730). The detail will be described with reference to FIG. 41B.

The area coordinate calculation unit 1074 transmits the terminal ID, the start point, the width, the height, and the name of the area to the server apparatus 12-1 (S740). Registering of one area is carried out as described above. The viewer Y will perform similar operation on each area.

The area has been thus set in the planar image, and therefore, it is possible to inspect the area using analysis information. As one example of the analysis information, a result of person detection will be used.

Figure 38:
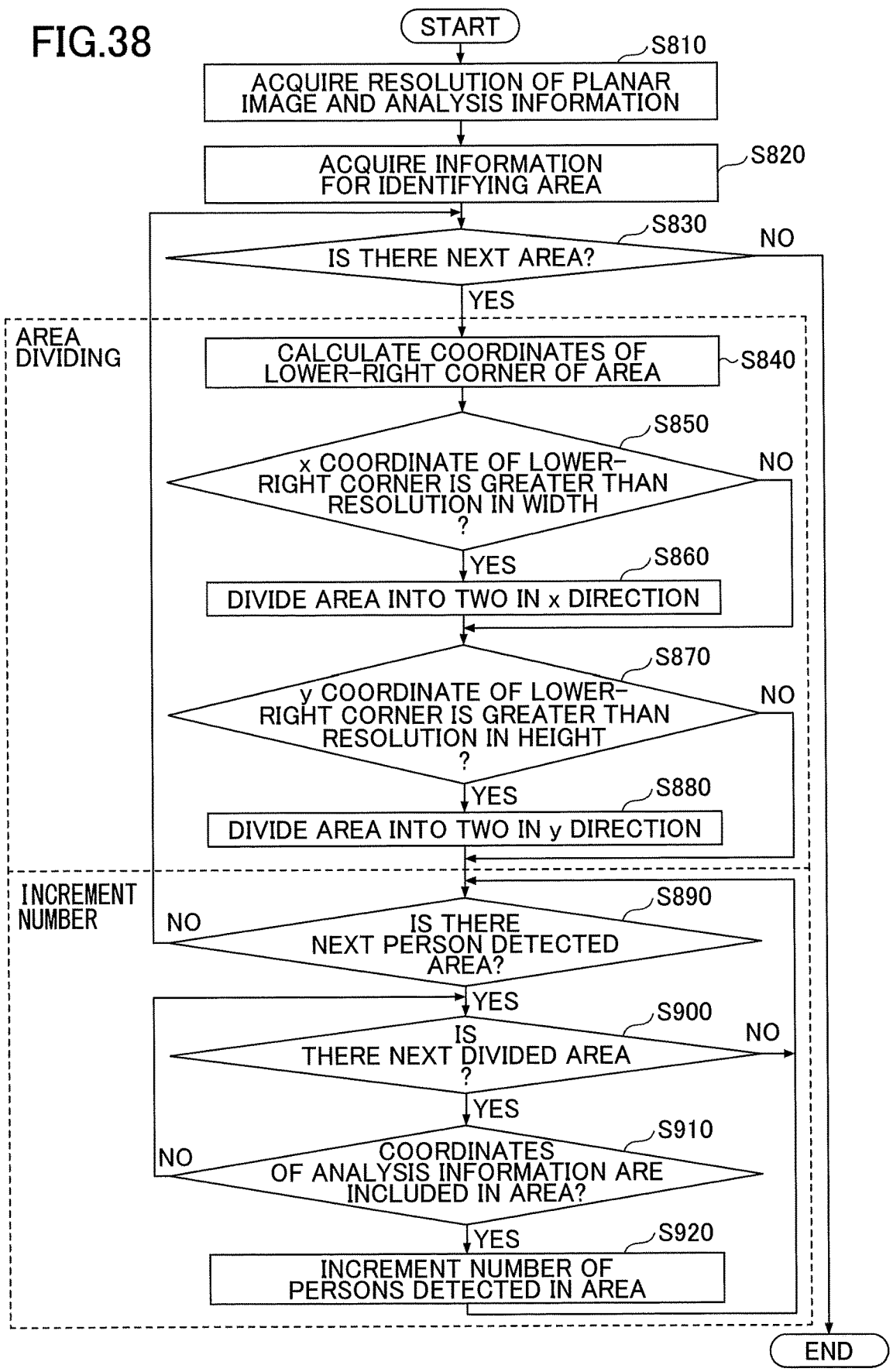
FIG. 38 is a flowchart illustrating one example of a procedure of detecting an area carried out by an area detection unit of the server apparatus according to the second embodiment.
Figure 39A:
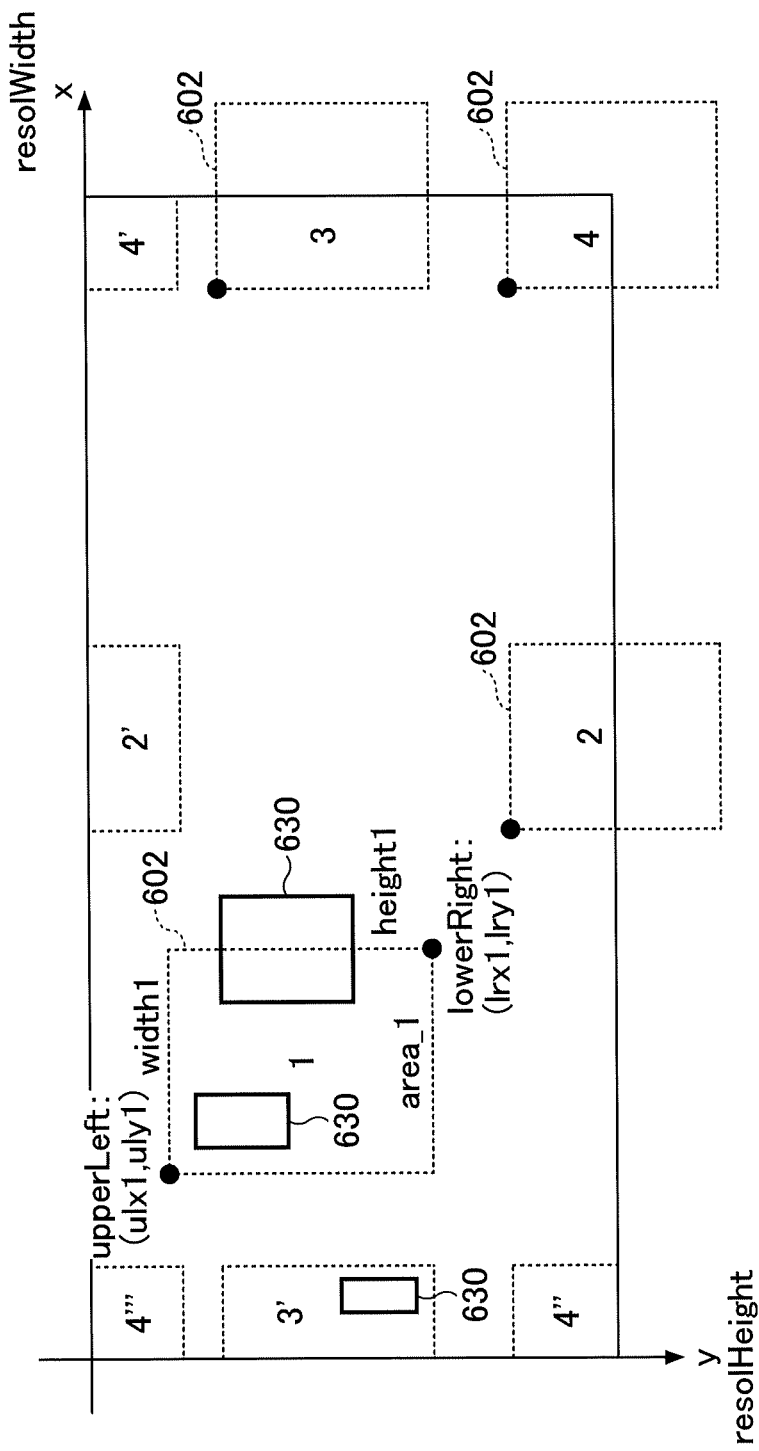

FIG. 38 illustrates one example of a procedure of inspection of an area carried out by the area inspection unit 1056 of the server apparatus 12-1. Note that, the description will now be made appropriately with reference to FIGS. 39A and 39B. FIGS. 39A and 39B illustrate one example of areas that are set and person detected areas.

For example, by detecting whether there is a person for each area, it is possible to quantitatively determine how many persons are present in each area during a certain period of time. FIG. 38 illustrates, as an example of area inspection, an example of outputting a count result of the number of persons in each area in a form of a graph, numerical values, or the like. The process of FIG. 38 is carried out, for example, when the viewer Y designates a terminal ID, an image ID, or the like, and performs an operation to start area inspection. Alternatively, the process is automatically started when the photographing apparatus 14-1 has finished photographing and person detection analysis has been finished. The process of FIG. 37 is carried out for each page of image data (for each image frame).

First, the area inspection unit 1056 acquires the resolution of the planar image and the analysis information (S810). The resolution of the planar image is the same as the resolution of the planar image of FIGS. 37A and 37B, and is known, or is stored in the storage unit 5000. The analysis information is stored in the analysis information management DB 5006.

Next, the area inspection unit 1056 acquires the information for identifying the area from the area information management DB 5005 (S820). The area is associated with the terminal ID. Therefore, the terminal ID associated with the image data on which the area inspection will be carried out is identified, and the values of the registered area IDs (the information for identifying the areas) associated with the terminal ID are read in sequence.

If no next area is registered (NO in S830), the process of FIG. 11 is ended.

If the next area is registered (YES in S830), the position of the area with respect to the planar image is determined, and a process of dividing the area is carried out (S840-S880).

The process of dividing the area will be described based on FIGS. 39A and 39B. Areas 1-4 are the same as areas 1-4 of FIGS. 37A and 37B, respectively. For each of areas such as areas 2-4 going across an end of the planar image, it is not possible to determine the relationships with a person detected area unless determining where the area after going across the end is present. Thus, an area that goes across an end of the planar image is divided at the end the planar image, as follows.

Area 1:

Because area 1 does not go across an end of the planar image, area 1 is not divided.

Area 2:

Because area 2 goes across the y-direction end of the planar image, area 2 is divided into area 2 and area 2', as follows.

upper-left corner$(x2,y2)$,width=width2,height=(resolution in height)$-y2$      area 2:

upper-left corner$(x2,0)$,width=width2, height=height2$-$((resolution in height)$-y2$)      area 2':

Area 3:

Because area 3 goes across the x-direction end of the planar image, area 3 is divided into area 3 and area 3', as follows.

upper-left corner$(x3,y3)$,width=(resolution in width)$-x3$,height=height      area 3:

upper-left corner$(0,y3)$,width=width3$-$((resolution in width)$-x3$),height=height3      area 3':

Area 4:

Because area 4 goes across the x-direction end and the y-direction end of the planar image, area 4 is divided into areas 4, 4', 4", and 4'", as follows.

upper-left corner$(x4,y4)$,width=(resolution in width)$-x4$,height=(resolution in height)$-y4$      area 4:

upper-left corner$(0,0)$,width=width4$-$((resolution in width)$-x4$),height=height4$-$((resolution in height)$-y4$)      area 4':

upper-left corner$(x4,0)$,width=(resolution in width)$-x4$,height=height4$-$((resolution in height)$-y4$)      area 4'":

upper-left corner$(0,y4)$,width=width4$-$((resolution in width)$-x4$),height=(resolution in height)$-y4$      area 4'":

Returning to FIG. 38, the area inspection unit 1056 calculates the coordinates of the lower-right corner (lrx, lry) from the origin(x, y) and the width included in the information for identifying the area (S840). That is, the width added to the x coordinate of the origin to calculate the x coordinate of the lower-right corner lrx.

Then, it is determined whether the x coordinate of the lower-right corner lrx is greater than the resolution of the planar image in x direction (S850). If "the resolution of the planar image in x direction < the x coordinate lrx", the coordinate of the lower-right corner goes across the x-direction end of the planar image. That is, the current state is the state of area 3 in FIGS. 39A and 39B.

If the determination in step S850 results in YES, the area inspection unit 1056 divides the area into two divisions in x direction, to generate two areas, i.e., area 3 and area 3' (S860). The coordinates of the upper-left corner, the width, and the height of each of the two areas, i.e., area 3 and area 3', have been described above with reference to FIGS. 39A and 39B.

Next, the area inspection unit 1056 determines whether the y coordinate of the lower-right corner lry is greater than the resolution of the planar image in y direction (S870). If "the resolution of the planar image in y direction < the y coordinate lry", the coordinate of the lower-right corner goes across the y-direction end of the planar image. That is, the current state is the state of area 2 in FIGS. 39A and 39B.

If the determination in step S870 results in YES, the area inspection unit 1056 divides the area into two divisions in y direction, to generate two areas, i.e., area 2 and area 2' (S880). The coordinates of the upper-left corner, the width, and the height of each of the two areas, i.e., area 2 and area 2', have been described above with reference to FIGS. 39A and 39B.

An area for which the determinations in both steps S850 and S870 result in YES is divided into four areas, i.e., area 4, 4', 4", and 4'". The coordinates of the upper-left corner, the width, and the height of each of the four areas, i.e., areas 4, 4', 4", and 4'" have been described with reference to FIGS. 39A and 39B.

Next, for each of the areas acquired from the dividing, the number of times when a person is detected is counted.

First, the area inspection unit 1056 determines whether the image data includes a person detected area (S890). If the determination in step S890 results in NO, the process returns to step S830.

If step S890 results in YES, the area inspection unit 1056 extracts one of the areas acquired from the dividing (S900).

Then, it is determined whether the area acquired through the dividing includes the center of the person detected area (S910).

If step S910 results in YES, the area inspection unit 1056 increments the number of times when a person is detected in the area, by one (S920).

The number of times is counted for each area. Even after the area is divided, the number of times is counted for each area that is present before the dividing. Thus, it is possible to generate information concerning each area using the analysis result. Then, the process returns to step S890, and the subsequent person detected area will be processed.

If step S910 results in NO, the process returns to step S900, and the subsequent area acquired from dividing is extracted. Thus, for each person detected area, it is determined for all of the areas acquired from the dividing as to whether each area includes the center of a person detected area.

Thus, the number of times when a person is detected has been measured for each area. By carrying out the same process for the next page of image data (the next image frame), the information processing terminal 18-1 can display the number of times or the frequency of having detected a person for each area in a form of a graph or the like.

Also, the information processing terminal 18-1 identifies the area included in the area based on the coordinates, and, thus, can calculate the ratio of the number of times of detecting persons in the included area with respect to the number of times of detecting persons in the including area, or the like. If a plurality of the included areas are present, it is possible to easily generate a heat map in the including area, for example.

Note that, instead of carrying out a comparison using the center of a person detected area as mentioned above, the number of persons in an area may be counted even if a part of a person detected area overlap the area. In this case, the same person may be counted many times for a plurality of areas. In such a case, it is possible to count a person for an area if the person approaches the area. It is also possible to count a person for an area if the person detected area overlaps with the area greater in area. Thereby, it is possible to prevent the same person from being counted for a plurality of areas, and it is possible to count a person who approaches the area. It is also possible count a person in a case where the distance between the person detected area and the area falls within a threshold.

A process of displaying the area registered with the server apparatus 12-1 by the information processing terminal 18-1 will now be described. The information (value) for identifying the area registered with the server apparatus 12-1 is the coordinates in the planar image, and the information processing terminal 18-1 displays a wide angle image. Therefore, the information for identifying the area is transformed into the coordinates in the world coordinate system.

Figure 40:
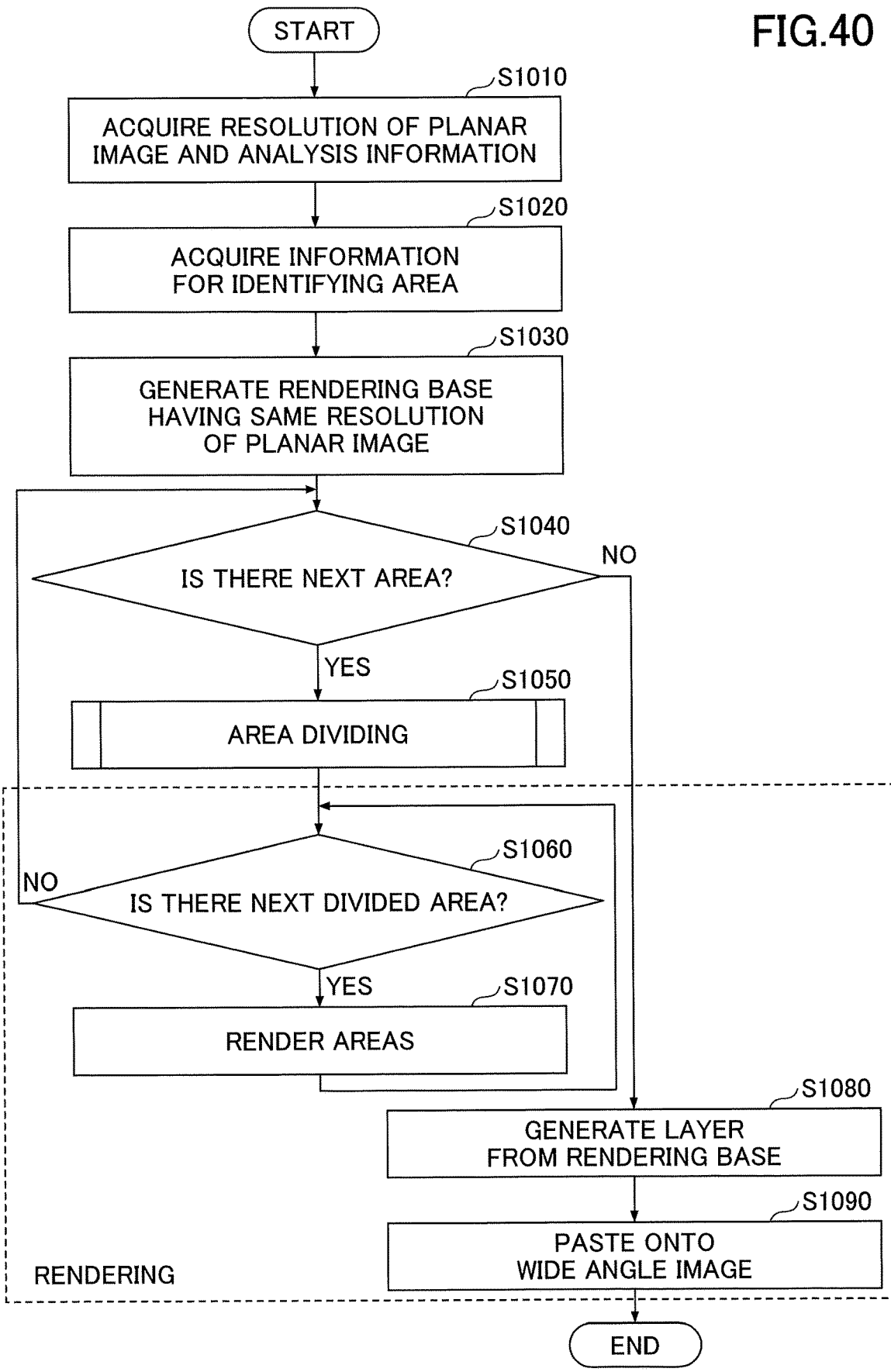
FIG. 40 is a flowchart illustrating one example of a process for the information processing terminal to display an area according to the second embodiment.

FIG. 40 is a flowchart illustrating one example of a process for the information processing terminal 18-1 to display the area. The process of FIG. 40 is started when the viewer Y operates the information processing terminal 18-1 to request the server apparatus 12-1 to enable the viewer Y viewing image data. Note that, because the image data has been identified, the terminal ID has been identified.

First, the display control unit 1073 of the information processing terminal 18-1 acquires the resolution of the planar image (S1010). The resolution is known. If also a person detected area will be displayed, the analysis information is acquired from the analysis information management DB 5006.

The display control unit 1073 acquires the information for identifying the area from the area information management DB 5005 of the server apparatus 12-1 (S1020). The area is associated with the terminal ID, and therefore, the terminal ID associated with the image data to be displayed is acquired for this purpose.

Next, the display control unit 1073 generates a rendering base having the same resolution as the resolution of the planar image (S1030). The rendering base will be then pasted onto a wide angle image as a new layer. For example, canvas tags that are tags in HTML are used.

The display control unit 1073 determines whether the subsequent area has been registered with the photographing apparatus 14-1 (S1040). If the subsequent area has been registered with the photographing apparatus 14-1, the display control unit 1073 carries out the area dividing process (S1050). The area dividing process has been described above with reference to FIG. 38.

Then, all the areas acquired from dividing are rendered in the rendering base (S1060 and S1070). Because the coordinates of the areas acquired from dividing are known, the corresponding rectangles can be drawn in the rendering base. That is, the rectangles determined by the coordinates of the areas acquired from dividing are drawn. For the areas, a process of translucently displaying is carried out. Also, different (translucent) colors are used for displaying the respective areas. It is possible for the viewer Y to see the wide angle image by thus using the translucently displaying method.

After the process ends for all of the areas (NO in S1040), the display control unit 1073 generates a layer form the rendering base (S1080). Generating a layer means generating a single page of image data using all of the canvas tags. There, the places where no area is present are completely transparent.

The display control unit 1073 pastes the layer including the areas onto the wide angle image (S1090). That is, the planar image in a form of the layer is pasted onto the wide angle image (i.e., the entire celestial sphere, in this case) in the conventional method. As a result, the state where the layer is pasted onto the wide angle image is acquired.

The viewer Y can see the areas that are superposed on the wide angle image. Note that, the process of FIG. 40 may be carried out by the server apparatus 12-1. The viewer Y can perform operations of displaying or not displaying the areas while displaying the image data.

With reference to FIGS. 41A-45B, screen page examples, from a process of registering areas through a process of displaying the areas, will be described.

Figure 41A:
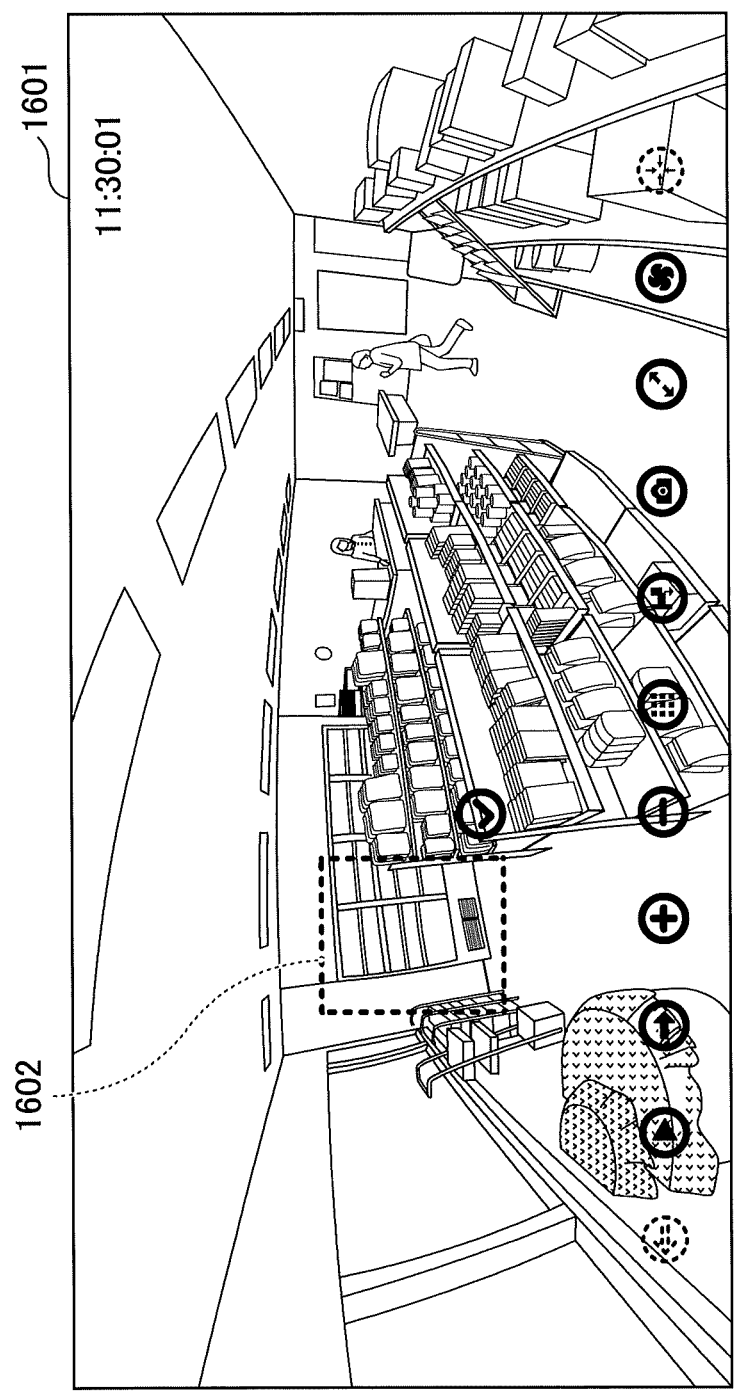

FIG. 41A illustrates one example of an area registration screen page 1601 displayed by the information processing terminal 18-1 on the display 508 when an area will be registered.

The viewer Y causes a wide angle image to be displayed, and select a menu for registering an area. Then, as mentioned above, it is possible to set an area by dragging at desired positions using the pointing device such as the mouse. In FIG. 41A, the dragged area 1602 is indicated by a broken line. The position of the area 1602 is registered. Note that, as the process, the reception unit 1072 of the information processing terminal 18-1 detects the coordinates of the start point and the end point of the dragging, and the display control unit 1073 displays the rectangle having the opposing corners at the coordinates.

The viewer Y can give a name of the area as illustrated in FIG. 41B. In FIG. 41B, a name registration field 1603 is displayed. The viewer Y inputs the name and presses an OK button 1604. The reception unit 1072 of the information processing terminal 18-1 receives the viewer's operation, and the transmission and receiving unit 71 transmits, to the server apparatus 12-1, the information (value) for identifying the terminal ID and the area as well as the name. The name can be freely determined. For example, because the area in FIG. 41B is set for a refrigerator, "refrigerator" or the like may be input. Thus, it is possible to give the actual product name of the product sold in the store as the name of the area.

Figure 42A:
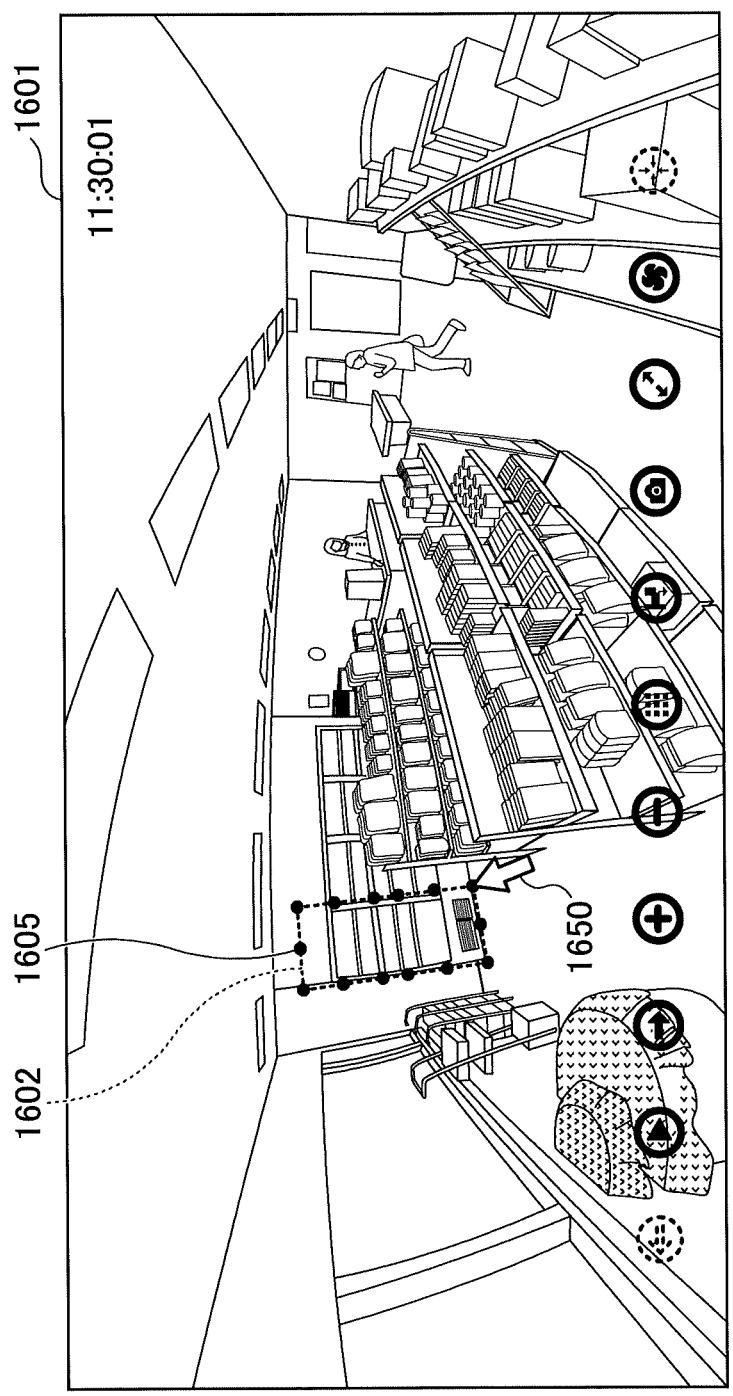
FIG. 42A illustrates one example of registering an area using a plurality of coordinate points according to the second embodiment.

FIG. 42A illustrates one example of registering an area using a plurality of coordinate points. The viewer Y repetitiously inputs coordinate points 1605 to enclose the area to set (for example, through clicking or touching operations using a pointing device 1650). The reception unit 1072 of the information processing terminal 18-1 receives the input of the coordinate points 1605, and the display control unit 1073 of the information processing terminal 18-1 clearly displays the area 1602 by connecting the coordinate points 1605, for example. Such a method of registering an area is advantageous for registering an area other than a rectangular area.

Figure 42B:
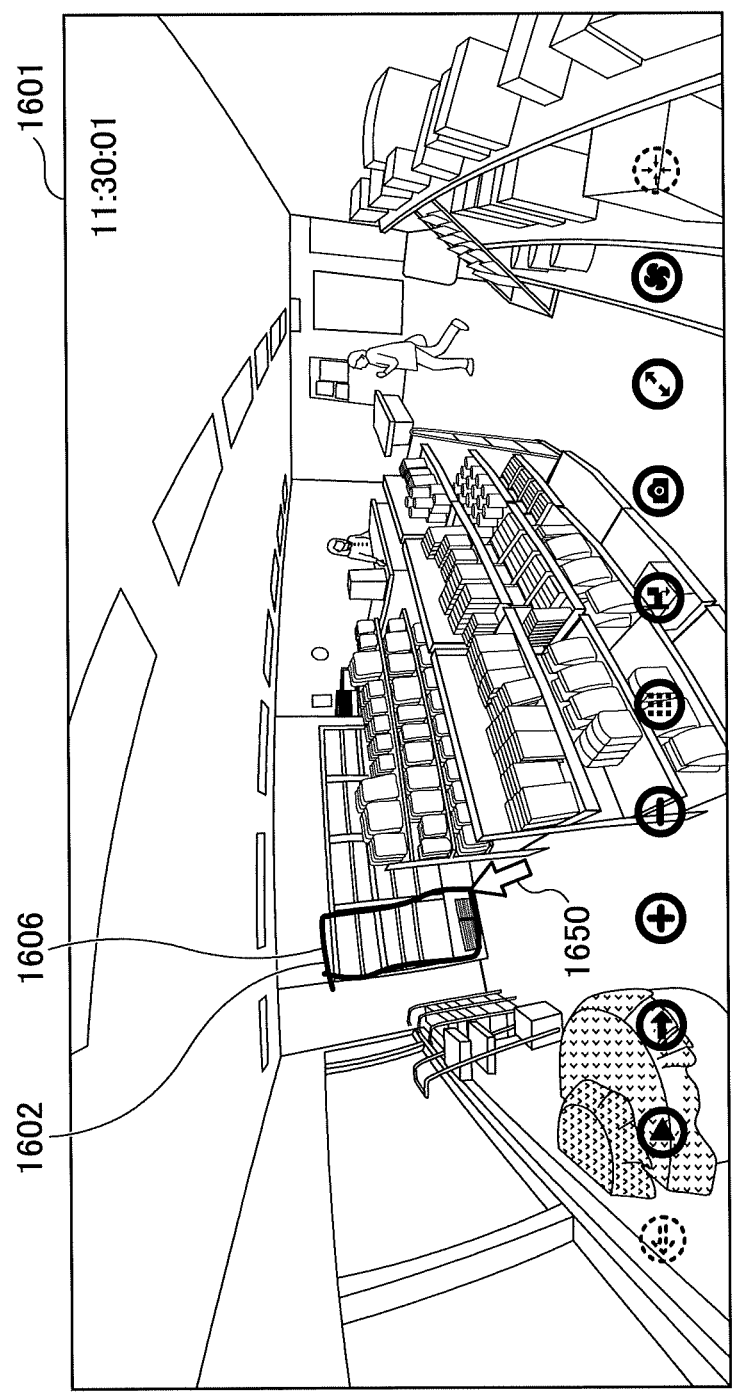
FIG. 42B illustrates one example of freehand registering an area according to the second embodiment.

FIG. 42B illustrates one example of freehand registering an area. In this case, the viewer Y drags with a pointing device 1650 along the contour of the area. The reception unit 1072 of the information processing terminal 18-1 receives the coordinates of the trajectory 1606, and the display control unit 1073 of the information processing terminal 18-1 clearly displays the area 1602 by displaying the trajectory 1606, for example. Such a method of registering an area is advantageous for setting an area having any shape rapidly.

Figure 43A:
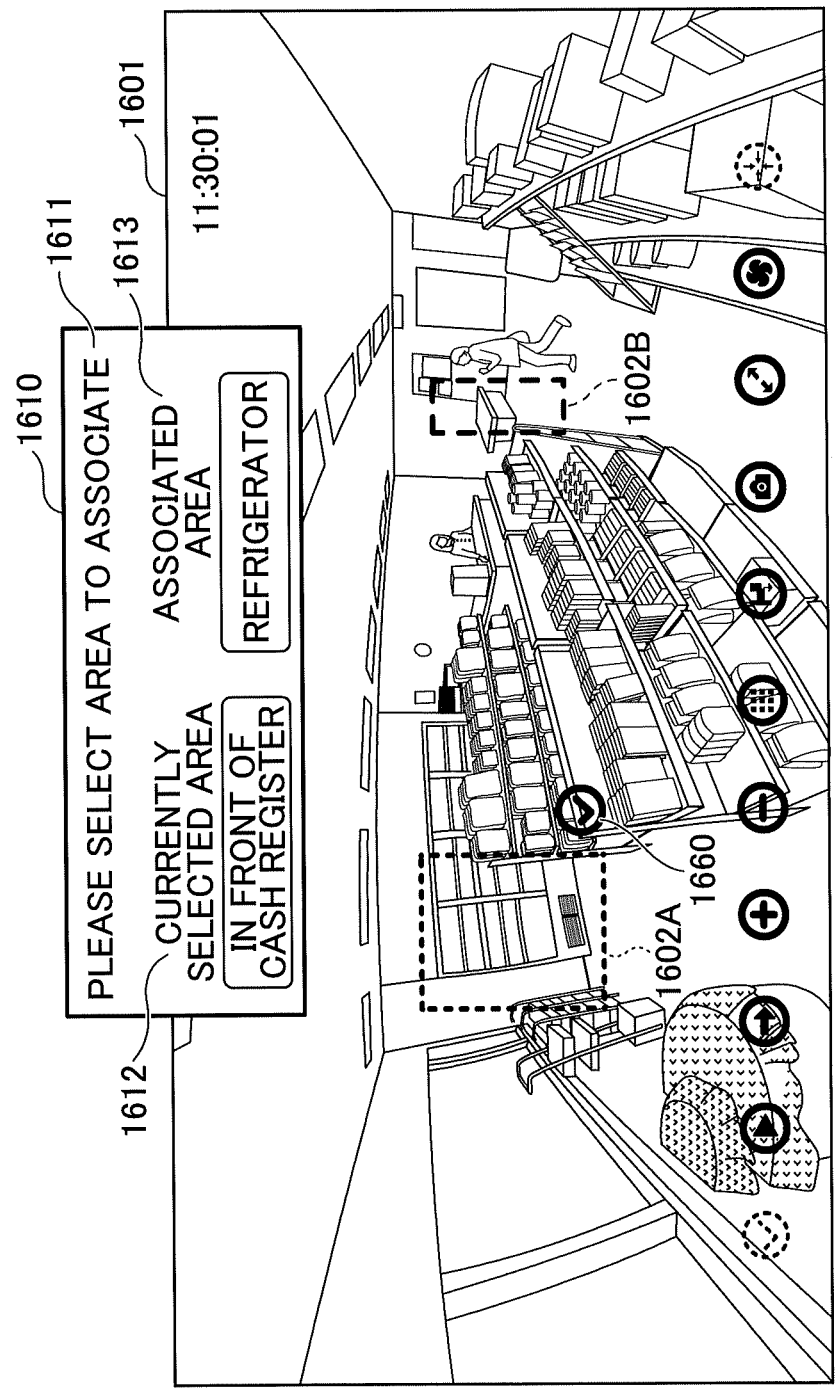
FIGS. 43A and 43B illustrate examples of associating of an area and registering an area, respectively, according to the second embodiment.

FIG. 43A illustrates an example of associating an area. The viewer Y sets the area 1602B after the area 1602A. For example, it is assumed that the area A is named "refrigerator", and the area B is named "in front of cash register". If the viewer Y wishes to associate the area 1602B with the area 1602A, the viewer Y selects the area 1602A, and simultaneously, causes a menu for associating to be displayed by, for example, right-clicking in the area. Then, the mark 1660 indicating that the area 1602A is now selected is displayed. The reception unit 1072 receives the selection of the menu, and the display control unit 1073 displays the corresponding area associating field 1610 as illustrated in FIG. 43A. The area associating field 1610 includes the message 1611 "please select area to associate", and the message "in front of refrigerator" in the currently selected area field 1612.

After the viewer Y selects the area 1602A using the pointing device 1650, the reception unit 1072 detects the position of the pointing device 1650, and determines that the area 1602A has been selected. The reception unit 1072 displays the name (refrigerator) registered for the area 1602A in the field 1613 of the area associating field 1610. Thus, the viewer Y can associate the areas through a simple operation to select the areas. Also, because the already set area is displayed, the viewer Y can easily understand the relative positional relationships between the above-mentioned area and the area to be newly registered.

Figure 43B:
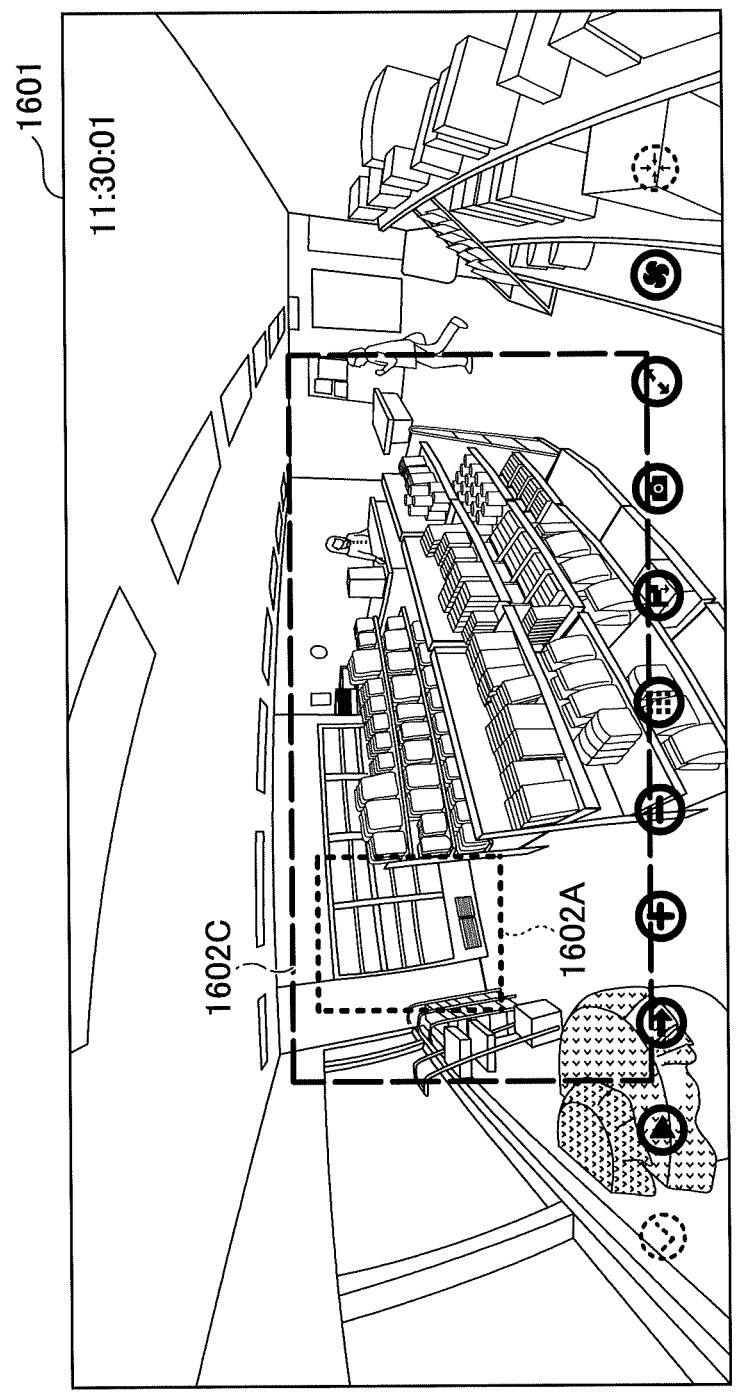

FIG. 43B illustrates an example of registering an area within a previously registered area. In the example of FIG. 43B, in the area 1602C, the area 1602A is registered. The information processing terminal 18-1 can determine that the area 1602A is included in the area 1602C by comparing the coordinates of the areas 1602C and 1602A. Alternatively, the viewer Y may explicitly set that these areas have an inclusion relation. Therefore, the server apparatus 12-1 can easily calculate the ratio of the number of persons detected in the area 1602A with respect to the total number of persons detected in the area 1602C, or the like.

Figure 44A:
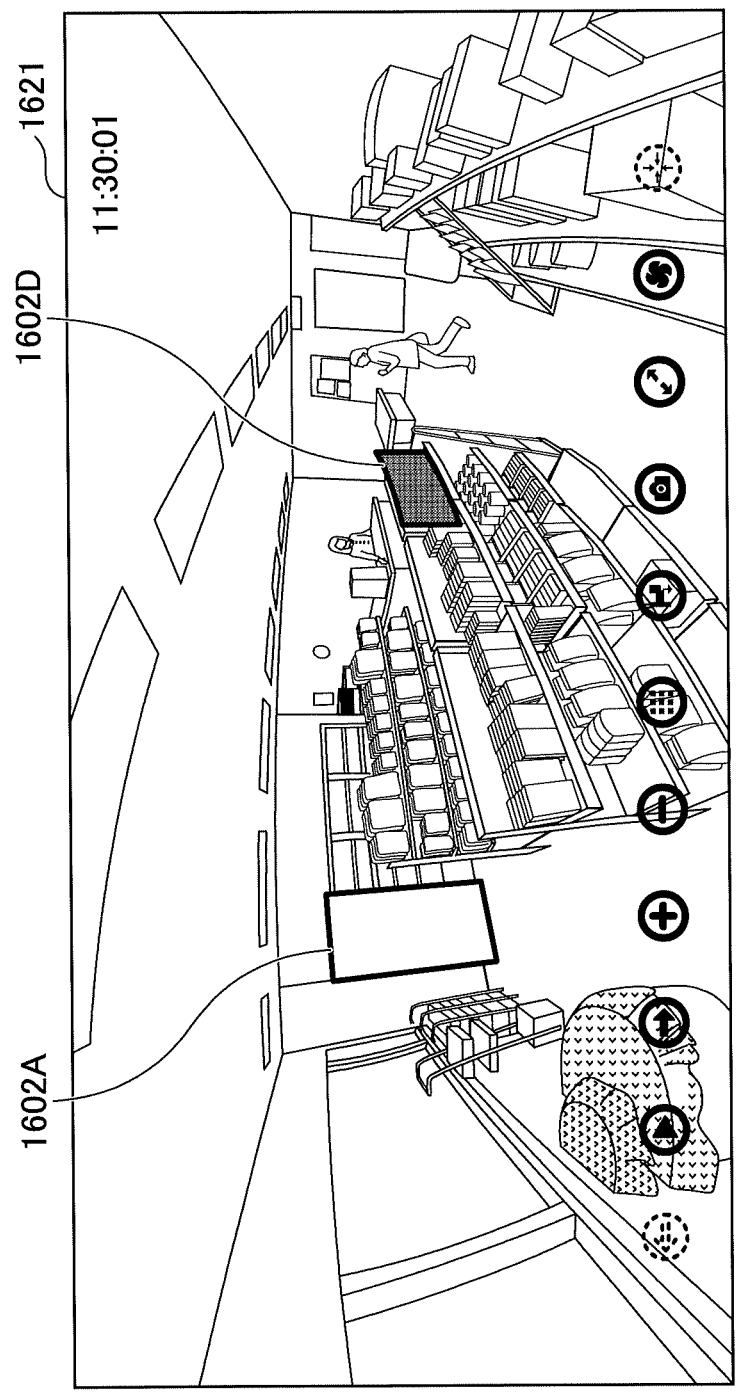

FIGS. 44A and 44B illustrate examples of an area display screen page 1621. FIG. 44A illustrates an example of displaying registered areas 1602A and 1602D. In FIG. 44A, the two areas 1602A and 1602D are displayed with different colors, respectively. Image data displayed by the information processing terminal 18-1 on the display 508 is, as mentioned above, generated by the display control unit 1073 of the information processing terminal 18-1. It is also possible that the screen page generation unit 1054 of the server apparatus 12-1 generates the same image data. Although the areas 1602A and 1602D are monochrome in FIG. 44A, the area 1602A is displayed redly and the area 1602D is displayed bluely, actually, for example. As a result, it is possible to allow the viewer Y to easily understand the different areas 1602A and 1602D are displayed. Note that, the actual colors of the areas 1602A and 1602B are examples, and it is also possible to allow the viewer Y to designate the colors.

On the other hand, the display control unit 1073 of the information processing terminal 18-1 displays areas associated with each other as having the same colors. FIG. 44B shows an example where the area 1602B of "in front of cash register" and the area 1602A of "refrigerator" associated with one another are displayed having the same colors. The display control unit 1073 of the information processing terminal 18-1 reads the associating field of the area information management DB 500, and sets the same colors to the plurality of areas associated with each other. Although the areas 1602A and 1602B are monochrome in FIG. 44B, the areas 1602A and 1602B are both displayed redly, actually, for example. Note that, the actual color of the areas 1602A and 1602B is an example. The viewer Y can easily determine areas that are associated with each other by checking the displayed colors of the areas.

Note that the colors of the respective areas are translucent, and therefore, the viewer Y can easily determine for which objects appearing in the wide angle image the respective areas are set.

Figure 45A:
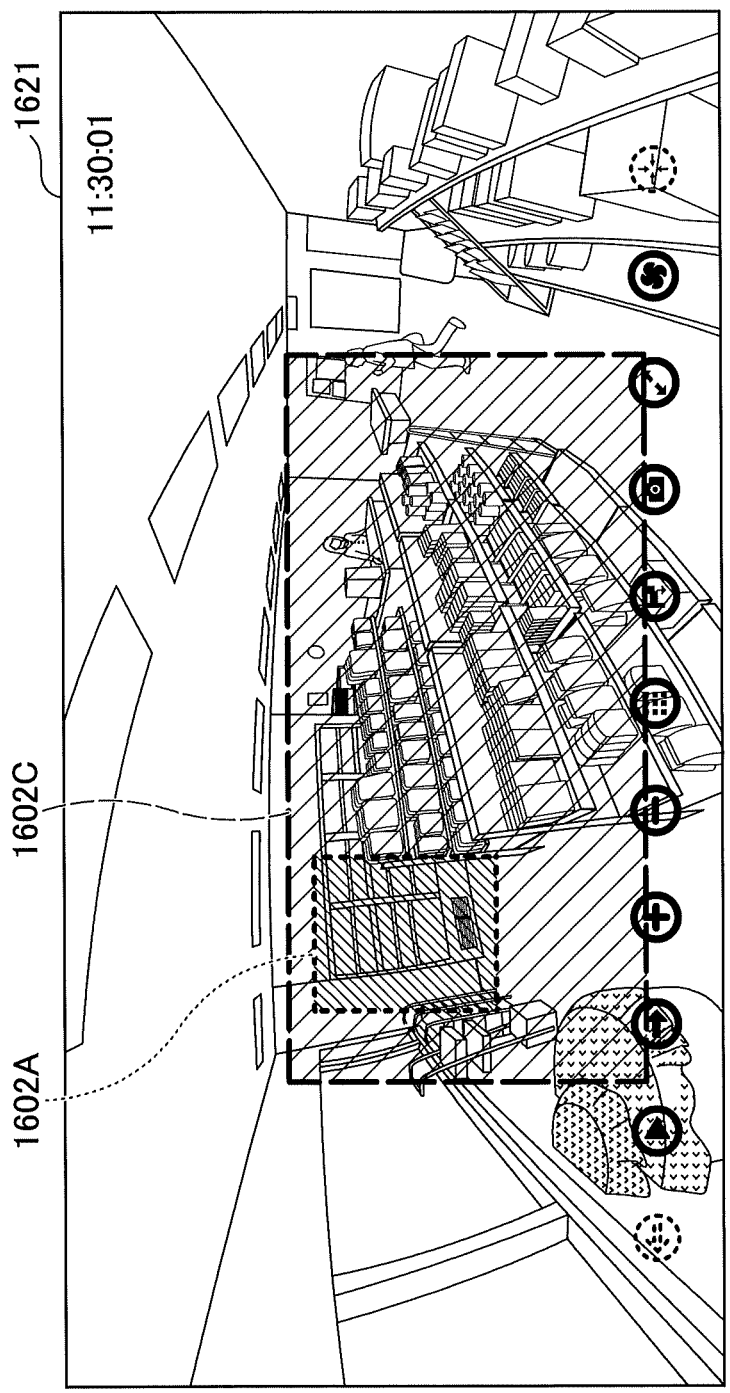
FIG. 45A illustrates one example of displaying an area included in another area according to the second embodiment.

FIG. 45A illustrates one example of displaying an area included in another area. The respective areas 1602A and 1602C are displayed having different colors, and therefore, the viewer Y can easily determines the included area. Note that, if the included area 1602A is associated with the including area 1602C, the areas have the same colors, as mentioned above, and thus, it may be difficult to distinguish the areas. Therefore, the display control unit 1073 of the information processing terminal 18-1 reads the information for identifying the areas (values) from the area information management DB 5005 to identify such areas that one of the areas is completely included in the other. Then, the display control unit 1073 generates a frame for the included area having a different color from the color of the area itself, for example. As a result, when the information processing terminal 18-1 has displayed the wide angle image, the overlapped areas can be distinguished. Alternatively, it is also possible to cause one of the areas to blink, reduce the brightness, or display using oblique lines of the same color.

Figure 45B:
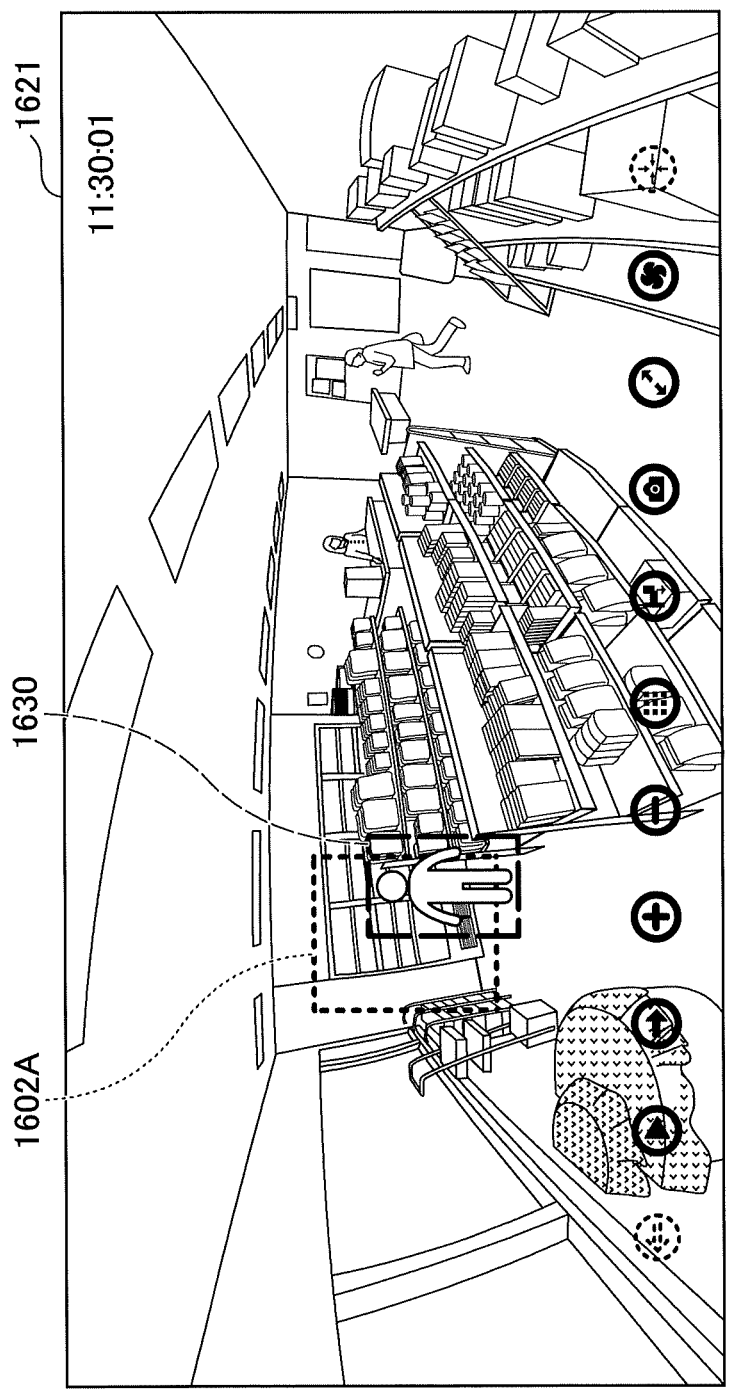
FIG. 45B illustrates one example of displaying a person detected area according to the second embodiment.

FIG. 45B illustrates one example of displaying the person detected area. The display control unit 1073 of the information processing terminal 18-1 previously generates a planar image of a person detected area that is read from the analysis information management DB 5006. The actual method of generating the planar image is the same as the method of generating the planar image of the area that is set by the viewer Y described above. Thus, the information processing terminal 18-1 can display a person detected area 1630 together with or separately from the area 1602A. The information processing terminal 18-1 can switch between a mode of displaying or not displaying a person detected area in response to a corresponding operation performed by the viewer Y. In the example of FIG. 45B, the center of the person detected area 1630 is included in the area 1602A, and therefore, it can be determined that a person has been detected in the area 1602A.

Figure 46A:
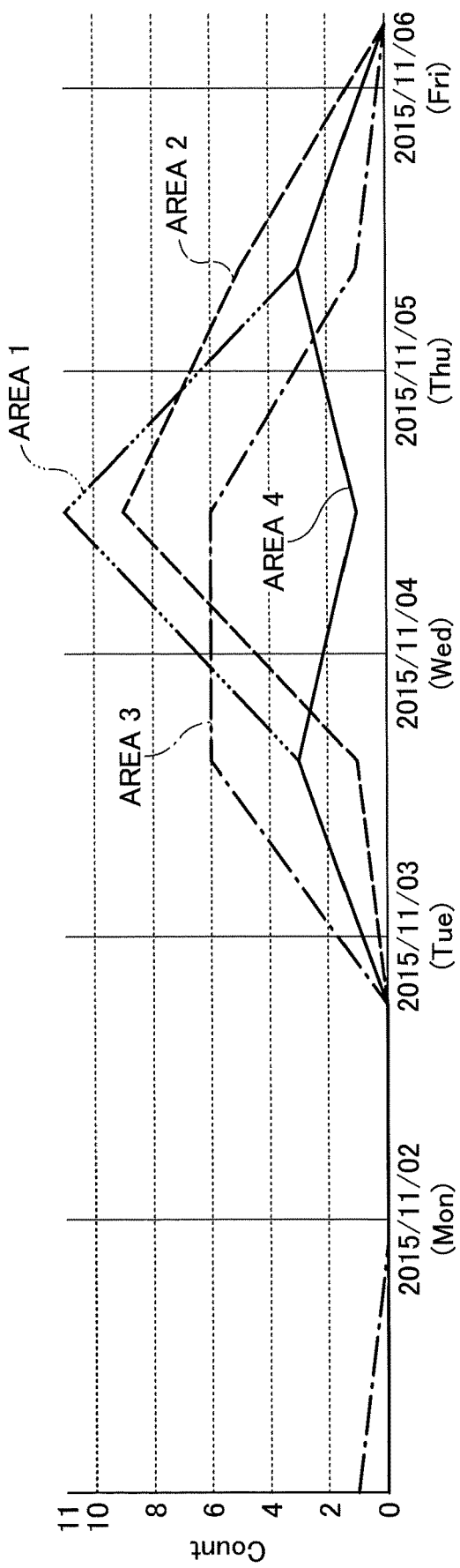
FIGS. 46A and 46B illustrates examples of an area inspection result according to the second embodiment.
Figure 46B:
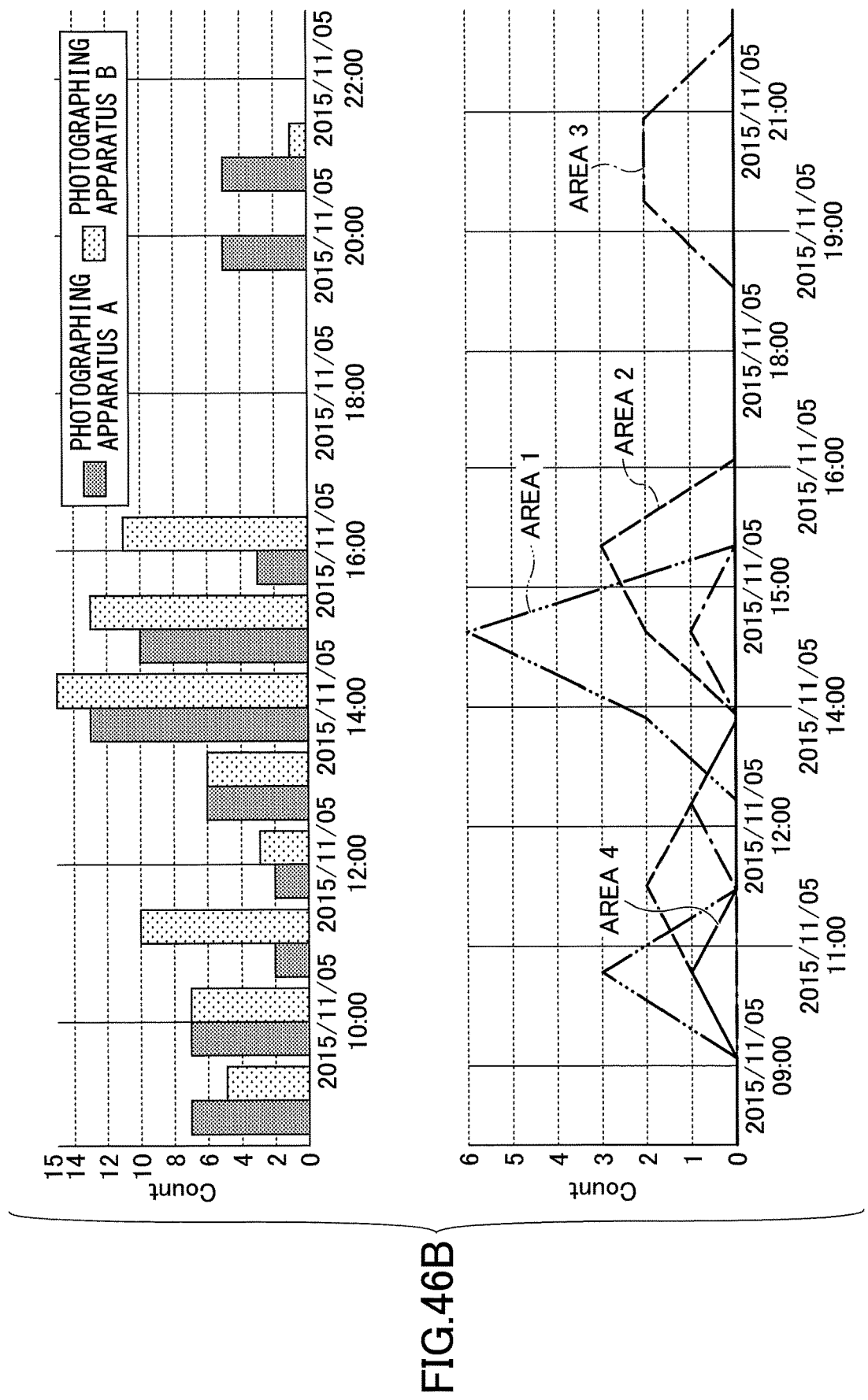

FIGS. 46A and 46B illustrate examples of the area inspection result. In FIG. 46A, the horizontal axis indicates the date, and the vertical axis indicates the number of detected persons. The number of persons is counted for each area. That is, the number of persons detected in each day is displayed for each area. The viewer Y can select the area to actually display on the display 508. Therefore, it is easy to determine an area where the number of persons is large and an area where the number of persons is small. Also, it is possible to easily understand how the number of persons changes, depending on the date.

FIG. 46B illustrate a screen page where the count value of persons throughout the wide angle image is displayed. The lower part of FIG. 46B corresponds to FIG. 46A. The upper part of FIG. 46B displays the count value of persons throughout the entirety of the wide angle image in a form of a bar graph. Note that, in the upper part of FIG. 46B, the respective count values concerning the two photographing apparatuses A and B are illustrated. As can be seen from FIG. 46B, such a tendency appears that, the greater the count value of persons detected throughout the wide angle image becomes, the greater the number of persons detected in each area. Thus, it is possible to easily understand the relationships between the entirety and the respective parts (areas).

Note that the information processing terminal 18-1 may print such inspection results as the inspection results of FIGS. 46A and 46B, or may be transmitted to another apparatus or terminal.

As described above, according to the information processing system according to the second embodiment, even though the area 1602 is set to warped image data such as the wide angle image 1010 (see FIG. 32B), it is possible to easily apply an analysis result of person detection or the like to the area 1602 that has been set, because the coordinate system of the area 1602 is transformed to the coordinate system of the planar image 1011 (see FIG. 32C) with which analysis (image processing) such as that for person detection is made. An entire celestial sphere image that is one example of a wide angle image has no boundary. In contrast thereto, a planar image has a boundary (edge). However, an area that is set by the viewer Y is divided as appropriate, and therefore, it is possible to correctly apply a result of analysis such as person detection to each area.

The information processing systems, the information processing methods, and the non-transitory computer-readable storage media have been described in the embodiments. However, embodiments are not limited to the above-described embodiments, and various modifications and replacements may be made.

For example, according to the second embodiment, a person is detected. However, the information processing terminal 18-1 may distinguish between a male and a female, and may display the number of times of detecting a male and the number of times of detecting a female, separately. Also, the information processing terminal 18-1 may detect various types of movements of persons such as extending his or her arm, sitting, returning a product, and so forth, and display the number of times of each type of movements. It is also possible to display whether a product is present in a store, the number of products, a volume of a product, whether the arrangement of products are disordered, or the like.

Also, according to the second embodiment, an area is registered in the information processing terminal 18-1, and information concerning the area is generated by the server apparatus 12-1. However, it is also possible that the information processing terminal 18-1 also generates information concerning the area, or it is also possible that the server apparatus 12-1 receives a setting of an area from the user. It is also possible that an information processing apparatus integrally includes the information processing terminal 18-1 and the server apparatus 12-1 as a unit, and carries out the processes described above concerning the second embodiment. Also, the information processing terminal 18-1 may have all or some of the functions of the server apparatus 12-1. Also, the server apparatus 12-1 may have all or some of the functions of the information processing terminal 18-1.

Also, the configuration examples of the second embodiment illustrated in FIG. 33, and so forth, are such that, each apparatus is divided into respective units according to the main functions for the sake of easily understanding the processes of the photographing apparatus 14-1, the communications terminal 15, the server apparatus 12-1, and the information processing terminal 18-1. However, the present invention is not limited by how to divide each apparatus into process units and the actual names of the units. The processes of the photographing apparatus 14-1, the communications terminal 15, the server apparatus 12-1, and the information processing terminal 18-1 may be divided into further finer process units according to the process contents. Also, each apparatus may be divided in such a manner that one process unit include more processes. Also, the information processing system 10-1 may have a plurality of the server apparatuses 12-1. The same thoughts may also be applied to the functional configuration examples of the first embodiment illustrated in FIG. 12.

Also, the server apparatus 12-1 according to the second embodiment need not have the databases of the storage unit 5000 of the server apparatus 12-1 by itself. The databases of the storage unit 5000 of the server apparatus 12-1 may be placed in the communications network 20 separately from the server apparatus 12-1, and the server apparatus 12-1 can read information from and write information to the databases.

Note that, concerning the second embodiment, the display 508 is one example of a display; the reception unit 1072 is one example of a function of receiving; the area coordinate calculation unit 1074 is one example of a function of transforming coordinates; the area inspection unit 1056 is one example of a function of analyzing, and the display control unit 1073 is one example of a function of displaying. The process that the information processing system 10-1 according to the second embodiment carries out is one example of an information processing method.

What is claimed is:

1. An information processing system comprising a server apparatus and an information processing terminal, wherein
   (i) the server apparatus including one or more processors configured to:
   analyze a plurality of wide angle images acquired through photographing, and transmit a result image indicating a result of analyzing to an information processing terminal; and
   (ii) the information processing terminal communicable with the server apparatus and including one or more processors configured to:
   receive the result image, and
   display the result image on a display, and wherein
   (i) the one or more processors of the server apparatus are further configured to:
   identify wide angle images used as a base to derive an analysis result indicated by the result image as base images, and
   transmit the base images to the information processing terminal; and
   (ii) the one or more processors of the information processing terminal are further configured to:
   receive the base images, and
   display the wide angle image as the base image on the display.

2. The information processing system according to claim 1, wherein
   (i) the one or more processors of the server apparatus are further configured to:
   set initial image information indicating a wide angle image to be first displayed on the display of the information processing terminal from among the wide angle images included in the base images, and
   transmit the base images and the initial image information to the information processing terminal; and
   (ii) the one or more processors of the information processing terminal are further configured to:
   receive the base images and the initial image information, and
   display, on the display, the wide angle image indicated by the initial image information from among the wide angle images included in the base images.

3. The information processing system according to claim 2, wherein
   (i) the one or more processors of the server apparatus are further configured to:
   set the initial image information according to the analysis contents indicated by the analysis content information.

4. The information processing system according to claim 1, wherein
   (i) the one or more processors of the server apparatus are further configured to:
   transmit the base images as the wide angle images as a base to derive the analysis result indicated by the result image, and comparison identification information for identifying other wide angle images for comparison corresponding to the respective wide angle images as the base images to the information processing terminal; and
   (ii) the one or more processors of the information processing terminal are further configured to:
   receive the base images and the comparison identification information, and display, on the display, the wide angle image included in the base image and the corresponding wide angle image identified by the comparison identification information.

5. The information processing system according to claim 2, wherein
   (i) the one or more processors of the server apparatus are further configured to:
   set initial viewpoint direction information indicating an initial viewpoint direction in the wide angle image, and
   transmit the base images, the initial image information, and the initial viewpoint direction information to the information processing terminal; and
   (ii) the one or more processors of the information processing terminal are further configured to:
   receive the base images, the initial image information, and the initial viewpoint direction information, and
   display, on the display, the wide angle image indicated by the initial image information from among the wide angle images included in the base images, using the initial viewpoint direction indicated by the initial viewpoint direction information as a viewpoint direction.

6. The information processing system according to claim 5, wherein
   (i) the one or more processors of the server apparatus are further configured to:
   set the initial viewpoint direction information according to the analysis contents indicated by the analysis content information.

7. The information processing system according to claim 1, wherein
   (i) the one or more processors of the server apparatus are further configured to:
   analyze each group of a plurality of groups of wide angle images acquired from classifying the plurality of wide angle images according to predetermined classification conditions, and
   transmit the result image including a plurality of analysis result images indicating the results of analyzing the respective groups of wide angle images to the information processing terminal.

8. The information processing system according to claim 7, wherein the classification conditions include at least either photographed date and time or a photographed place.

9. The information processing system according to claim 1, wherein
   (i) the one or more processors of the information processing terminal are further configured to:
   display a wide angle image on the display, receive a setting of an area in the wide angle image displayed on the display, and transform coordinates of the area in the display into coordinates of a planar image to be used for analyzing the wide angle image; and (ii) the one or more processors of the server apparatus are further configured to:

generate information concerning the area considering a result of a comparison between coordinates of a result acquired from analyzing the planar image and the coordinates of the area.

10. The information processing system according to claim 9, wherein (i) the wide angle image is an entire celestial sphere image acquired from photographing 360° surroundings;

(ii) the one or more processors of the information processing terminal are further configured to:

if the area the coordinates of which are transformed to the coordinates of the planar image exceeds a resolution of the planar image, calculate a width and a height of the area in consideration of the resolution of the planar image; and (iii) the one or more processors of the server apparatus are further configured to:

if a lower-right corner of the area in the coordinates of the planar image calculated using the width and height goes across an end of the planar image, divides the area at the end of the planar image, and compares coordinates of respective areas acquired from dividing the area with the coordinates of the result acquired from analyzing the planar image.

11. The information processing system according to claim 9, wherein (i) the one or more processors of the server apparatus are further configured to:

output the information concerning the area for each area.

12. The information processing system according to claim 11, wherein (i) if a predetermined object is detected in the planar image, the result acquired from analyzing the planar image includes the coordinates of an object area where the predetermined object is detected; and (ii) the one or more processors of the server apparatus are further configured to:

if the object area overlaps with the area concerning the setting at least partially, generate the information concerning the area assuming that the object is detected in the area concerning the setting.

13. The information processing system according to claim 12, wherein (i) the one or more processors of the server apparatus are further configured to:

determine, for each wide angle image, whether the object area overlaps with the area concerning the setting at least partially, and if the object area overlaps with the area concerning the setting at least partially, count the number of times when the object is detected, for the area concerning the setting; and (ii) the one or more processors of the information processing terminal are further configured to:

display the number of times for the area concerning the setting on the display.

14. The information processing system according to claim 13, wherein (i) the one or more processors of the information processing terminal are further configured to:

display, on the display, the number of times when the object is detected for the entirety of the wide angle image and the number of times when the object is detected for each area concerning the setting.

15. The information processing system according to claim 9, wherein (i) the one or more processors of the information processing terminal are further configured to:

receive one of the setting of the area that is rectangular defined by coordinates of two points indicated by a pointing device on the display; the setting of the area enclosed by a plurality of points indicated by the pointing device on the display; and the setting of the area enclosed by a trajectory indicated by the pointing device on the display.

* * * * *